United States Patent
Stilp

(10) Patent No.: US 7,283,048 B2
(45) Date of Patent: *Oct. 16, 2007

(54) MULTI-LEVEL MESHED SECURITY NETWORK

(75) Inventor: Louis A. Stilp, Berwyn, PA (US)

(73) Assignee: InGrid, Inc., Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/321,429

(22) Filed: Dec. 29, 2005

(65) Prior Publication Data

US 2006/0145842 A1    Jul. 6, 2006

Related U.S. Application Data

(63) Continuation-in-part of application No. 10/821,938, filed on Apr. 12, 2004, now Pat. No. 7,042,353, which is a continuation-in-part of application No. 10/795,368, filed on Mar. 9, 2004, now Pat. No. 7,079,020, which is a continuation-in-part of application No. 10/602,854, filed on Jun. 25, 2003, now Pat. No. 7,023,341, which is a continuation-in-part of application No. 10/423,887, filed on Apr. 28, 2003, now Pat. No. 7,019,639, which is a continuation-in-part of application No. 10/366,316, filed on Feb. 14, 2003, now Pat. No. 7,057,512, which is a continuation-in-part of application No. 10/356,512, filed on Feb. 3, 2003, now Pat. No. 6,888,459.

(51) Int. Cl.
*G08B 1/08* (2006.01)

(52) U.S. Cl. .............................. 340/539.21; 340/539.1; 340/539.11; 340/539.13

(58) Field of Classification Search ............. 340/539.1, 340/539.11, 539.13, 539.21
See application file for complete search history.

(56) References Cited

U.S. PATENT DOCUMENTS

| | | | |
|---|---|---|---|
| 4,367,458 A | 1/1983 | Hackett |
| 4,465,904 A | 8/1984 | Gottsegen et al. |
| 4,550,311 A | 10/1985 | Galloway et al. |
| 4,613,848 A | 9/1986 | Watkins |
| 4,724,425 A | 2/1988 | Gerhart et al. |
| 4,731,810 A | 3/1988 | Watkins |
| 4,754,261 A | 6/1988 | Marino |
| 4,772,876 A | 9/1988 | Laud |
| 4,812,820 A | 3/1989 | Chatwin |
| 4,855,713 A | 8/1989 | Brunius |
| 4,908,604 A | 3/1990 | Jacob |
| 4,951,029 A | 8/1990 | Severson |
| 4,980,913 A | 12/1990 | Skret |

(Continued)

FOREIGN PATENT DOCUMENTS

GB    2 330 230 A    4/1999

*Primary Examiner*—Daryl C Pope
(74) *Attorney, Agent, or Firm*—Stradley Ronon Stevens & Young, LLP

(57) ABSTRACT

A multi-level meshed security network. The network includes a first level having a plurality of base units, supporting relatively high power RF communications, and a controller function. The second level has a plurality of transponders, supporting relatively low power RF communications, and at least one sensor. Each of the components of the first level communicates with each other and with each of the components of the second level.

43 Claims, 27 Drawing Sheets

U.S. PATENT DOCUMENTS

| | | |
|---|---|---|
| 5,040,335 A | 8/1991 | Grimes |
| 5,233,640 A | 8/1993 | Kostusiak |
| 5,235,326 A | 8/1993 | Beigel et al. |
| 5,300,875 A | 4/1994 | Tuttle |
| 5,307,763 A | 5/1994 | Arthur et al. |
| 5,347,280 A | 9/1994 | Schuermann |
| 5,400,246 A | 3/1995 | Wilson et al. |
| 5,406,263 A | 4/1995 | Tuttle |
| 5,438,607 A | 8/1995 | Przygoda, Jr. et al. |
| 5,465,081 A | 11/1995 | Todd |
| 5,477,215 A | 12/1995 | Mandelbaum |
| 5,500,651 A | 3/1996 | Schuermann |
| 5,508,692 A | 4/1996 | Wolfram |
| 5,543,778 A | 8/1996 | Stouffer |
| 5,568,535 A | 10/1996 | Sheffer et al. |
| 5,583,796 A | 12/1996 | Reese |
| 5,621,380 A | 4/1997 | Mutoh et al. |
| 5,621,662 A | 4/1997 | Humphries et al. |
| 5,625,338 A | 4/1997 | Pildner et al. |
| 5,629,981 A | 5/1997 | Nerlikar |
| 5,646,592 A | 7/1997 | Tuttle |
| 5,649,296 A | 7/1997 | MacLellan et al. |
| 5,668,929 A | 9/1997 | Foster, Jr. |
| 5,706,399 A | 1/1998 | Bareis |
| 5,726,644 A | 3/1998 | Jednacz et al. |
| 5,736,927 A | 4/1998 | Stebbins et al. |
| 5,742,237 A | 4/1998 | Bledsoe |
| 5,745,849 A | 4/1998 | Britton |
| 5,748,079 A | 5/1998 | Addy |
| 5,761,206 A | 6/1998 | Kackman |
| 5,774,876 A | 6/1998 | Woolley et al. |
| 5,786,767 A | 7/1998 | Severino |
| 5,799,062 A | 8/1998 | Lazzara et al. |
| 5,801,626 A | 9/1998 | Addy |
| 5,802,467 A | 9/1998 | Salazar et al. |
| 5,805,063 A | 9/1998 | Kackman |
| 5,805,064 A | 9/1998 | Yorkey |
| 5,809,013 A | 9/1998 | Kackman |
| 5,812,054 A | 9/1998 | Cohen |
| 5,822,373 A | 10/1998 | Addy |
| 5,828,300 A | 10/1998 | Addy et al. |
| 5,831,531 A | 11/1998 | Tuttle |
| 5,887,176 A | 3/1999 | Griffith et al. |
| 5,889,468 A | 3/1999 | Banga |
| 5,894,266 A | 4/1999 | Wood, Jr. et al. |
| 5,898,369 A | 4/1999 | Godwin |
| 5,905,438 A | 5/1999 | Weiss et al. |
| 5,907,279 A | 5/1999 | Bruins et al. |
| 5,920,270 A | 7/1999 | Peterson |
| 5,929,778 A | 7/1999 | Asama et al. |
| 5,937,067 A | 8/1999 | Thatcher et al. |
| 5,949,335 A | 9/1999 | Maynard |
| 5,950,110 A | 9/1999 | Hendrickson |
| 5,952,935 A | 9/1999 | Mejia |
| 6,026,165 A | 2/2000 | Marino et al. |
| 6,028,513 A | 2/2000 | Addy |
| 6,031,455 A * | 2/2000 | Grube et al. ........... 340/539.26 |
| 6,034,603 A | 3/2000 | Steeves |
| 6,049,273 A | 4/2000 | Hess |
| 6,054,925 A | 4/2000 | Proctor et al. |
| 6,058,137 A | 5/2000 | Partyka |
| 6,058,374 A | 5/2000 | Guthrie et al. |
| 6,060,994 A | 5/2000 | Chen |
| 6,078,269 A | 6/2000 | Markwell et al. |
| 6,084,530 A | 7/2000 | Pidwerbetsky et al. |
| 6,087,933 A | 7/2000 | Addy et al. |
| 6,091,320 A | 7/2000 | Odinak |
| 6,104,785 A | 8/2000 | Chen |
| 6,120,262 A | 9/2000 | McDonough et al. |
| 6,127,928 A | 10/2000 | Issacman et al. |
| 6,134,303 A | 10/2000 | Chen |
| 6,137,402 A | 10/2000 | Marino |
| 6,150,936 A | 11/2000 | Addy |
| 6,150,948 A | 11/2000 | Watkins |
| 6,160,488 A | 12/2000 | Honda |
| 6,163,257 A | 12/2000 | Tracy |
| 6,175,860 B1 | 1/2001 | Gaucher |
| 6,177,861 B1 | 1/2001 | MacLellan et al. |
| 6,191,701 B1 | 2/2001 | Bruwer |
| 6,195,006 B1 | 2/2001 | Bowers et al. |
| 6,204,760 B1 | 3/2001 | Brunius |
| 6,208,247 B1 | 3/2001 | Agre et al. |
| 6,208,694 B1 | 3/2001 | Addy |
| 6,215,404 B1 | 4/2001 | Morales |
| 6,229,997 B1 | 5/2001 | Addy |
| 6,236,315 B1 | 5/2001 | Helms |
| 6,243,010 B1 | 6/2001 | Addy et al. |
| 6,243,012 B1 | 6/2001 | Shober et al. |
| 6,252,501 B1 | 6/2001 | Tice et al. |
| 6,255,944 B1 | 7/2001 | Addy |
| 6,271,754 B1 | 8/2001 | Durtler |
| 6,285,261 B1 | 9/2001 | Pax et al. |
| 6,294,992 B1 | 9/2001 | Addy et al. |
| 6,313,743 B1 | 11/2001 | Abraham-Fuchs et al. |
| 6,317,028 B1 | 11/2001 | Valiulis |
| 6,366,215 B1 | 4/2002 | Tice et al. |
| 6,367,697 B1 | 4/2002 | Turner et al. |
| 6,377,609 B1 | 4/2002 | Brennan, Jr. |
| 6,441,723 B1 | 8/2002 | Mansfield, Jr. et al. |
| 6,441,731 B1 | 8/2002 | Hess |
| 6,445,291 B2 | 9/2002 | Addy et al. |
| 6,445,292 B1 | 9/2002 | Jen et al. |
| 6,456,668 B1 | 9/2002 | MacLellan et al. |
| 6,459,726 B1 | 10/2002 | Ovard et al. |
| 6,466,138 B1 | 10/2002 | Partyka |
| 6,483,433 B2 | 11/2002 | Moskowitz et al. |
| 6,496,475 B1 | 12/2002 | Ji et al. |
| 6,501,807 B1 | 12/2002 | Chieu et al. |
| 6,507,607 B1 | 1/2003 | Hill |
| 6,593,845 B1 | 7/2003 | Friedman et al. |
| 6,597,956 B1 | 7/2003 | Aziz et al. |
| 6,608,551 B1 | 8/2003 | Anderson et al. |
| 6,617,963 B1 | 9/2003 | Watters et al. |
| 6,624,750 B1 | 9/2003 | Marman et al. |
| 6,646,550 B1 | 11/2003 | Runyon et al. |
| 6,691,172 B1 | 2/2004 | Clow et al. |
| 6,693,513 B2 | 2/2004 | Tuttle |
| 6,693,999 B2 | 2/2004 | Ito et al. |
| 6,703,930 B2 | 3/2004 | Skinner |
| 6,707,374 B1 | 3/2004 | Zaharia |
| 6,762,686 B1 | 7/2004 | Tabe |
| 6,806,808 B1 | 10/2004 | Watters et al. |
| 6,903,662 B2 | 6/2005 | Rix et al. |
| 7,042,357 B2 | 5/2006 | Girvin et al. |
| 2001/0008390 A1 | 7/2001 | Berquist et al. |
| 2002/0060639 A1 | 5/2002 | Harman |
| 2002/0070863 A1 | 6/2002 | Brooking |
| 2002/0111698 A1 | 8/2002 | Graziano et al. |
| 2002/0174367 A1 | 11/2002 | Kimmel et al. |
| 2003/0133473 A1 | 7/2003 | Manis et al. |
| 2003/0227385 A1 | 12/2003 | Lancaster |
| 2004/0008112 A1 | 1/2004 | Carrender |
| 2004/0046642 A1 | 3/2004 | Beckan et al. |
| 2004/0066280 A1 | 4/2004 | Pratt et al. |
| 2004/0189471 A1 | 9/2004 | Ciarcia et al. |
| 2004/0210495 A1 | 10/2004 | White |

* cited by examiner

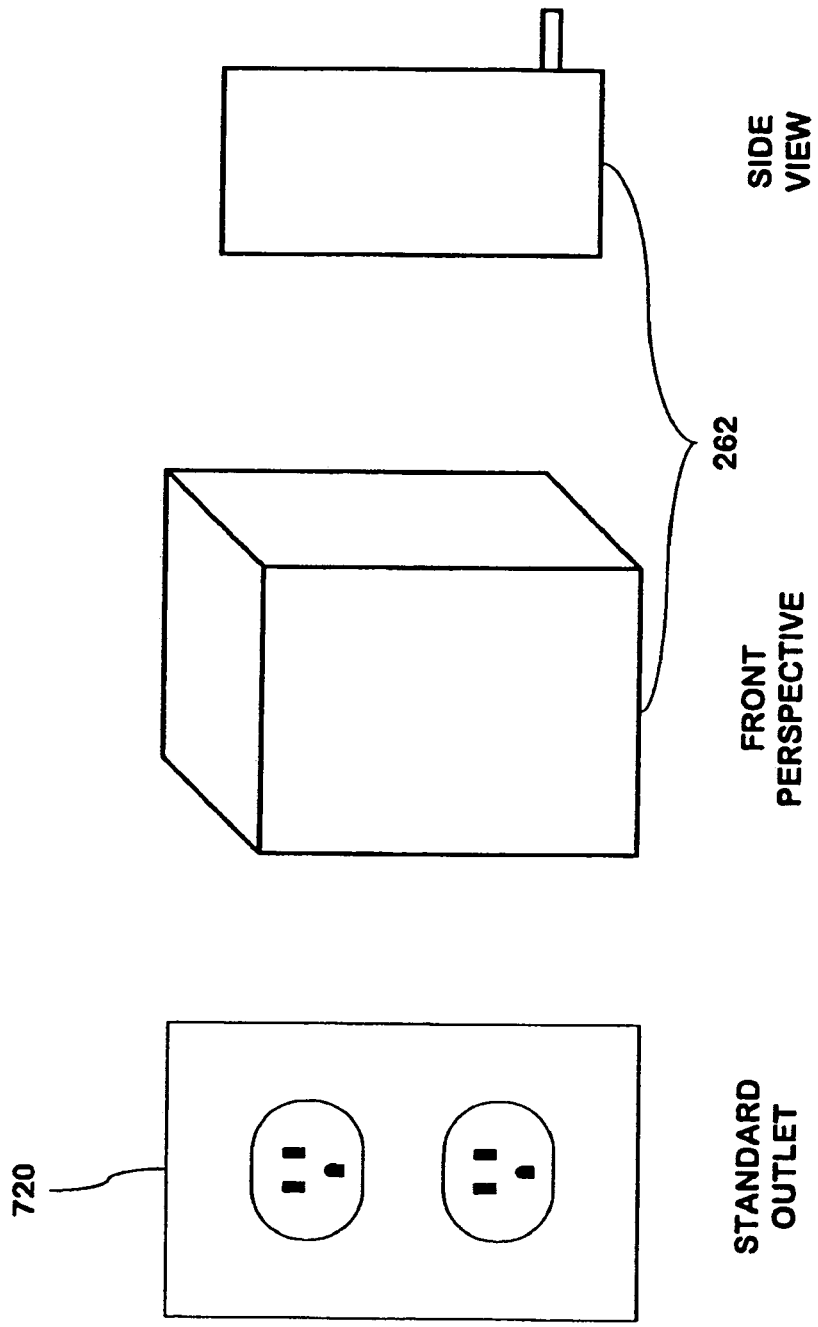

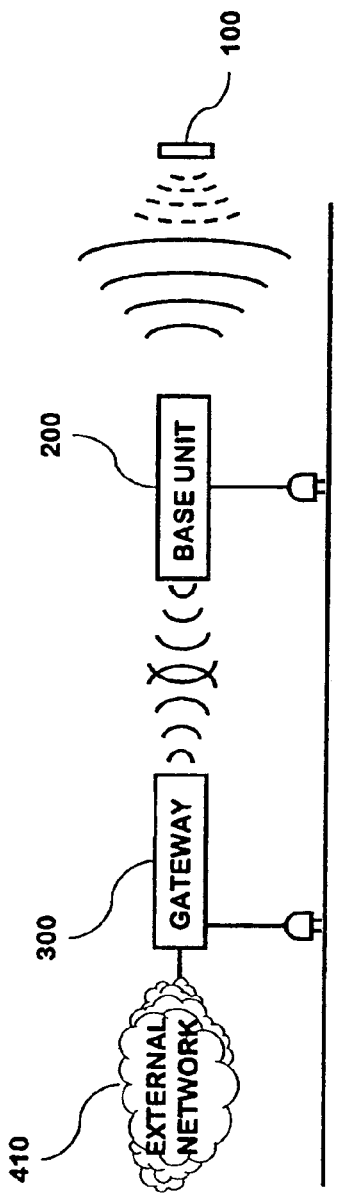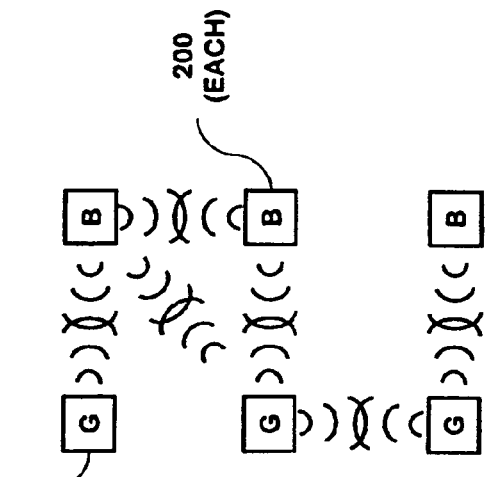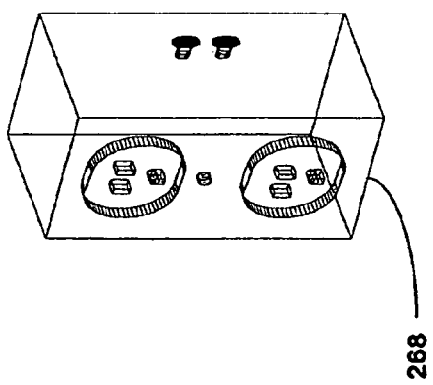
FIG. 23A
FIG. 23B
FIG. 23C

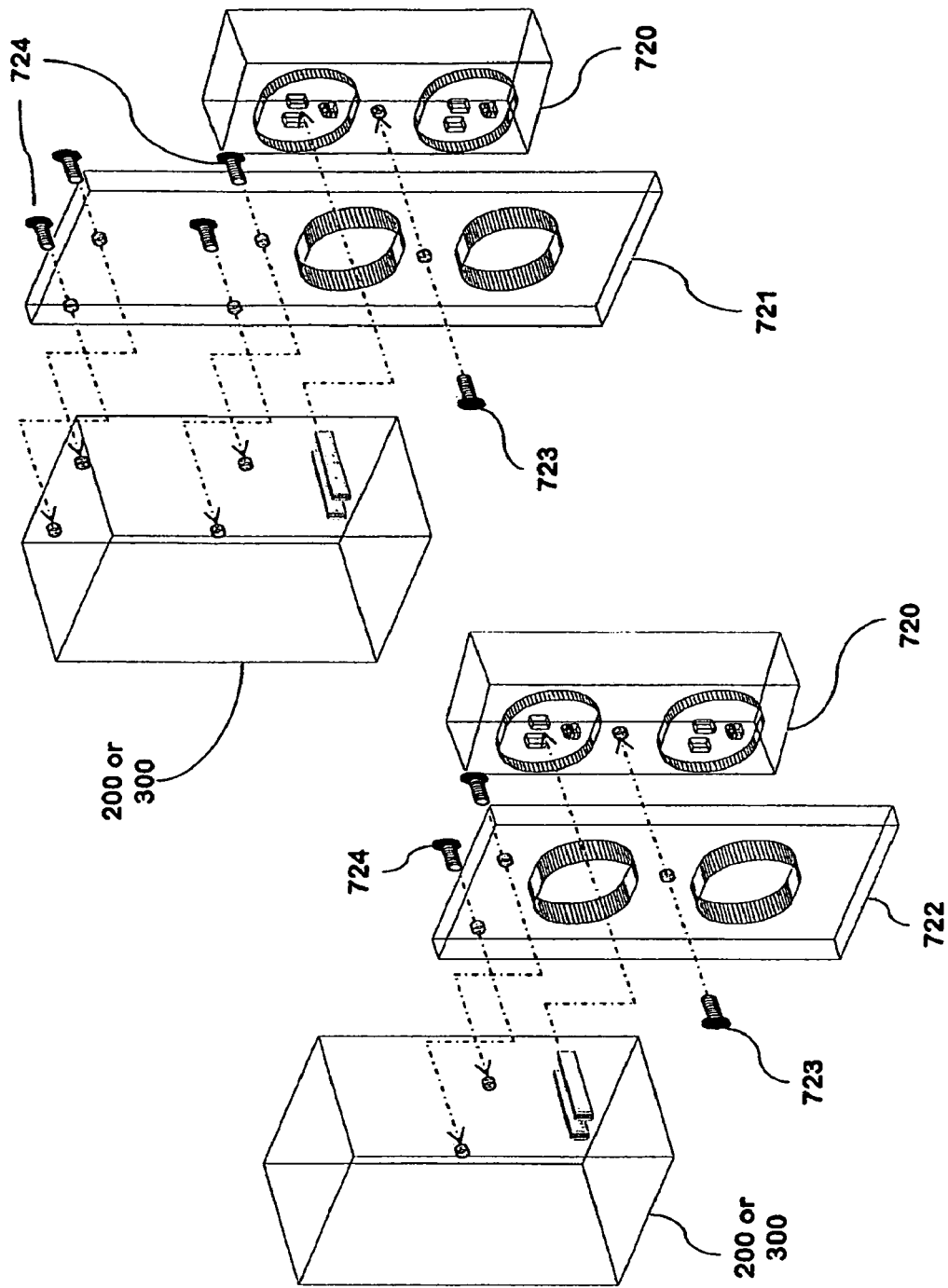

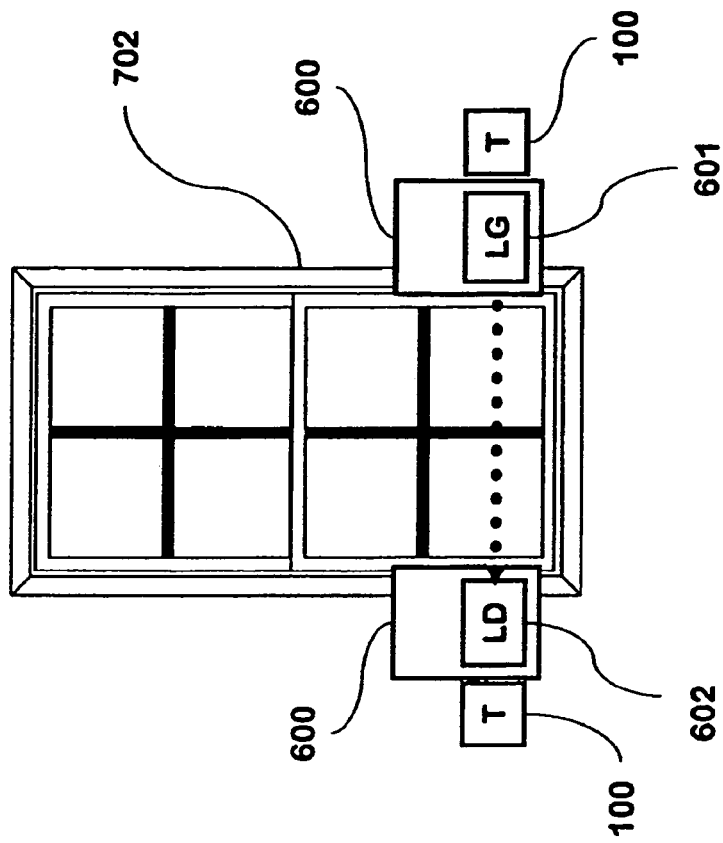
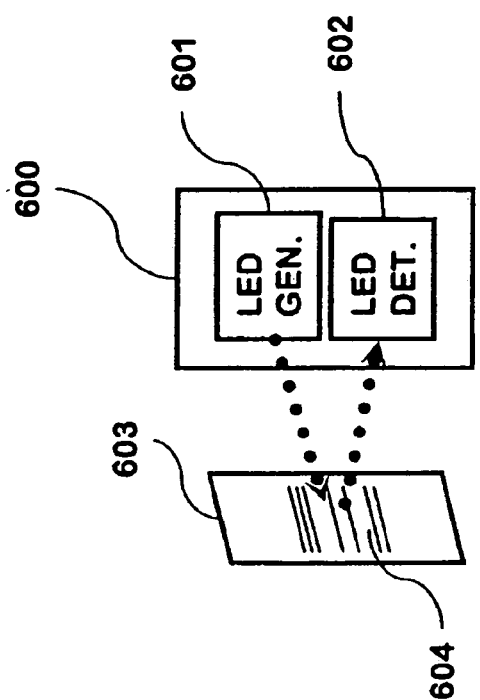
FIG. 25A
FIG. 25B

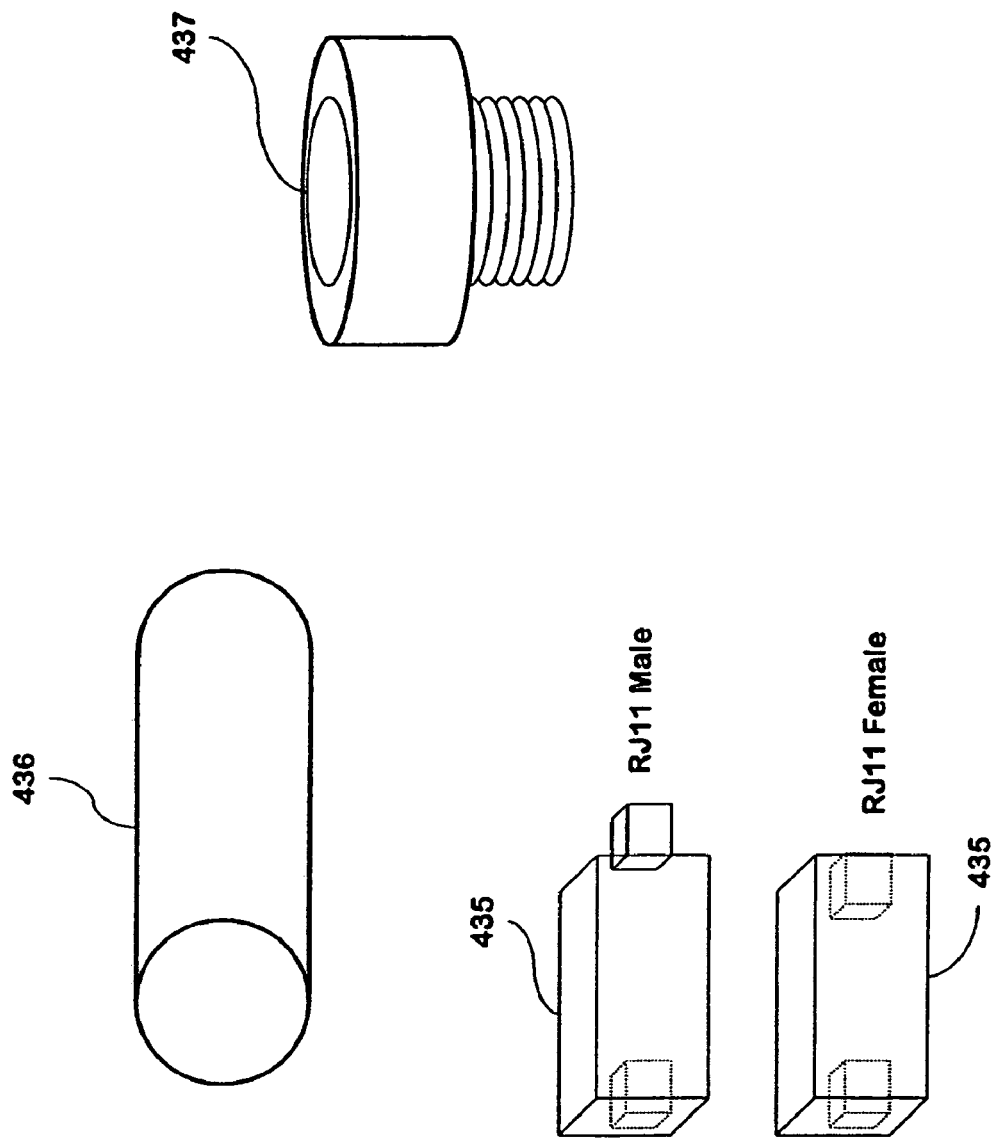

MULTI-LEVEL MESHED SECURITY NETWORK

CROSS REFERENCE TO RELATED APPLICATIONS

This patent application is a continuation-in-part of U.S. application Ser. No. 10/821,938, Cordless Telephone System, filed Apr. 12, 2004 by the inventor of the present application, issued as U.S. Pat. No. 7,042,353, which is itself a continuation-in-part of U.S. application Ser. No. 10/795,368, Multi-Controller Security Network, filed Mar. 9, 2004 and issued as U.S. Pat. No. 7,079,020, which is itself a continuation-in-part of U.S. application Ser. No. 10/602,854, RFID Reader for a Security Network, filed Jun. 25, 2003 and issued as U.S. Pat. No. 7,023,341, which is itself a continuation-in-part of U.S. application Ser. No. 10/423,887, RFID Based Security Network, filed Apr. 28, 2003 and issued as U.S. Pat. No. 7,019,639, which is itself a continuation-in-part of U.S. application Ser. No. 10/366,316, RFID Reader for a Security System, filed Feb. 14, 2003 and issued as U.S. Pat. No. 7,057,512, which is itself a continuation-in-part of U.S. application Ser. No. 10/356,512, RFID Based Security System, filed Feb. 3, 2003 and issued as U.S. Pat. No. 6,888,459.

This patent application is further cross referenced to the following patent applications: U.S. application Ser. No. 10/820,804, Configuration Program for a Security System, filed Apr. 9, 2004 (now abandoned); and U.S. application Ser. No. 10/806,371, Communications Architecture for a Security Network, filed Mar. 23, 2004, issued as U.S. Pat. No. 7,084,756; and to the following patent applications, all filed Feb. 14, 2003: U.S. application Ser. No. 10/366,320, Communications Control in a Security System, issued as U.S. Pat. No. 7,091,827; U.S. application Ser. No. 10/366,335, Device Enrollment in a Security System, issued as U.S. Pat. No. 7,119,658; U.S. application Ser. No. 10/366,334, Controller for a Security System, issued as U.S. Pat. No. 7,053,764; and U.S. application Ser. No. 10/366,317, RFID Transponder for a Security System, issued as U.S. Pat. No. 7,079,034; and to the following patent applications, all filed concurrently with the present application by the inventor of the present application: "Clip for RFID Transponder of a Security Network," U.S. Application Ser. No. 11/321,515 (now allowed); "Power Management of Transponders and Sensors in an RFID Security Network," U.S. application Ser. No. 11/321,528; "Component Diversity in an RFID Security Network," U.S. application Ser. No. 11/321,776; "Portable Telephone in a Security Network," U.S. application Ser. No. 11/321,526; and "Fixed Part-Portable Part Communications Network for a Security Network," U.S. application Ser. No. 11/321,338. All of the foregoing cross-referenced patent applications are incorporated by reference into this present patent application.

TECHNICAL FIELD

The present invention relates generally to security systems and, more particularly, to a multi-level meshed security network.

BACKGROUND OF THE INVENTION

Security systems and home automation networks are described in numerous patents, and have been in prevalent use for over 40 years. In the United States, there are over 14 million security systems in residential homes alone. The vast majority of these systems are hardwired systems, meaning the keypad, system controller, and various intrusion sensors are wired to each other. These systems are easy to install when a home is first being constructed and access to the interiors of walls is easy; however, the cost increases substantially when wires must be added to an existing home. On average, the security industry charges approximately $75 per opening (i.e., window or door) to install a wired intrusion sensor (such as a magnet and reed switch), where most of this cost is due to the labor of drilling holes and running wires to each opening. For this reason, most homeowners only monitor a small portion of their openings. This is paradoxical because most homeowners actually want security systems to cover their entire home.

In order to induce a homeowner to install a security system, many security companies will underwrite a portion of the costs of installing a security system. Therefore, if the cost of installation were $1,500, the security company may only charge $500 and then require the homeowner to sign a multi-year contract with monthly fees. The security company then recovers its investment over time. Interestingly enough, if a homeowner wants to purchase a more complete security system, the revenue to the security company and the actual cost of installation generally rise in lockstep, keeping the approximate $1,000 investment constant. This actually leads to a disincentive for security companies to install more complete systems—it uses up more technician time without generating a higher monthly contract or more upfront profit. Furthermore, spending more time installing a more complete system for one customer reduces the total number of systems that any given technician can install per year, thereby reducing the number of monitoring contracts that the security company obtains per year.

In order to reduce the labor costs of installing wired systems into existing homes, wireless security systems have been developed in the last 10 to 20 years. These systems use RF communications for at least a portion of the keypads and intrusion sensors. Typically, a transceiver is installed in a central location in the home. Then, each opening is outfitted with an intrusion sensor connected to a small battery powered transmitter. The initial cost of the wireless system can range from $25 to $50 for each transmitter, plus the cost of the centrally located transceiver. This may seem less than the cost of a wired system, but in fact the opposite is true over a longer time horizon. Wireless security systems have demonstrated lower reliability than wired systems, leading to higher service and maintenance costs. For example, each transmitter contains a battery that drains over time (perhaps only a year or two), requiring a service call to replace the battery. Further, in larger houses, some of the windows and doors may be an extended distance from the centrally located transceiver, causing the wireless communications to intermittently fade out. In fact, the UL standard for wireless security systems allows wireless messages to be missed for up to 12 hours before considering the missed messages to be a problem. This implies an allowable error rate of 91%, assuming a once per hour supervisory rate.

These types of wireless security systems generally operate under 47 CFR 15.231(a), which places limits on the amount of power that can be transmitted. For example, at 433 MHz, used by the wireless transmitters of one manufacturer, an average field strength of only 11 mV/m is permitted at 3 meters (equivalent to approximately 36 microwatts). At 345 MHz, used by the wireless transmitters of another manufacturer, an average field strength of only 7.3 mV/m is permitted at 3 meters (equivalent to approximately 16 microwatts). Control or supervisory transmissions are only permitted once per hour, with a duration not to exceed one second. If these same transmitters wish to transmit data under 47 CFR 15.231(e), the average field strengths at 345 and 433 MHz are reduced to 2.9 and 4.4 mV/m, respectively. The current challenges of using these methods of transmission are discussed in various patents, including U.S. Pat. Nos. 6,087,933, 6,137,402, 6,229,997, 6,288,639, and 6,294,992.

In either wired or wireless prior art security systems, additional sensors such as glass breakage sensors or motion sensors are an additional cost beyond a system with only intrusion sensors. Each glass breakage or motion sensor can cost $30 to $50 or more, not counting the labor cost of running wires from the alarm panel to these sensors. In the case of wireless security systems, the glass breakage or motion sensor can also be wireless, but then these sensors suffer from the same drawback as the transmitters used for intrusion sensing—they are battery powered and therefore require periodic servicing to replace the batteries and possible reprogramming in the event of memory loss.

Because existing wireless security systems are not reliable and wired security systems are difficult to install, many homeowners forego self-installation of security systems and either call professionals or do without. It is interesting to note that, based upon the rapid growth of home improvement chains such as Home Depot and Lowe's, there is a large market of do-it-yourself homeowners that will attempt carpentry, plumbing, and tile—but not security. There is, therefore, an established need for a security system that is both reliable and capable of being installed by the average homeowner.

Regardless of whether a present wired or wireless security system has been installed by a security company or self-installed, almost all present security systems are capable of only monitoring the house for intrusion, fire, or smoke. These investments are technology limited to a substantially single purpose. There would be a significant advantage to the homeowner if the security system were also capable of supporting additional home automation and lifestyle enhancing functions. There is, therefore, an apparent need for a security system that is actually a network of devices serving many functions in the home. It is therefore an object of the present invention to provide security system for use in residential and commercial buildings that can be self-installed or installed by professionals at much lower cost than present systems.

Additional objects and advantages of this invention will be apparent from the following detailed description.

BRIEF SUMMARY OF THE INVENTION

To achieve these and other objects, and in view of its purposes, the present invention provides a highly reliable system and method for constructing a security network, or security system, for a building. The invention comprises a network of devices and uses a novel approach to designing base units and transponders to provide the radio link between each of a number of openings and a controller function capable of causing an alert in the event of an intrusion. Some forms of the present invention may also provide cordless telephone functionality and may further be packaged in an embodiment familiar to many end users as a cordless telephone system.

The present invention improves upon the traditional system model and paradigm by providing a security network with reliability exceeding that of existing wireless security systems, at lower cost than either professionally installed hardwired systems or wireless security systems. The present invention also allows self-installation, including incremental expansion, by typical homeowners targeted by the major home improvement and electronics retail chains.

Several new marketing opportunities are created for a security network that are otherwise unavailable in the market today. First, for professional systems sold by major alarm companies, a single customer service representative may sell the network to a homeowner and then install the network in a single visit to the customer's home. This is in contrast to the present model where a salesperson sells the system and then an installer must return at a later date to drill holes, pull wires, and otherwise install the system. Second, there is a product upgrade available for existing systems whereby the scope of security coverage can be increased by adding base units and transponders to an existing control panel. Third, homeowners may purchase the inventive system at a home improvement chain, self-install the system, and contract for alarm monitoring from an alarm services company. The overall system cost is lower, and the alarm services company is not required to underwrite initial installation costs, as is presently done today. Therefore, the alarm services company can offer monitoring services at substantially lower prices. Fourth, a new market for apartment dwellers opens up. Presently, very few security systems are installed in apartments because building owners are unwilling to permit the drilling of holes and installation of permanent systems. Apartment dwellers are also more transient than homeowners and therefore most apartment dwellers and alarm service companies are unwilling to underwrite the cost of these systems anyway. The inventive system is not permanent, nor is drilling holes for hardwiring required. Therefore, an apartment dweller can purchase the inventive security network, use it in one apartment, and then unplug and move the network to another apartment later.

The improvements provided by the present invention are accomplished through the following innovations. The first innovation is the design of a low cost base unit that can cover an area of a house. Rather than rely on the single centrally located transceiver approach of existing unreliable wireless security systems, the present invention allows the placement of multiple base units into multiple rooms and areas for which coverage is desired. The presence of multiple base units within a building provides spatial receiver diversity.

The second innovation is the use of different types of transponders to transmit data from covered openings and sensors. One transponder may use backscatter modulation. Another transponder may use low power RF communications (i.e., an active transmitter).

The third innovation is the permitted use of multiple distributed controller functions in the security network. In the present invention, the controller function can be located within any physical embodiment of a base unit. Therefore, a homeowner or building owner installing multiple base units will also simultaneously be installing multiple controller functions. The controller functions operate in a redundant mode with each other. Therefore, if an intruder discovers and disables a single base unit containing a controller function, the intruder may still be detected by any of the remaining installed base units containing controller functions.

The fourth innovation is the optional inclusion of a glass breakage or motion sensor into the base unit. In many applications, a base unit will likely be installed into multiple rooms of a house. Rather than require a separate glass breakage or motion sensor as in prior art security systems, a form of the base unit includes a glass breakage or motion sensor within the same integrated package, providing a further reduction in overall system cost when compared to prior art systems.

The fifth innovation is the permitted optional use of the traditional public switched telephone network (i.e., PSTN— the standard home phone line), the integrated use of a commercial mobile radio service (CMRS) such as a TDMA, GSM, or CDMA wireless network, or the use of a broadband internet network via Ethernet or WiFi connection for causing an alert at an emergency response agency such as an alarm service company. In particular, the use of a CMRS network provides a higher level of security, and a further ease of installation. The higher level of security results from (i) reduced susceptibility of the security system to cuts in the wires of a PSTN connection, and (ii) optional use of messaging between the security system and an emergency response agency such that any break in the messaging will in itself cause an alert.

The sixth innovation is the incorporation of multi-level architecture into the security network of the present invention. The multi-level meshed security network includes a first level having a plurality of base units, supporting relatively high power RF communications, and a controller function. The second level has a plurality of transponders, supporting relatively low power RF communications, and at least one sensor. Each of the components of the first level can communicate with each other and can communicate with each of the components of the second level. Each of the components of the second level can communicate with each of the components of the first level but cannot communicate with each other.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 13 shows an example embodiment of a wall mounted base unit in approximate proportion to a standard power outlet.

FIG. 23A shows an example security network where various devices are communicating with each other.

FIG. 23B shows an example physical embodiment of a base unit integrated with an outlet.

FIG. 23C shows an example security network in which messages between the end point devices can be passed through intermediate devices.

FIGS. 24A and 24B show one means by which a base unit may be mounted to a plate, and then mounted to an outlet.

FIGS. 25A and 25B show examples of LED generators and LED detectors that may be used as intrusion sensors.

FIG. 26 shows example physical embodiments of a cigarette lighter adaptor for typical use in a vehicle, a remote sounder, and telephone disconnect devices.

DETAILED DESCRIPTION OF THE INVENTION

Figure 1:
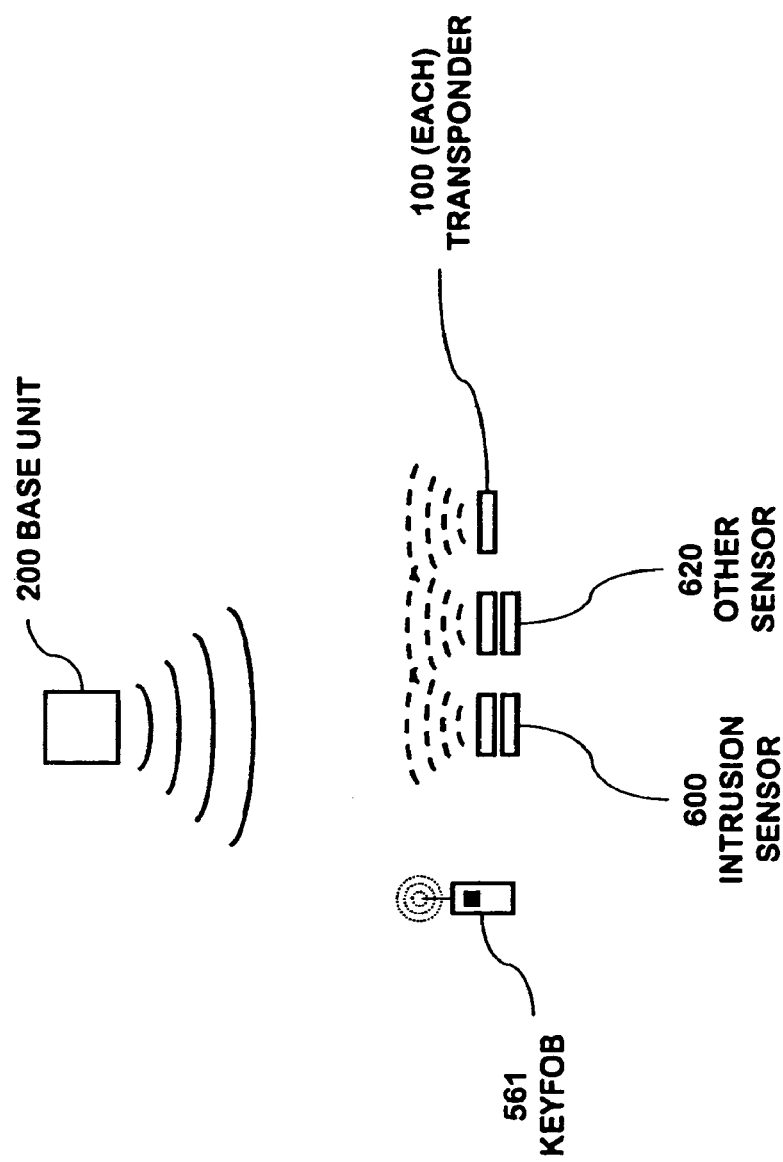
FIG. 1 shows a base unit communicating with transponders.

The present invention is a highly reliable system and method for constructing a security network 400, or security system, for use in a building, such as a commercial building, single or multifamily residence, or apartment. For consistency with the cross referenced applications, the term security system may be used sometimes, though in the context of this present application, the terms security system and security network 400 shall be considered interchangeable as they apply to the present invention. The security network 400 may also be used for buildings that are smaller structures such as sheds, boathouses, other storage facilities, and the like. Throughout this specification, a residential house will be used as an example when describing aspects of the present invention. However, the present invention is equally applicable to other types of buildings. Some forms of the present invention may also provide cordless telephone functionality and may further be packaged in an embodiment familiar to many end users as a cordless telephone system.

The security network 400 described herein is a set of distributed components that together operate to form a system for detecting intrusion and providing other services to a home or building owner. The components are arranged in a two-level architecture, described within this specification as base units 200 and transponders 100. An example security network 400 can be formed with as few as one base unit 200 and one transponder 100, however the security network 400 can also grow to include large numbers of both types of devices.

Base units 200 are distinguished by their support for high power RF communications, meaning that these devices are capable of generating continuous and/or frequent wireless transmissions, typically at power levels of 10 or more milliwatts, and typically operating under FCC rules 47 CFR 15.247 or equivalent. Base units 200 are capable of self-forming a network and communicating with each other over large distances, such as one kilometer or more depending upon exact implementation. Base units 200 will generally be AC powered and/or have rechargeable batteries, although this is not a requirement.

Transponders 100 are distinguished by their more limited communications capability. Transponders 100 support low power RF communications and/or backscatter modulation. Low power RF communications means that these devices are only permitted to transmit intermittent wireless communications, typically at average power levels of less than 10 milliwatts, and typically operating under FCC rules 47 CFR 15.231 or 47 CFR 15.249. Transponders 100 are smaller and less expensive than base units 200 and do not have access to AC power for either operation or battery recharging. This lack of access to AC power is one reason for limiting the communications capability and transmit power level.

A transponder 100 supporting only backscatter modulation may sometimes be termed a passive transponder 150. Passive transponders 150 cannot independently generate wireless transmissions and can only respond to communications from a base unit 200 using backscatter modulation. Passive transponders 150 based only upon backscatter modulation are less expensive, as they do not contain the circuitry to independently generate wireless communications. Passive transponders 150 are either battery powered or obtain their power from the RF transmissions of base units 200. Even with a battery, passive transponders 150 can have a life of ten or more years as their current drain from the battery is extremely low. Because passive transponders 150 cannot independently generate wireless transmissions, they are not explicitly governed by any FCC rules and do not require an equipment authorization.

A security network 400 of the present invention may typically include 4 elements: an intrusion sensor 600, a transponder 100, a base unit 200, and a controller function 250. FIG. 1 shows this example configuration of the security network 400 with a single base unit 200 communicating with several transponders 100, one of which has an associated intrusion sensor 600, one of which has any one of several other sensors 620, and a third which has no sensor. The controller function 250 is logic implemented in firmware or software and runs within one or more base units; it is not shown in the diagram, but in this basic configuration the controller function 250 is contained within the base unit 200.

Figure 6:
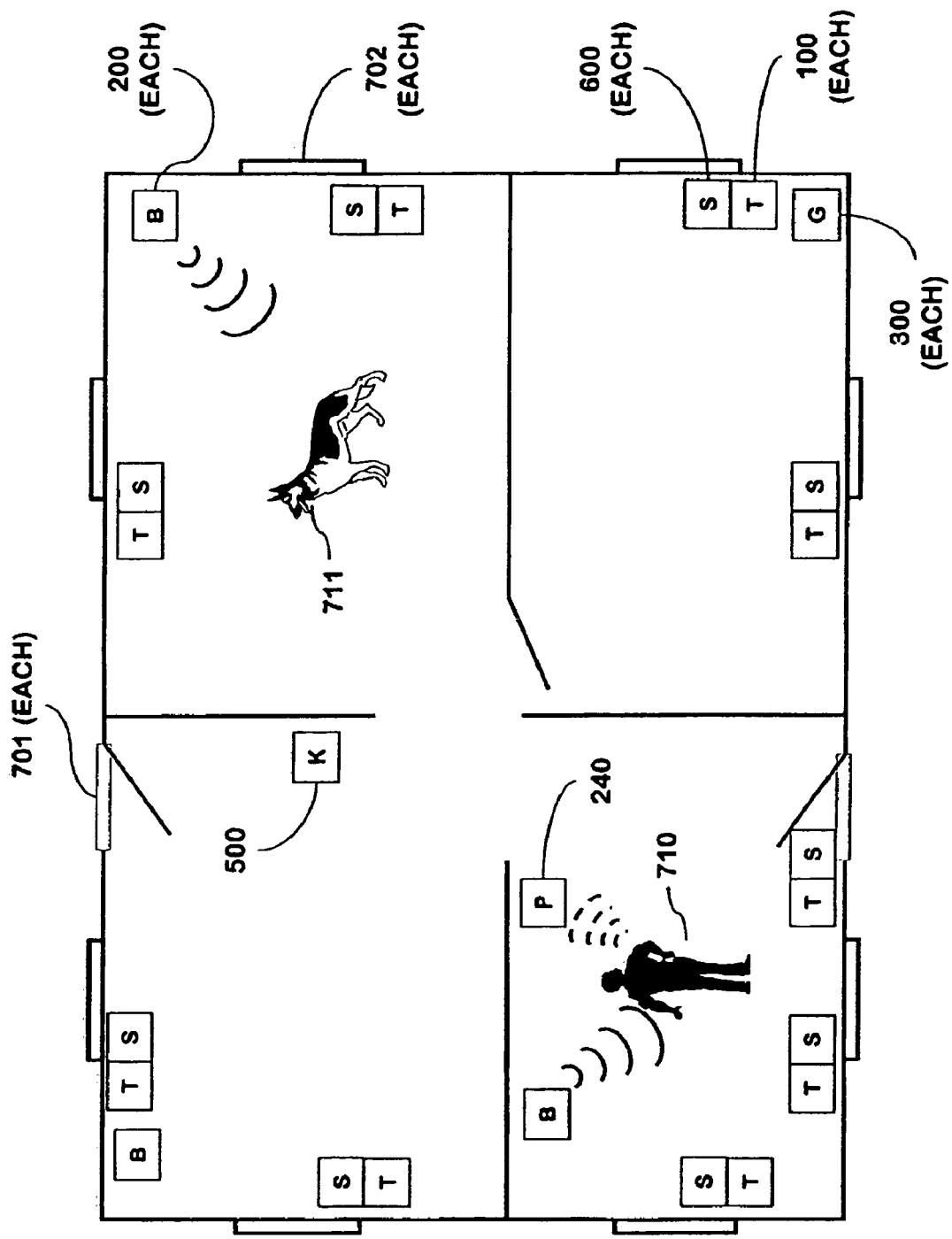
FIG. 6 shows the distributed manner in which the present invention could be installed into an example house.

The security network 400 can be expanded to support multiple base units 200. In addition, the security network 400 can communicate with external networks 410 using a base unit 200 containing a telecommunications interface as shown in FIG. 23A. FIG. 23C shows the means by which multiple base units 200 communicate with each other in the security network 400 by self-forming a network using high power RF communications. In FIG. 23C some of the base units 200 can directly communicate with each other and some pairs of base units 200 can only communicate through one or more intermediate base units. FIG. 6 shows an example of how the logical architecture of FIG. 23C might appear in an example residence.

The security network 400 of the present invention differs significantly from existing products in its highly distributed architecture and two-way communications. Instead of being centered around a single control panel, this invention includes a controller function 250 that can be distributed within and among multiple base units 200. Instead of just unidirectional wireless transmitters on windows 702 and doors 701, this invention can support bidirectional wireless communications between a transponder 100 and base unit 200.

Figure 2:
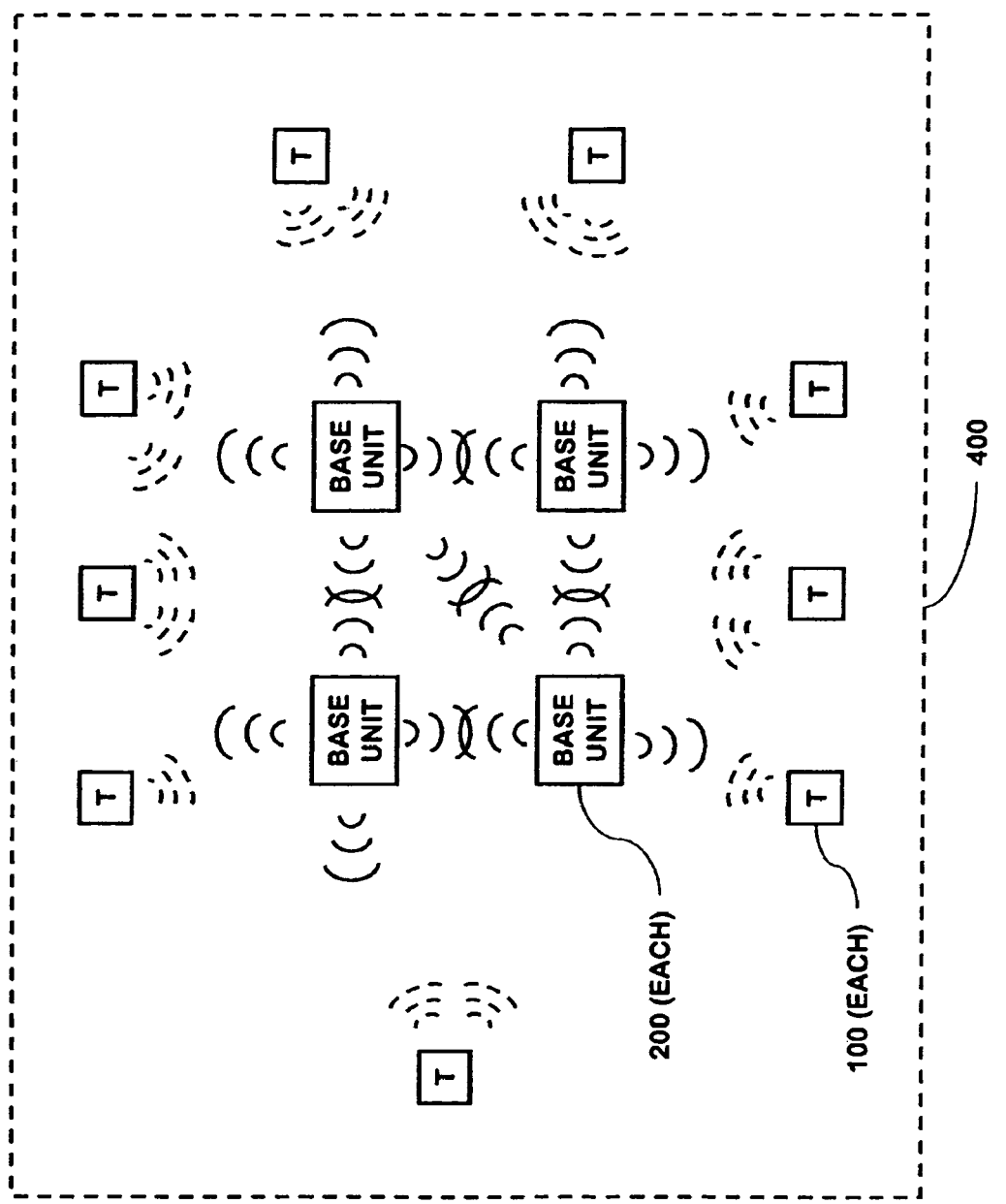
FIG. 2 shows an example security network formed with multiple base units and transponders.
Figure 4:
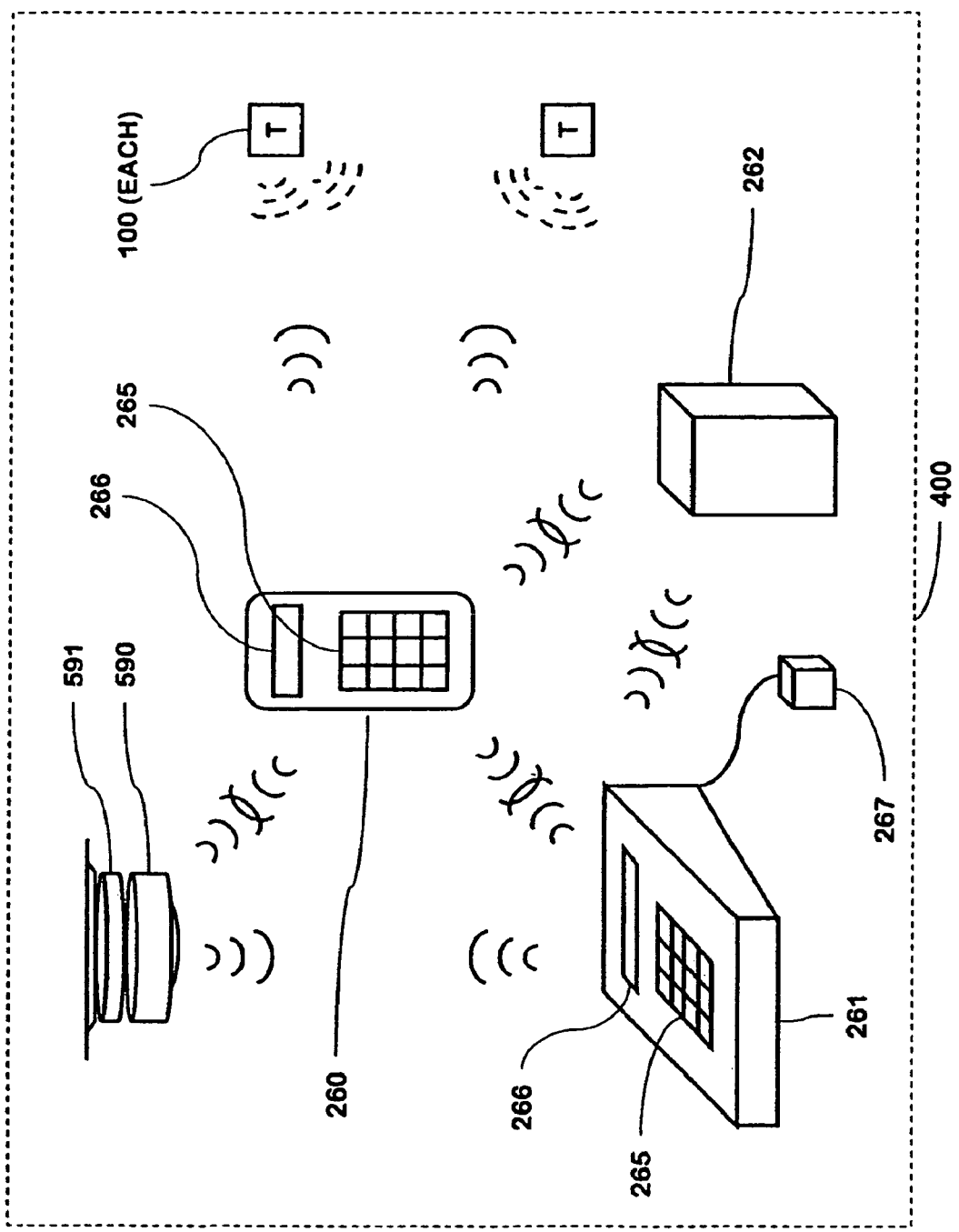
FIG. 4 shows an example security network formed with multiple base units and transponders. Various example physical embodiments of base units are shown.

Base units 200, once installed, form a security network 400 with each other as shown in FIGS. 2 and 4. All of the base units 200 in the security network 400 can become aware of and communicate with each other. As used within the present invention, the term base unit 200 shall apply to a family of devices as shown in FIG. 4. There are two dimensions to consider for base units 200: the physical embodiment and the functional components. Base units 200 can take any one of the following example physical embodiments, among others:

Wall Unit 262;

Tabletop Unit 261, such as that used as a cordless telephone base (i.e., fixed part);

Ceiling Units such as a smoke/fire/carbon monoxide detector 590 or a detector collar 591;

Handheld Unit 260, such as that used as a cordless telephone handset (i.e., portable part).

Examples of the physical form factors are shown in FIGS. 4 and 13. These example form factors are not intended to be limited and other physical form factors are also possible. A wall unit 262 will typically plug into and be mounted onto an outlet 720. This allows the wall unit 262 to be placed anywhere within a room, including unobtrusively behind furniture. A tabletop unit 261 will typically be of a form factor and aesthetic design that allows the unit to sit on a counter or table top and obtain power from a transformer 267 plugged into a nearby outlet, similar to the base of a cordless telephone system. A ceiling unit will typically be in the form factor of a smoke detector 590 or smoke detector collar 591, and obtain power from the AC power connections to the smoke detector. A handheld unit 260 will typically be in the form factor of a handheld cordless telephone with a rechargeable battery.

Figure 3:
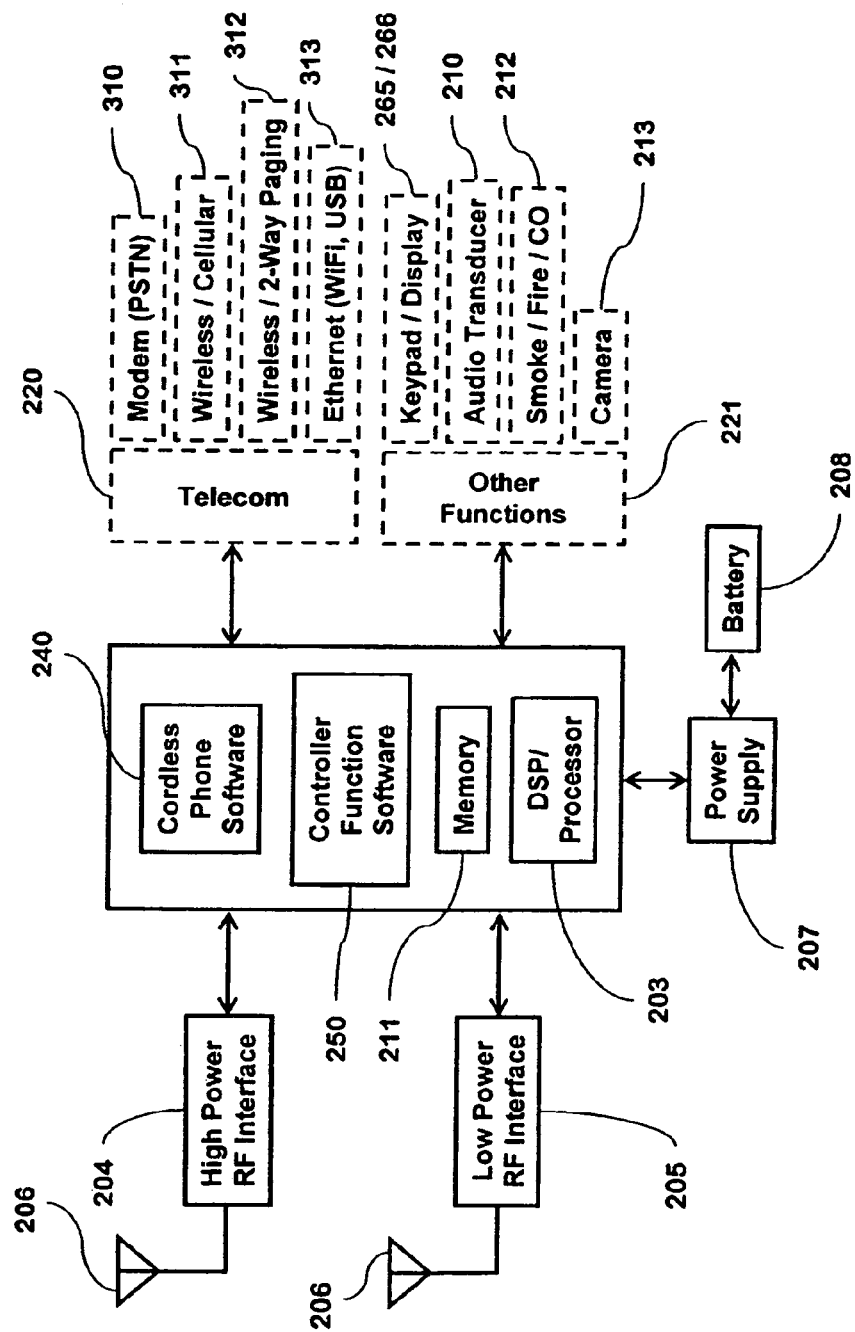
FIG. 3 shows an architecture of the base unit.

As shown in FIG. 3, base units 200 can include any of the following example functional components:

Transceiver for high power RF communications 204;
Receiver or transceiver for low power RF communications 205;
Processor 203;
Memory (volatile and/or non-volatile) 211;
Power supply (AC, rechargeable or non-rechargeable battery) 207 and 208;
Antenna system (antenna and interface circuits) 206;
Controller function software 250;
Cordless phone software 240;
Telecommunications interface 220 (example types are shown);
Other functions 221 (example types following);
Keypad interface 265;
Display 266;
Acoustic or audio transducer 210;
Camera 213; and
Smoke/fire/CO detector interface 212.

Every base unit 200 requires a transceiver for high power RF communications 204, a processor 203, memory 211, at least one form of power supply 207, and an antenna system 206. Every base unit 200 is capable of forming a network with other base units 200.

Any base unit 200 may further include the controller function 250 software. Some base units 200 may not include a controller function 250; this may be because that particular base unit 200 is of a form factor or at a physical location for which it would not be desirable for that base unit 200 to contain controller function 250 software. Within any one security network 400, and at any one particular time, there will generally be only one base unit 200 whose controller function has been assigned to be the master controller for that security network 400. All other controller functions 250 within other base units 200 will generally be slaved to the master controller 251. The base unit 200 whose controller function 250 is presently the master controller 251 may sometimes be termed the master controller 251.

A base unit 200 that includes a telecom interface 220 may sometimes be termed a gateway 300. The gateway 300 may use any of several example means for its telecom interface 220, including a modem 310 for connection to a PSTN 403, an Ethernet or WiFi or USB interface 313 for connection to a private or public computer network such as the internet 405, or a CDMA or GSM or TDMA 311 or two-way paging interface 312 for connection to a radio network such as a CMRS 402. For convenience, the term gateway 300 may be preceded by an identifier describing the type of telecom interface within the gateway 300. Therefore, a WiFi gateway 520 refers to a gateway 300 containing a WiFi telecom interface 313. It is important to note that the term gateway 300 refers to the functional capability of a base unit 200 that includes a telecom interface 220; the term does not necessarily refer to any particular physical embodiment. For example, both a wall unit 262 and a tabletop unit 261 may functionally operate as a gateway 300.

Figure 5:
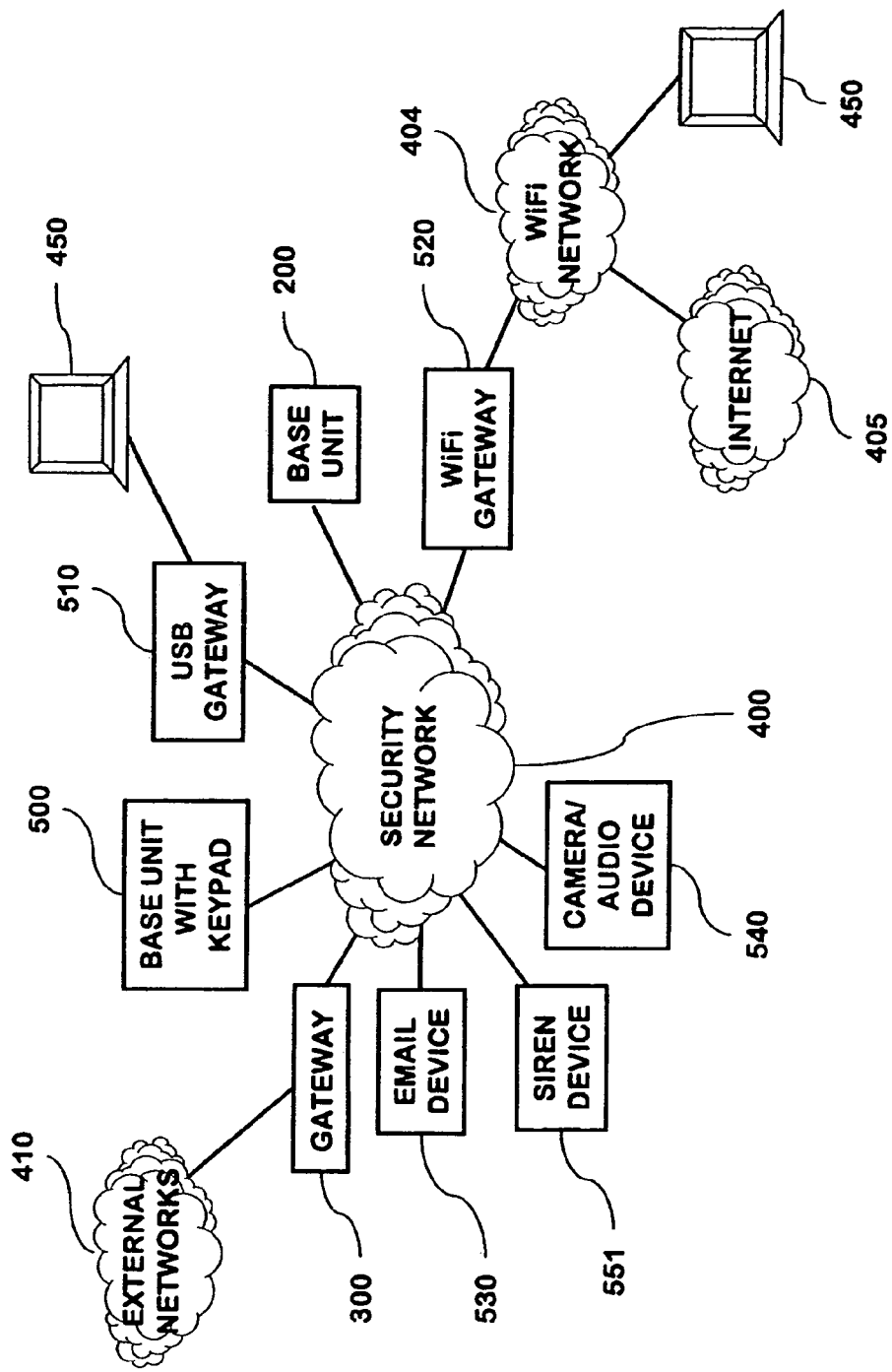
FIG. 5 shows a generalized network architecture of the security network. Various example forms of base units are shown, where some base units have included optional functionality.

FIG. 5 shows various examples of base units 200 with various added functional components that can be contained and communicate within a security network 400. As can be further seen in FIG. 5, different example gateways 300 show how the security network 400 can also communicate to networks and systems external to the security network 400.

A keypad 265 may be added to a base unit 200, forming a combination base unit with keypad 500, to provide one method for user interface. A gateway 300 can be provided to enable communications between the security network 400 and external networks 410 such as, for example, a security monitoring company 460. The gateway 300 may also convert protocols between the security network 400 and a WiFi network 404 or a USB port of a computer 450. A siren driver 551 may be added to a base unit 200 to provide loud noise-making capability. An email terminal 530 can be added to a base unit 200 to initiate and receive messages to/from external networks 410 and via a gateway 300. Other sensors 620 may be added to detect fire, smoke, heat, water, temperature, vibration, motion, as well as other measurable events or items. A camera and/or audio terminal 540 may be added to a base unit 200 to enable remote monitoring via a gateway 300. A keyfob 561 may be added to enable wireless function control of the security network 400. This list of devices that can be added is not intended to be exhaustive, and other types can also be created and added as well.

The distributed nature of the security network 400 is shown in the example layout in FIG. 6 for a small house. At each opening in the house, such as windows 702 and doors 701, for which monitoring is desired, an intrusion sensor 600 and transponder 100 are mounted. While identified separately, the intrusion sensor 600 and transponder 100 may be physically integrated into the same physical package. In a pattern determined by the layout of the house or building into which the security network 400 is to be installed, one or more base units 200 are mounted. Each base unit 200 is in wireless communications with one or more transponders 100. Each base unit 200 is also in communications with one or more other base units 200, each of which may contain a controller function 250. In general, each base unit 200 is responsible for the transponders 100 in a predetermined communications range of each base unit 200. As is well understood to those skilled in the art, the range of wireless communications is dependent, in part, upon many environmental factors in addition to the specific design parameters of the base units 200 and transponders 100.

According to U.S. Census Bureau statistics, the median size of one-family houses has ranged from 1,900 to 2,100 square feet (176 to 195 square meters) in the last ten years, with approximately two-thirds under 2,400 square feet (223 square meters). This implies typical rooms in the house of 13 to 20 square meters, with typical wall lengths in each room ranging from 3 to 6 meters. It is likely in many residential homes that most installed base units 200 will be able to communicate with transponders 100 in multiple rooms. Therefore, in many cases with this system it will be possible to install fewer base units 200 than major rooms in a building, creating a security network 400 with excellent spatial antenna diversity as well as redundancy in the event of single component failure.

Base units 200 will typically communicate with other base units 200 as well as passive transponders 150 using frequencies in one or more of the following unlicensed frequency bands: 902 to 928 MHz, 2435 to 2465 MHz, 2400 to 2483 MHz, or 5725 to 5850 MHz. These bands permit the use of unlicensed secondary transmitters, and are part of the bands that have become popular for the development of cordless phones and wireless LAN networks, thereby leading to the wide availability of many low cost components. Three of the FCC rule sets applicable to the present invention will be discussed briefly.

Transmissions regulated by FCC rules 47 CFR 15.245 permit field disturbance sensors with field strengths of up to 500 mV/m at 3 meters (measured using an average detector function; the peak emission limit may be up to 20 dB higher). This implies an averaged transmission power of 75 mW and a peak transmission power of up to 7.5 Watts.

Furthermore, transmissions under these rules do not suffer the same duty cycle constraints as existing wireless security system transmitters operating under 47 CFR 15.231(a). This rule section would only apply when a base unit 200 is communicating with a passive transponder 150 using backscatter modulation, which qualifies the base unit 200 as a field disturbance sensor. Prior art wireless security system transmitters are not field disturbance sensors.

Transmissions regulated by FCC rules 47 CFR 15.247 permit frequency hopping (FHSS) or digital modulation (DM) systems at transmission powers up to 1 Watt into a 6 dBi antenna, which results in a permitted 4 Watt directional transmission. In order for a FHSS device to take advantage of the full permitted power, the FHSS device must frequency hop at least once every 400 milliseconds.

Transmissions regulated by FCC rules 47 CFR 15.249 permit field strengths of up to 50 mV/m at 3 meters (measured using an average detector function; the peak emission limit may be up to 20 dB higher). This implies an averaged transmission power of 750 μW and a peak transmission power of up to 75 mW. Unlike 47 CFR 15.247, rule section 47 CFR 15.249 does not specify modulation type or frequency hopping.

Most other products using these unlicensed bands are other transient transmitters operating under 47 CFR 15.247 and 47 CFR 15.249, and so even though it may seem that many products are available and in use in these bands, in reality there remains a lot of available space in the band at any one instant in time, especially in residential homes. Most transmitters operating under 47 CFR 15.247 are frequency hopping systems whereby the given spectrum is divided into channels of a specified bandwidth, and each transmitter can occupy a given channel for only 400 milliseconds. Therefore, even if interference occurs, the time period of the interference is brief. In most cases, the base units 200 can operate without incurring interference or certainly without significant interference. In residential homes, the most common products using these bands are cordless telephones, for which there are no standards (other than the 47 CFR 15.247 requirements). Each phone manufacturer uses its own modulation and protocol format. For data devices, there are several well-known standards that use the 2400 to 2483 MHz band, such as 802.11, 802.11b (WiFi), Bluetooth, ZigBee (HomeRF-lite), and IEEE 802.15.4, among others.

The present invention has a substantial advantage for the aforementioned products in that many of the physical embodiments of the base units 200 are fixed. Other products such as cordless phones and various data devices usually have at least one handheld, usually battery powered, component. The FCC's Maximum Permitted Exposure (MPE) guidelines, described in OET 65, generally cause manufacturers to limit transmission power of handheld devices to 100 mW or less. Since most wireless links are symmetrical, once the handheld device (such as the cordless phone) is power limited, any fixed unit (such as the cordless base unit) is also limited in power to match the handheld device. Given that many of the physical embodiments of the base units 200 of the security network 400 are not handheld, they can use the full power permitted by the FCC rules and still meet the MPE guidelines.

As discussed earlier, the preferred means of communications by and between base units 200 is high power RF communications. The invention is not limiting, and modulation formats and protocols using either FHSS or DM can be employed. As one example, the high power RF communications can use Gaussian Frequency Shift Keyed (GFSK) modulation with FHSS. This particular modulation format has already been used quite successfully and inexpensively for Bluetooth, 802.11, and other data systems to achieve raw data rates on the order of 1 Mbps. In order to take maximum advantage of the permitted power limits in, for example, the 2400 to 2483 MHz band, if a FHSS protocol is chosen, GFSK or otherwise, at least 75 hopping channels should be used and if a DM protocol is chosen, a minimum 6 dB bandwidth of 500 KHz should be used. Any designer of a security network 400 under this invention can take advantage of the fixed nature of the base units 200 as well as the relatively low information rate requirements to select a modulation format and protocol with high link margins.

One approach that a designer may consider is a multi-rate design wherein the high power RF communications uses different data rates for different types of data. For example, the day to day management of the security network 400 may involve a low volume of commands and messages. The link margins can be improved by implementing a lower data rate. Certain base units, such as those including a camera 213, may have high rate requirements that are only required when actually transferring a picture. Therefore, it is possible to design a protocol where the link runs at a higher rate for certain transfers (i.e., pictures) and a lower rate for normal communications. It should be noted that most other products in these bands have at least one mobile component and high data rates are required. Therefore, in spite of the presence of other products, the high power RF communications used in the security network 400 should achieve higher reliability and range, and lower susceptibility to interference than other collocated products.

Figure 27:
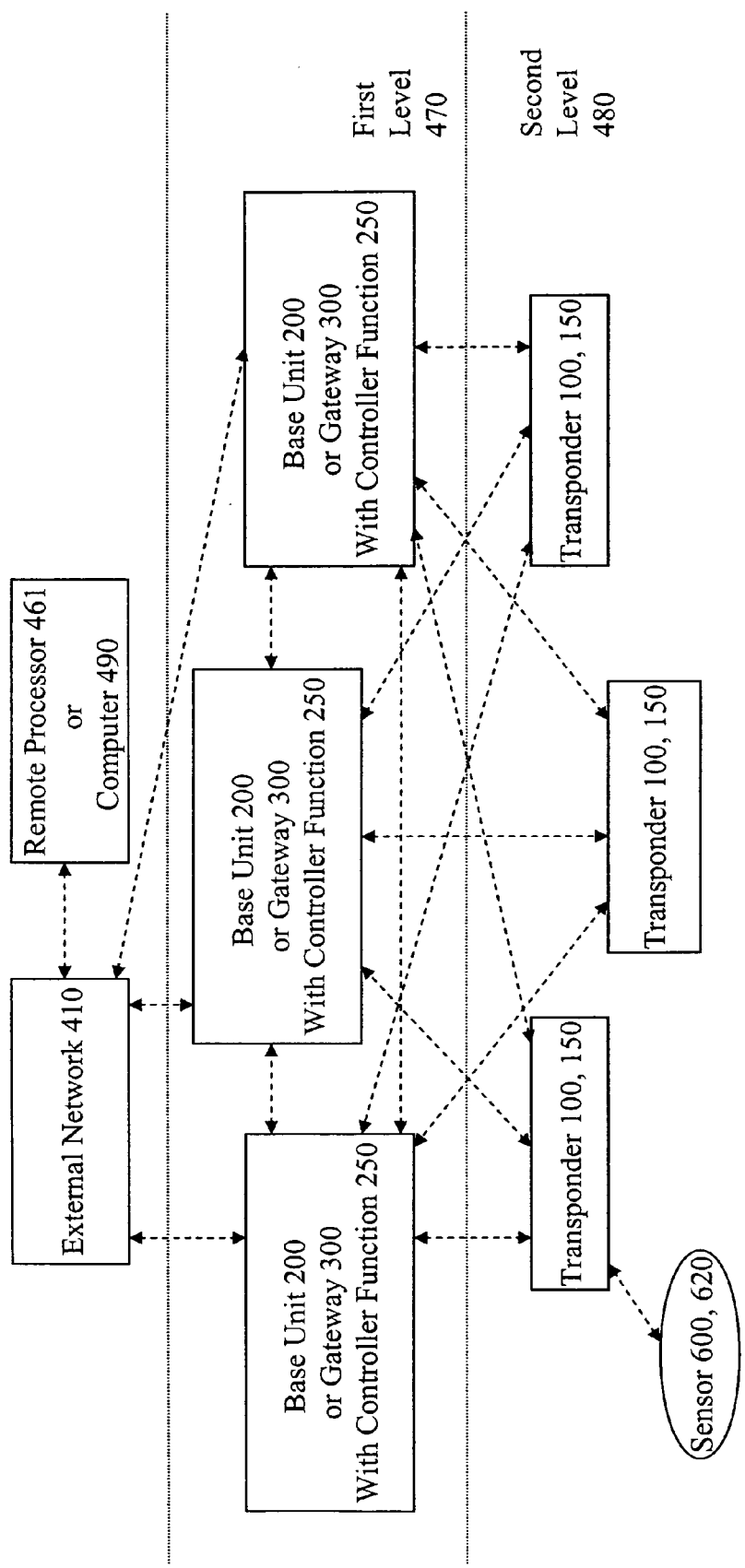
FIG. 27 is a schematic of an example security network illustrating two-level mesh architecture.

As noted above, the security network 400 of the present invention may typically include four elements: an intrusion sensor 600 or other sensor 620, a transponder 100, a base unit 200, and a controller function 250. The security network 400 is a set of distributed components arranged in a two-level architecture. As illustrated in FIG. 27, the base units 200 (which are gateways 300 when they include a telecommunications interface) and controller function 250 are located in the first level 470 of the two levels; the transponders 100 and intrusion sensors 600 (or other sensors 620) are located in the second level 480 of the two levels. Other components, each of which can be viewed as one physical embodiment of a base unit 200, that may be included within the first level 470 are handheld units 260, a tabletop unit 261 (such as a cordless telephone base), a wall unit 262, a ceiling unit 590 or 591, and a console or other unit having the controller function 250. Any one or more of the components of the first level 470 can communicate with an Ethernet 401, a CMRS 402, a PSTN 403, a WiFi network 404, a private or public computer network such as the Internet 405, a telephone line 431, a local telephony device 455, or any other external recipient (and provider) of information from (and to) the security network 400 such as an external network 410. Each component of the first level 470 can communicate with the same or different external network 410. See FIG. 5.

The components of the first level 470, including the base units 200, are distinguished by their support for high power RF communications. These components are capable of generating continuous and/or frequent wireless transmissions, typically at power levels of 10 or more milliwatts, and typically operating under FCC rules 47 CFR 15.247 or equivalent. These components of the first level 470 are capable of self-forming a network and communicating with each other over large distances, such as 100 meters or more depending upon exact implementation. Although not a requirement, the components of the first level 470 will generally be AC powered and/or have rechargeable batteries.

The transponders 100 and intrusion sensors 600 or other sensors 620 of the second level 480 are distinguished by their support for low power RF communications. Low power RF communications mean that these components are only permitted to transmit intermittent wireless communications, typically at average power levels of less than 10 milliwatts, and typically operating under FCC rules 47 CFR 15.231 or 47 CFR 15.249. Transponders 100 are smaller and less expensive than base units 200 and do not have access to AC power for either operation or battery recharging. This lack of access to AC power is one reason for limiting the communications capability and the transmit power level. Although identified separately, the intrusion sensor 600 or other sensor 620 and the transponder 100 may be physically integrated into the same physical package.

Each base unit 200 is in wireless communications with one or more transponders 100. Each base unit 200 is also in communication with one or more other base units 200, each of which may contain a controller function 250. Thus, the two-level architecture of the security network 400 constitutes a two-level mesh network in which any component on either level can communicate with any other component on the other level. As illustrated in FIG. 27, a large number of communication paths are inherent in the security network 400, creating a helpful redundancy that fosters safety. The security network 400 includes two, separate forms of communication: high power and low power.

The transponders 100 of the second level 480 are configured so that they do not communicate with each other, but only with the components of the first level 470. Such a configuration reduces the cost of each transponder 100 and is illustrated in FIG. 27. The transponders 100 do communicate, however, with one or more of the other components of the first level 470.

The present invention can further be integrated with computer-implemented processes and apparatus for practicing such processes. Thus, for example, the security network 400 of the present invention may include a computer 490 having computer program code embodied in tangible media, such as floppy diskettes, fixed (hard) drives, CD ROM's, magnetic tape, fixed/integrated circuit devices, or any other computer-readable storage medium. When the computer program code is loaded into and executed by the computer 490, the computer 490 becomes an apparatus for downloading, uploading, or editing the configuration stored in the controller functions 250; for monitoring the status of each of the other components of the security network 400; and for facilitating communications between and among those components.

Figure 10:
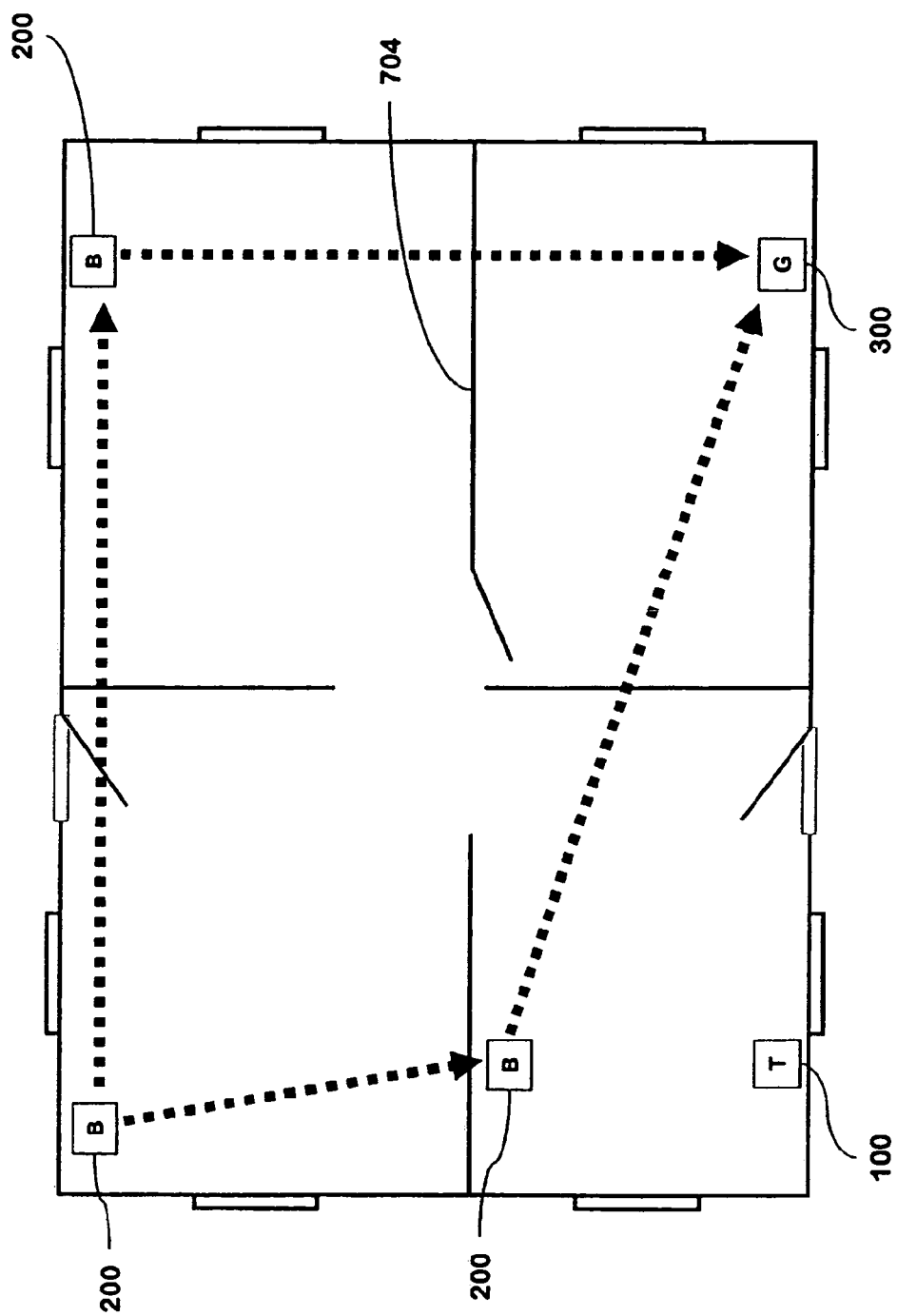
FIG. 10 shows an example layout of a house with multiple base units, and the manner in which the base units may form a network to use wireless communications to reach a gateway.

When using high power RF communications, the base units 200 function as a network of nodes. A message originating on one base unit 200 may pass through intermediate base units 200 before terminating on the destination base unit, as shown in FIGS. 23C and 10. The base units 200 determine their own network topology based upon the ability of each base unit 200 to reliably transmit and/or receive the transmissions to/from other base units. As discussed herein, the antennas 206 used in these base units 200 may be directional, and therefore it is not always certain that each base unit 200 can directly transmit to and receive from every other base unit 200. However, given the power limits and expected distribution of devices in typical homes and buildings, it can be generally expected that each base unit 200 can communicate with at least one other base unit, and that the base units 200 can then form for themselves a network that enables the routing of a message from any one base unit 200 to any other base unit 200. Networking protocols are well understood in the art and therefore not covered here. The base units 200 described herein typically may use a unique (at least within the home and neighbor security networks 400) originating and destination address of each base unit 200 in the header of each message sent in routing messages within the security network 400.

While the base units 200 use 47 CFR 15.247 rules for their high power RF communications with each other, the base units 200 can use both 47 CFR 15.245 and 47 CFR 15.247 rules for their wireless communications with passive transponders 150. Thus, the base units 200 can communicate to the transponders using one protocol, at a maximum power of 4 W for any length of time, and then switch to a second protocol, if desired, at a maximum power of 7.5 W to obtain a response from a passive transponder 150. While the base unit 200 can transmit at 7.5 W for only 1 ms under 47 CFR 15.245, that time period is more than enough to obtain tens or hundreds of bits of data from a transponder 100. The extra permitted 2.7 dB of power under 47 CFR 15.245 is useful for increasing the range of the base unit 200. In a related function, the base unit 200 can use the longer transmission times at 4 W to deliver power to the transponders 100, as described elsewhere, and reserve the brief bursts at 7.5 W only for data transfer.

Each base unit 200 typically receives communications from one or more passive transponders 150 using modulated backscatter techniques. To use modulated backscatter, a base unit 200 transmits a wireless signal to a passive transponder 150. The passive transponder 150 modulates the impedance of its antenna, thereby altering reflections of the wireless signal off its antenna. The base unit 200 then detects the changes in reflected signal. The impedance changes are made using a predetermined rate whose frequency can be measured by the base unit 200 to distinguish data bits.

These techniques are very well understood by those skilled in the art, and have been well discussed in a plethora of literature including patent specifications, trade publications, marketing materials, and the like. For example, the reader is directed to RFID Handbook; Radio-Frequency Identification: Fundamentals And Applications, by Klaus Finkenzeller, published by John Wiley, 1999. U.S. Pat. No. 6,147,605, issued to Vega et al., provides additional material on the design and theory of modulated backscatter techniques. U.S. Pat. No. 6,549,064, issued to Shanks et al., also provides material on the design and theory of modulated backscatter techniques. Therefore, this same material is not covered here. Presently, a number of companies produce miniaturized chipsets, components, and antennas for base units 200 and transponders. Many of these chipsets, though designed for the 13.56 MHz band, are applicable and/or will be available in the higher bands such as those discussed here. For example, Hitachi has recently announced the manufacture of its mu-chip, which is a 2.4 GHz transponder 100 measuring only 0.4 mm square. The most important point here is that the wide availability of parts permits the designer many options in choosing the specific design parameters of the base unit 200 and passive transponder 150 and therefore the innovative nature of this invention is not limited to any specific circuit design implementing the wireless link between the base unit 200 and passive transponder 150.

The extensive literature on backscatter modulation techniques and the wide availability of parts does not detract from the innovative application and combination of these techniques and parts to the present invention. Most applications of backscatter modulation have been applied to mobile people, animals, or things that must be authorized, tracked, counted, or billed. No one has previously considered the novel application of low cost backscatter modulation components to solve the problem of monitoring fixed assets such as the windows 702 and doors 701 that comprise the openings of buildings or other sensors 600 and 620. All present transmitters constructed for prior art wireless security systems are more expensive than the backscatter modulation-based design of the present invention because of the additional components required for active transmission. Furthermore, no one has considered the use of multiple, distributed low cost base units 200 with overlapping coverage so that a building's security is not dependent on a single, vulnerable, and historically unreliable central transceiver.

There are several examples of the advantages that the present backscatter modulation approach offers versus prior art wireless security systems. Prior art wireless security systems limit status reporting by transmitters to times even longer than the FCC restriction of once per hour in order to conserve the battery in the transmitter. The backscatter modulation approach herein does not have the same battery limitation because of the modulated backscatter design. Prior art wireless security systems are subject to both false positive and false negative indications because centrally located transceivers have difficulty distinguishing noise from real signals. The central transceiver has little control over the time of transmission by a transmitter and therefore must evaluate every signal, whether noise, interference, or real transmission. This is made more difficult because the prior art central transceivers are not always located centrally in the house. Professional installers generally hide these central transceivers in a closet or similar enclosure to prevent an intruder from easily spotting the central transceiver and disabling it. Each wall or door through which signals must pass to reach a central transceiver can typically cause a loss of up to 10 dB in signal power. In contrast, the backscatter modulation approach places all of the transmission control in the master controller 251 and base unit 200. The base unit 200 only looks for a return response during a read. Therefore the base unit 200 can be simpler in design.

Some centralized transceivers attempt to use diversity antennas to improve their reliability; however, these antennas are separated only by the width of the packaging, which is frequently much less than one wavelength of the chosen frequency (i.e., 87 cm at 345 MHz and 69 cm at 433 MHz). As is well known to those skilled in the art of wireless, spatial diversity of antennas works best when the antennas are separated by more than one wavelength at the chosen frequency. With the present invention, base units 200 are separated into multiple rooms, creating excellent spatial diversity and the ability to overcome environmental effects such as multipath and signal blockage. Multipath and signal blockage are effects of the RF path between any transmitter and receiver. Most cellular systems use diversity antennas separated by multiple wavelengths to help overcome the effects of multipath and signal blockage. Under the present invention, in most installations there will be multiple base units 200 in a building. There will therefore be an independent RF path between each base unit 200 and each transponder 100. The master controller 251 may sequence transmissions from the base units 200 so that only one base unit 200 is transmitting at a time. Besides reducing the potential for interference, this allows the other base units 200 to listen to both the transmitting base unit 200 and the subsequent response from the transponders. If the RF path between the transmitting base unit 200 and the transponder 100 is subject to some form of multipath or signal blockage, it is possible and even highly probable that one of the remaining base units 200 is capable of detecting and interpreting the signal. If the transmitting base unit 200 is having trouble receiving an adequate response from a particular transponder 100, the master controller 251 may then poll the remaining base units 200 to determine whether the response was received by any of them.

One major design advantage of the present invention versus all other applications of backscatter modulation is the fixed and static relationship between each base unit 200 and the transponders. While RFID readers for other applications must include the complexity to deal with many simultaneous tags in the read zone, tags moving rapidly, or tags only briefly in the read zone, the present invention can take advantage of controlled static relationship in the following ways.

While there may be multiple transponders 100 in the read zone of each base unit, the base unit 200 can poll each transponder 100 individually, preventing collisions or interference. In addition, because each transponder 100 is responding individually, the base unit 200 can use the expected response bit sequence to improve the receive processing gain. A specific transponder 100 is responding at a specific time, and at least a portion of the response will contain bits in a predetermined sequence.

Because the transponders 100 are fixed, the base unit 200 can use longer integration times in its signal processing to increase the reliability of the read signal, permitting successful reading at longer distances and lower power when compared with backscatter modulation applications with mobile tags.

Furthermore, the base unit 200 can make changes in specific frequency while remaining within the specified unlicensed frequency band, in an attempt to find, for each transponder 100, an optimal center frequency, given the manufacturing tolerances of the components in each transponder 100 and any environment effects that may be creating more absorption or reflection at a particular frequency. In a similar manner, the base unit 200 can learn the center frequencies of the marking and spacing bits modulated by each transponder 100. While these center frequencies may be nominally known and designed into the transponder 100, there is likely a significant probability that the manufacturing process will result in a variation of actual modulation frequencies. By matching its demodulation process to each transponder 100, the base unit 200 can improve its signal processing margin.

Because the multiple base units 200 are controlled from a single master controller 251, the controller function 250 can sequence the base units 200 in time so that the base units 200 do not interfere with each other.

Because there will typically be multiple base units 200 installed in each home, apartment, or other building, the controller function 250 can use the excellent spatial diversity created by the distributed nature of the base units 200 to increase and improve the reliability of each reading operation. That is, one base unit 200 can initiate the transmission sequence, but multiple base units 200 can tune and read the response from the transponder 100. Thus the multiple base units 200 can operate as a network of receivers to demodulate and interpret the response from the transponder 100.

Because the transponders 100 are typically static, and because the events (such as intrusion) that affect the status of the sensors connected to transponders 100 are relatively slow compared to the speed of electronics in the base units, the base units 200 have the opportunity to pick and choose moments of low quiescent interference from other products in which to perform their reading operations with maximum signal to noise ratio potential—all without missing the events themselves.

Because the path lengths and path loss from each transponder 100 to the base unit 200 are relatively static, the base unit 200 can use different power levels when communicating with each transponder 100. Lower path losses require lower power to communicate; conversely the base unit 200 can step up the power, within the specified limits of the FCC rules, to compensate for higher path losses. The base unit 200 can determine the lowest power level to use for each transponder 100 by sequentially stepping down its transmit power on successive reading operations until no return signal can be detected. Then the power level can be increased one or two incremental levels. This determined level can then be used for successive reading operations. This use of the lowest necessary power level for each transponder 100 can help reduce the possibility of interference while ensuring that each transponder 100 can always be read.

Finally, for the same static relationship reasons, the master controller 251 and base units 200 can determine and store the typical characteristics of transmission between each transponder 100 and each base unit 200 (such as signal power, signal to noise ratio, turn on time, modulation bit time, etc.), and determine from any change in the characteristics of transmission whether a potential problem exists. Thus, the base unit 200 can immediately detect attempts to tamper with the transponder 100, such as partial or full shielding, deformation, destruction, or removal.

By taking advantage of the foregoing techniques, the base unit 200 of the present invention can support a wireless range of up to 30 meters when communicating with passive transponders 150, depending upon the building construction materials, placement of each base unit 200 in a room, and the furniture and other materials in the room which may have certain reflective or absorptive properties. This range is more than sufficient for the majority of homes and other buildings in the target market of the present security network 400.

Base units 200 may include receivers or transceivers 205 in order to communicate with transponders 100 using low power RF communications. Transponders 100 using low power RF communications will typically transmit using the 300 to 500 MHz band and will typically be operating under FCC rule 47 CFR 15.231. In particular, frequencies at or near 315, 319, 345, and 434 MHz have been historically favored for low power RF transmitters and many components are available for constructing transponders 100 that operate at these frequencies. As discussed earlier, prior art wireless security systems suffer from limitations caused by the low power and intermittent nature of the transmissions from transponders operating under this rule section, coupled with the central receiver architecture of these prior art systems.

The present invention has a number of design advantages over prior art wireless security systems, even when using transponders 100 operating under the limitations of FCC rule 47 CFR 15.231. The following advantages apply for a security network 400 wherein the base units 200 include receivers or transceivers in order to communicate with transponders 100 using low power RF communications.

Figure 21:
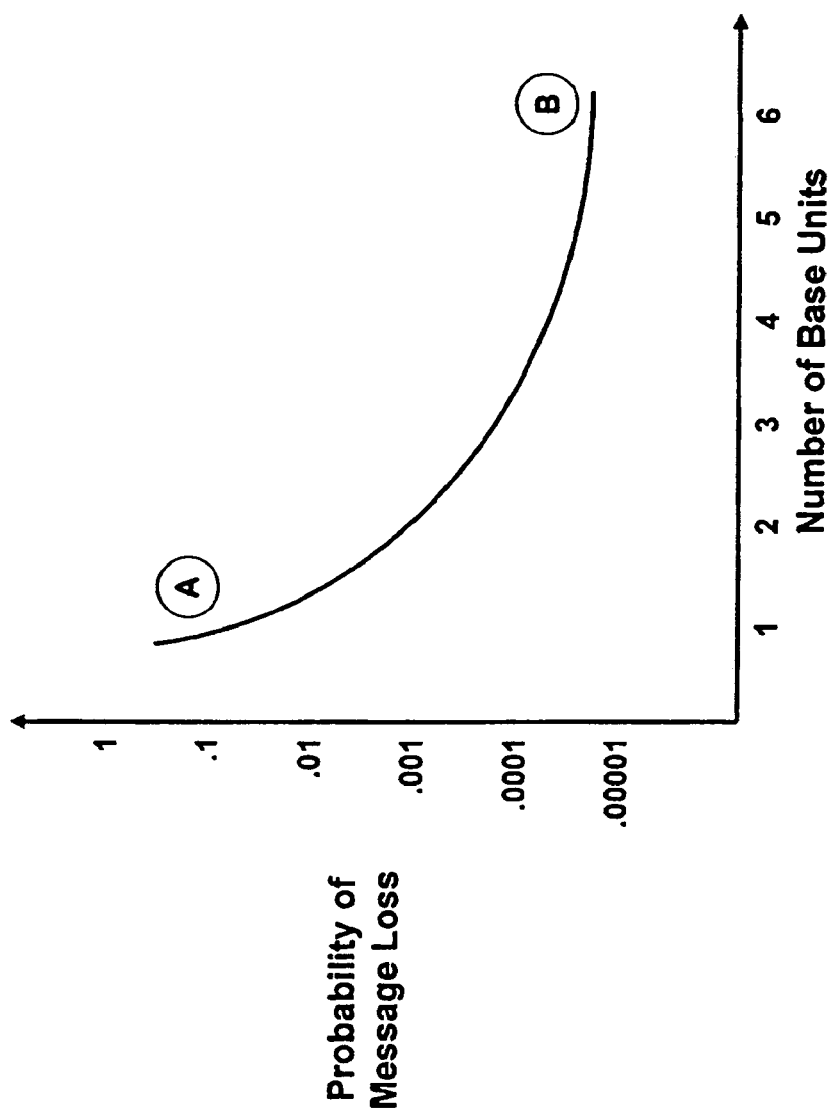
FIG. 21 shows a typical statistical relationship between the number of base units in a security network and the probability of any one message being lost (i.e., not received). The exact shape of the curve and values on the axes are dependent upon a specific installation in a specific building.

The security network 400 permits the installation of multiple base units 200. These base units 200 can be installed in various rooms of a building, in a neighboring building, or in a nearby outbuilding. The base units 200 in the security network 400 form a spatially diverse network of receivers or transceivers. This spatial diversity provides a significant increase in reliability when compared with the limited antenna diversity of prior art wireless security systems. FIG. 21 shows an example curve relating the number of base units 200 (in the present invention base units 200 contain the receivers receiving communications from transponders 100; in prior art systems other terms may be used for the wireless receivers) to the probability of message loss in the security network 400. It can be seen that increasing the number of receivers, especially in a spatially diverse manner, dramatically decreases the probability of message loss. Prior art systems will generally experience losses in the vicinity of point A in FIG. 21, while the security network 400 can easily operate in the vicinity of point B.

The RF propagation path from each transponder 100 to each base unit 200 is statistically independent, therefore even if signal blockage, interference, or multipath is affecting one RF propagation path, there will be a statistically high probability that the other RF propagation paths will not be simultaneously experiencing the same problem. Furthermore, there will be a different path length from each transponder 100 to each base unit, increasing the likelihood that at least one base unit 200 can receive a message transmitted by a transponder 100 with sufficient signal to noise. Each base unit 200 will attempt to receive and demodulate the intended transponder 100 message, creating a base unit-specific version of the message. Furthermore, each base unit 200 may determine certain quality factors associated with its version of the message. These quality factors may be based upon received signal strength, received signal to noise or signal to interference ratios, received errors or error detection/recovery codes, or other similar factors. The versions may differ somewhat based upon the problems that may have been experienced on each RF propagation path from the transponder 100 to each base unit 200. Each base unit 200 may use high power RF communications to send its base unit-specific version of the message that it received from a transponder 100 to a controller function 250, and the controller function 250 may compare portions of the different base unit-specific versions of the transponder 100 message in order to determine the most likely correct version of the intended transponder 100 message. If necessary, the controller function 250 can combine portions of multiple base unit-specific versions of the message together in order to form or reconstruct the intended transponder 100 message.

Base units 200 belonging to different security networks 400 may be within wireless communications range of each other. For example, two neighboring homes or buildings may each have a security network 400 installed. A base unit 200 in a first security network 400 in a first residence 740 in FIG. 17 may receive low power RF communications from a transponder 100 in a second security network 400 in a second residence 741 in FIG. 17. The base unit 200 in the first security network 400 may be configured to use high power RF communications to send its version of the message that the first base unit 200 received from the transponder 100 in the second security network 400 to a controller function 250 in a base unit 200 in the second security network 400. Thus nearby security networks 400 may cooperate with each other in receiving low power RF communications from transponders 100.

Since base units 200 include processors 203 and memory 211, the base units 200 may also include receivers that incorporate signal processing gain to improve the reception of low power RF communications from transponders 100.

Prior art wireless security systems use receivers that attempt to demodulate low power RF communications on a symbol by symbol basis. That is, the receivers in prior art wireless security systems demodulate each symbol independently of each other symbol in the message. Certain symbols may be demodulated correctly while other symbols may not be demodulated correctly. The base units 200 of the present invention may use signal processing techniques whereby the base unit 200 may receive multiple symbols within the message transmitted by the transponder 100 and then compare the multiple symbols against an expected set of symbols. This process of comparison is sometimes known in the art as integration or correlation, and the result is an improvement in message demodulation due to signal processing gain. The integration may be coherent or incoherent. For an example message length of 64 bits, coherent integration can result in a signal processing gain of 10 log 64, or 18 dB. This means that a base unit 200 can have a receive sensitivity that is as much as 18 dB better than the receiver in a prior art wireless security system.

Every base unit 200 will typically support both high power RF communications with other base units 200 and communications with transponders 100. Some base units 200 may support additional functions as discussed elsewhere. FIG. 3 shows a block diagram of an example embodiment of the base unit 200. Typically, the base unit 200 includes a microprocessor 203, memory 211, unit specific software, RF modulation and receiving circuits 204, an antenna 206, and power supply 207. The microprocessor 203 and RF modulation and receiving circuits 204 may be incorporated as a single chipset or discretely separated.

One manner in which to build a low cost base unit 200 is to use an integrated cordless phone chipset combined with a limited number of additional components. However, other base units 200 can also be built using discrete mixers, filters, amplifiers, etc. that are not integrated into a single chipset. While FIG. 3 shows only a single antenna 206 for simplicity, it may be advantageous for the base unit 200 to contain more than one antenna to provide increased diversity, directivity, or selectivity. When more than one antenna is present, the RF modulation and/or receiving circuits 204 may enable the switching between the multiple antenna elements 206. Alternately, the design may include separate RF modulation and/or receiving circuits 204 for each antenna element. This may help provide greater separation for the transmit and receive signals. If the base unit 200 is to also include a controller function 250, the microprocessor 203 will also require sufficient memory 211 for program and data storage.

Base units 200 can be implemented for use with transponders 100 that employ low power RF communications or passive transponders 150 that employ backscatter modulation. Within a single security network 400, typically all transponders 100 would commonly use only one communications type or the other. Therefore, the RF modulation and receiving circuits 204 of the base unit 200 should typically reflect the selected communications type for the transponders 100 in the particular security network 400. If the transponders 100 in the security network 400 employ low power RF communications, then the RF modulation and/or receiving circuits must support both high power RF communications and low power RF communications. If the transponders in the security network 400 employ backscatter modulation (i.e., they are passive transponders 150), then the RF modulation and/or receiving circuits will typically be required to only support high power RF communications.

If battery backup is desired, the packaging of the base unit 200 also permits the installation of a battery 208 for backup purposes in case normal power supply 207 is interrupted. It is also possible to construct an embodiment without a local power supply 207 and that runs entirely from a battery 208. One such embodiment may take a physical form similar to a cordless phone handheld unit 260.

The inventive base unit 200 need not be limited to any particular modulation scheme for either its high power RF communications or support for backscatter modulation by a passive transponder 150. The choice of the microprocessor 203, RF modulation and/or receiving circuits 204, and antenna 206 may be influenced by various modulation considerations. For example, because the base unit 200 and transponder 100 may operate in one of the shared frequency bands allocated by the FCC, these devices, as do all Part 15 devices, are required to accept interference from other Part 15 devices. It is primarily the responsibility of the base unit 200 to manage communications with the transponder 100, and therefore the following are some of the capabilities that may be included in the base unit 200 to mitigate interference.

Passive transponders 150 use backscatter modulation, which alternately reflects or absorbs the signal radiated by the base unit 200 in order to send its own data back. Therefore, a passive transponder 150 will automatically follow, by design, the specific frequency and modulation used by the base unit 200. This is a significant advantage versus prior art wireless security system transmitters, which can only transmit at a single modulation scheme with the carrier centered at a single frequency. If interference is encountered at or near that single frequency, these transmitters of prior art wireless security systems have no ability to alter their transmission characteristics to avoid or mitigate the interference.

A base unit 200 can be implemented to support any of the following modulation schemes, though the present invention is not limited to just these modulation schemes. As is well known in the art, there are many modulation techniques and variations within any one modulation technique, and designers have great flexibility in making choices in this area. The simplest is a carrier wave (CW) signal, at a variety of frequency choices within the allowable bandwidth. A CW conveys no information from the base unit 200 to a passive transponder 150, but allows a passive transponder 150 to modulate the return signal as described herein. The base unit 200 would typically use another modulation scheme such as Binary Phase Shift Keyed (BPSK), Gaussian Minimum Shift Keyed (GMSK), Gaussian Frequency Shift Keyed (GFSK) or even on-off keyed (OOK) AM, when sending data to a transponder 100, but can use CW when expecting a return signal. The base unit 200 can concentrate its transmitted power into this CW, permitting this narrowband signal to overpower a portion of the spread spectrum signal typically used by other devices operating in the unlicensed bands. If the base unit 200 is unsuccessful with CW at a particular frequency, the base unit 200 can shift frequency within the permitted band. As stated, under the present invention a passive transponder 150 will automatically follow the shift in frequency by design. Rather than repeatedly generating CW at a single frequency, the base unit 200 can also frequency hop according to any prescribed pattern. The pattern may be predetermined or pseudorandom. This pattern can be adaptive and can be varied, as needed to avoid interference.

There may be times when the interference experienced by the base unit 200 is not unintentional and not coming from another Part 15 device. One means by which a very technically knowledgeable intruder may attempt to defeat the security network 400, or any wireless system, of the present invention is by intentional jamming. Jamming is an operation by which a malicious intruder independently generates a set of radio transmissions intended to overpower or confuse legitimate transmissions. In this case, the intruder would likely be trying to prevent one or more transponders from reporting a detected intrusion to the base unit, and then to the master controller 251. Jamming is, of course, illegal under the FCC rules; however intrusion itself is also illegal. In all likelihood, a person about to perpetrate a crime may not give any consideration to the FCC rules. Therefore, the base unit 200 may also contain algorithms that can determine within a reasonable probability that the base unit 200 is being subjected to jamming. For example, if one or more base units 200 detect a change in the radio environment, in a relatively short predetermined period of time, wherein attempted changes in modulation schemes, power levels, and other parameters are unable to overcome the interference, the master controller 251 can cause an alert indicating that it is out of communications with one or more transponders with the likely cause being jamming. This condition can be distinguished from the failure of a single transponder 100 by a simultaneous and parallel occurrence of the change in RF environment, caused by signals not following known FCC transmission rules for power, duty cycle, bandwidth, modulation, or other related parameters and characteristics. The alert can allow the building owner or emergency response agency 460 to decide upon an appropriate response to the probable jamming.

Figure 7:
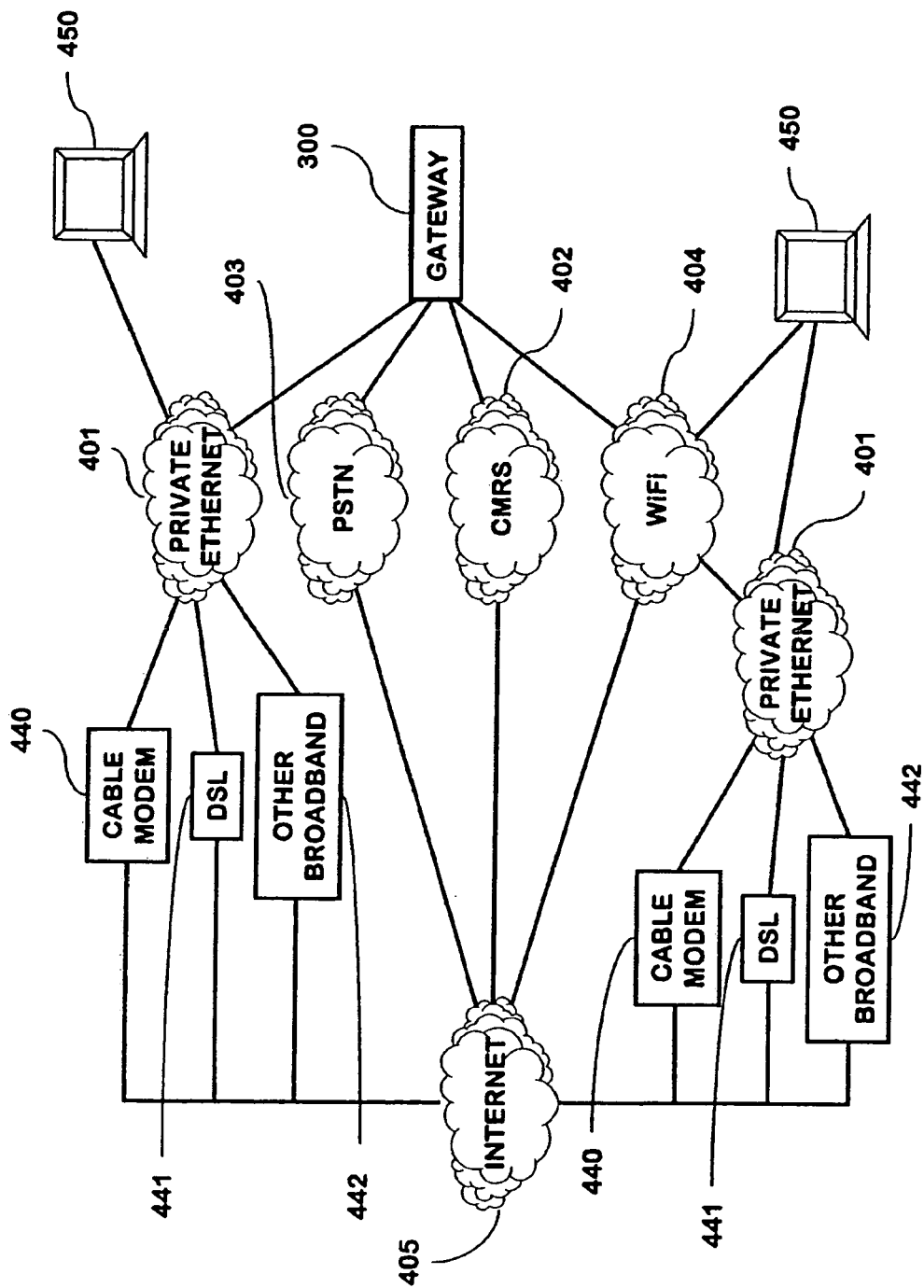
FIG. 7 shows multiple ways in which a gateway can be configured to reach different private and external networks.
Figure 16:
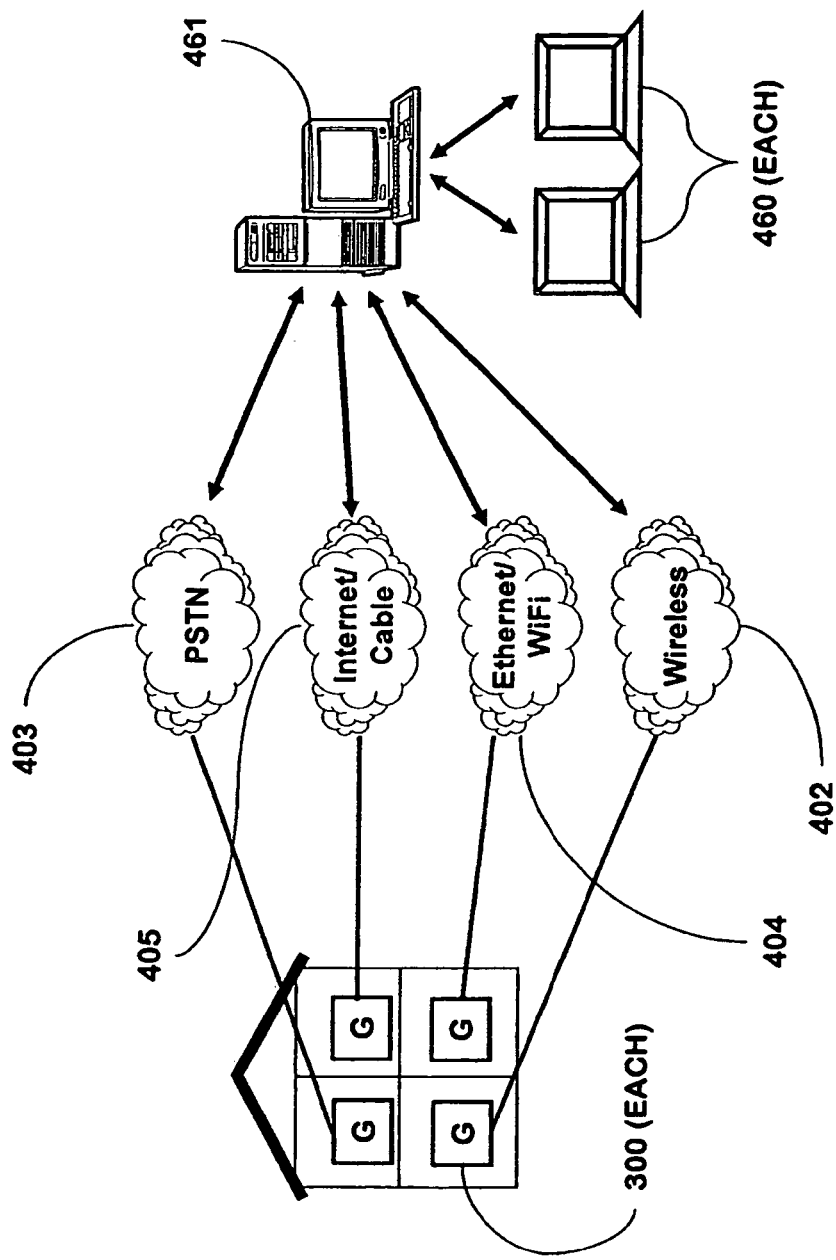
FIG. 16 shows some of the multiple networks in which a gateway can be configured to reach a remote processor or server which then connects to one or more emergency response agencies.

Many homeowners desire monitoring of their security networks 400 by an alarm services company 460. The inventive security network 400 permits monitoring as well as access to various external networks 410 through a family of devices known as gateways 300, each of which permits access from the security network 400 to external devices and networks using different protocols and physical connection means. A gateway 300 is a base unit 200 with an added telecommunications interface. Each gateway 300 is configured with appropriate hardware and software that match the external network 410 to which access is desired. As shown in FIGS. 16 and 7, examples of external networks 410 to which access can be provided are private Ethernets 401, CMRS 402, PSTN 403, WiFi 404, and the Internet 405. This list of external networks 410 is not meant to be limiting, and appropriate hardware and software can be provided to enable the gateway 300 to access other network formats and protocols as well. Private Ethernets 401 are those which might exist only within a building or residence, servicing local computer terminals 450. If the gateway 300 is connected to a private Ethernet 401, access to the Internet 405 can then be provided through a cable modem 440, DSL 441, or other type of broadband network 442. There are too many suppliers to enumerate here.

A block diagram of the gateway 300 is the same as that of the base unit shown in FIG. 3. Typically, the gateway 300 includes a microprocessor 203, memory 211, unit specific software, RF modulation and receiving circuits 204, an antenna 206, and power supply 207. The microprocessor 203 and RF modulation and receiving circuits 204 may be incorporated as a single chipset or discretely separated. The telecommunications interface 220 will vary depending upon the external network to which the gateway 300 is to connect. The gateway 300 will typically communicate with the base units 200 using high power RF communications.

Figure 17:
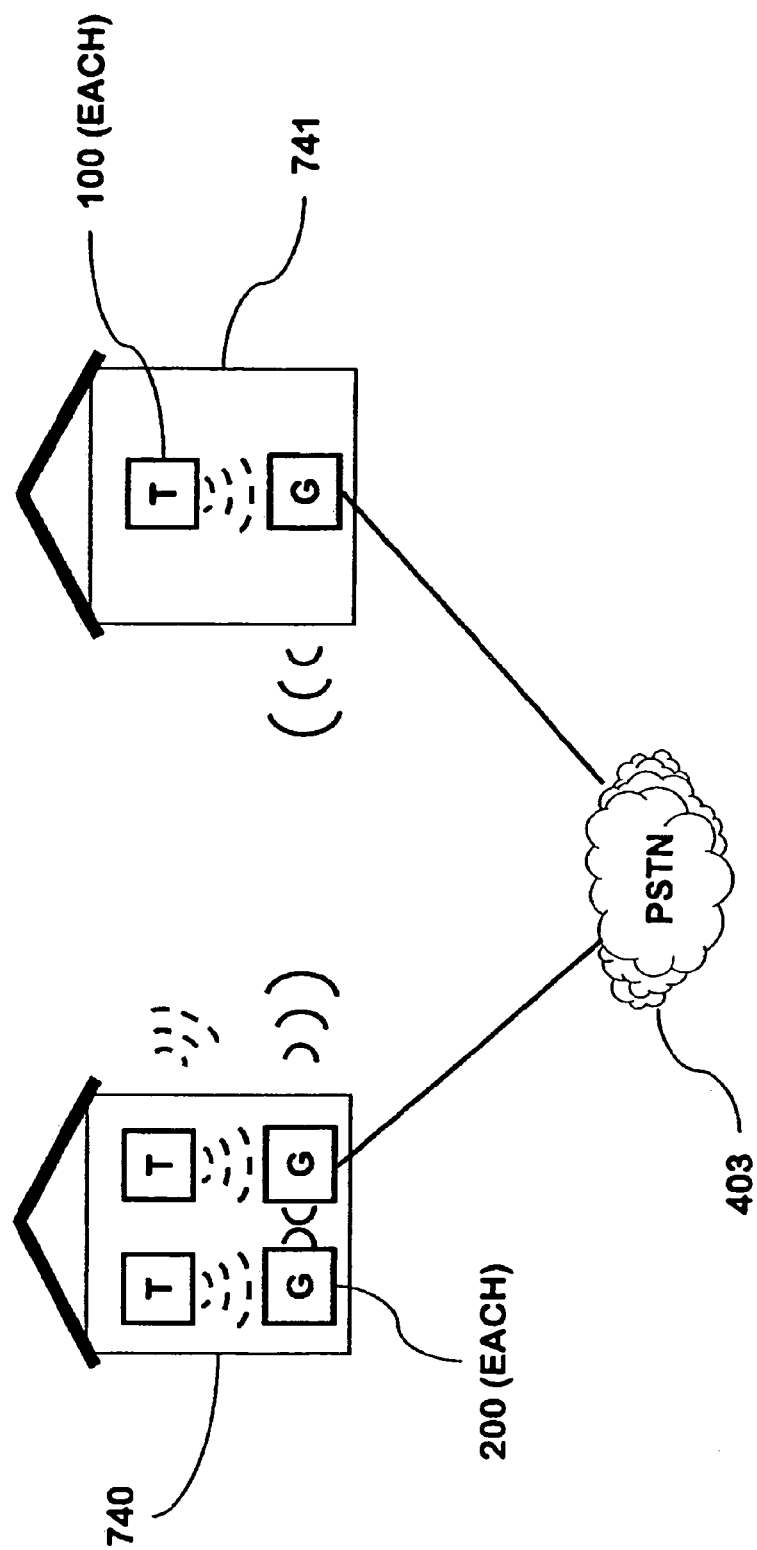
FIG. 17 shows security networks in two neighboring residences in which the two security networks cooperate with each other to provide alternate means to reach the PSTN, and in which each security network may provide alternate communications paths for the base units and transponders of the other security network.
Figure 20:
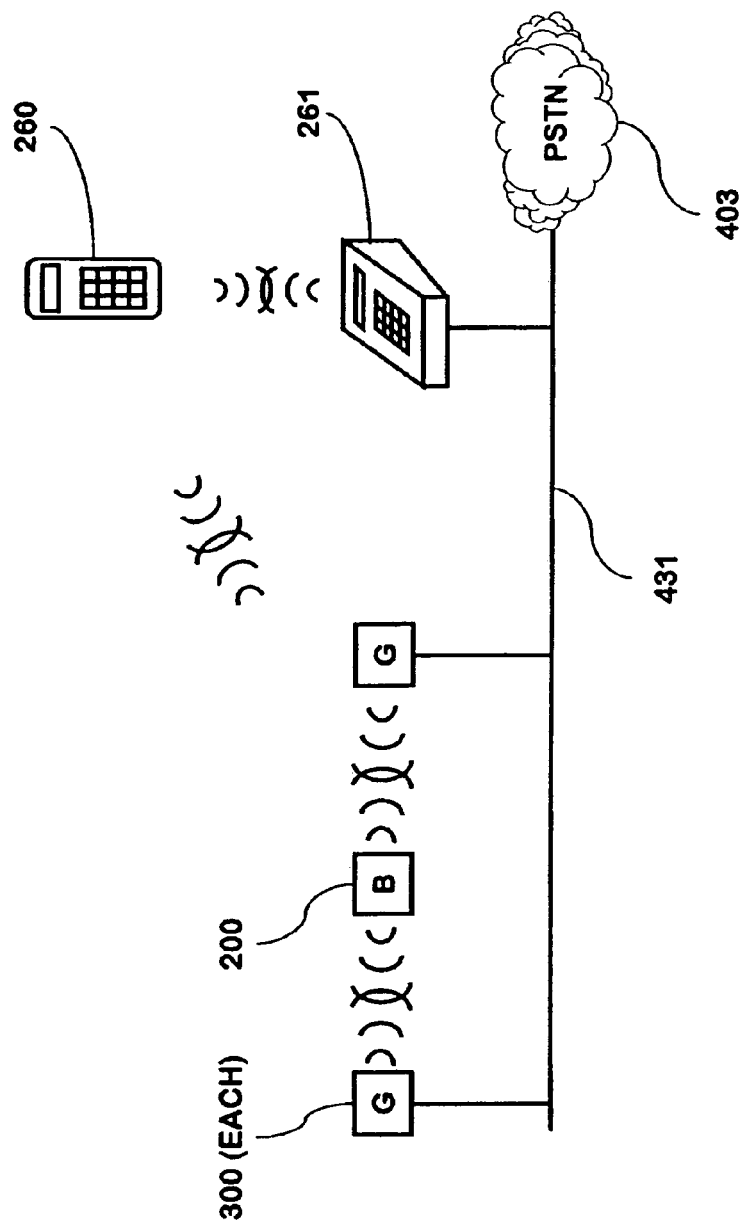
FIG. 20 shows multiple gateways connecting to a telephone line and various example base units communicating in a security network.

As shown in FIGS. 16 and 20, the security network 400 permits the installation of multiple gateways 300 in a single security network 400, each of which can interface to the same or different external networks 410. For example, a second gateway 300 can serve to function as an alternate or backup gateway 300 for cases in which the first gateway 300 fails, such as component failure, disablement or destruction by an intruder, or loss of power at the outlet where the first gateway 300 is plugged in. If there are multiple gateways installed in a security network 400, these gateways may be located in different buildings and be connected to different networks. For example, a user may install a security network 400 including a gateway 300 in their residence 740 and then also place a second gateway 300 in their neighbor's residence 741. The first gateway 300 is then connected to one telephone line and the second gateway 300 is then connected to the neighbor's telephone line (FIG. 17).

Figure 8:
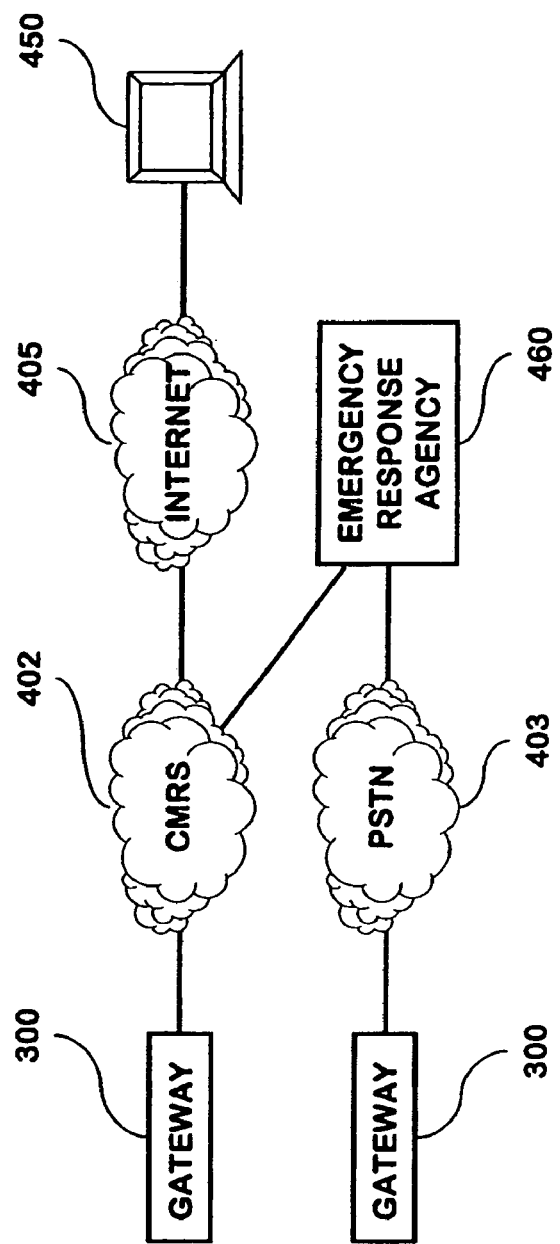
FIG. 8 shows some of the multiple ways in which a gateway can be configured to reach emergency response agencies and other terminals.

Homeowners and building owners generally desire one or two types of alerts in the event that an intrusion is detected. First, an audible alert may be desired whereby a loud siren 551 is activated both to frighten the intruder and to call attention to the building so that any passers-by may take notice of the intruder or any evidence of the intrusion. However, there are also scenarios in which the building owner prefers the so called silent alert whereby no audible alert is made so as to lull the intruder into believing he has not been discovered and therefore may still be there when law enforcement personnel arrive. The second type of alert involves messaging an emergency response agency 460, indicating the detection of an intrusion and the identity of the building, as shown in FIGS. 8 and 16. The emergency response agency 460 may be public or private, depending upon the local customs, and so, for example, may be an alarm services company 460 or the city police department 460.

The gateway 300 of the inventive system supports the second type of foregoing alert by preferably including different telecommunications interfaces 220, or modules, such as for example a modem module 310, wireless module 311 and 312, WiFi module 313, or Ethernet module 313. The modem module 310 is used for connection to a public switched telephone network (PSTN) 403; the wireless module 311 is used for connection to a commercial mobile radio service (CMRS) network 402 such as any of the widely available CDMA, TDMA, or GSM-based 2G, 2.5G, or 3G wireless networks. The WiFi module 313 is used for connection to private or public WiFi networks 404; the Ethernet module 313 is use for connection to private or public Ethernets 401.

Certain building owners will prefer the high security level offered by sending an alert message through a CMRS network 402 or WiFi network 404. The use of a CMRS network 402 or WiFi network 404 by the gateway 300 overcomes a potential point of failure that occurs if the intruder were to cut the telephone wires 431 prior to attempting an intrusion. If the building owner has installed at least two gateways 300 in the system, one gateway 300 may have a wireless module 311/312 installed and a second may have a modem module 310 installed. This provides the inventive security network 400 with two separate communication paths for sending alerts to the emergency response agency 460 as shown in FIG. 8. By placing different gateways 300 (FIGS. 16 and 20) in very different locations in the building, the building owner significantly decreases the likelihood that an intruder can discover and defeat the security network 400.

Any base unit 200, including gateways 300, may include a controller function 250. Prior art alarm panels typically contain a single controller, and all other contacts, motion detectors, etc. are fairly dumb from an electronics and software perspective. For this reason, the alarm panel must be hidden in the house because if the alarm panel were discovered and disabled, all of the intelligence of the system would be lost. The controller function 250 of the present invention may be distributed through many or all of the base units 200 in the security network 400 and shown in FIG. 9. The controller function 250 is a set of software logic that can reside in the processor 203 and memory 211 of a number of different base units 200 within the security network 400, including within the base unit 200. If the base unit 200 memory is of an appropriate type and size, the memory 211 can contain a controller function 250, consisting of both program code and configuration data. The program code will generally contain both controller function 250 code common to all devices as well as code specific to the base unit 200 type. For example, a base unit 200 will have certain device specific hardware that requires matching code, and a gateway 300 may have different device specific hardware that requires different matching code.

When multiple base units 200 are installed in a system, the controller functions 250 in the different devices become aware of each other, and share configuration data and updated program code. The updated program code can consist of either a later released version of the program code, or can consist of device specific code or parameters. For example, if a new type of base unit 200 is developed and then installed into an existing network, the older base units 200 in the system may require updated program code or parameters in order to effectively manage the new base unit 200.

Figure 9:
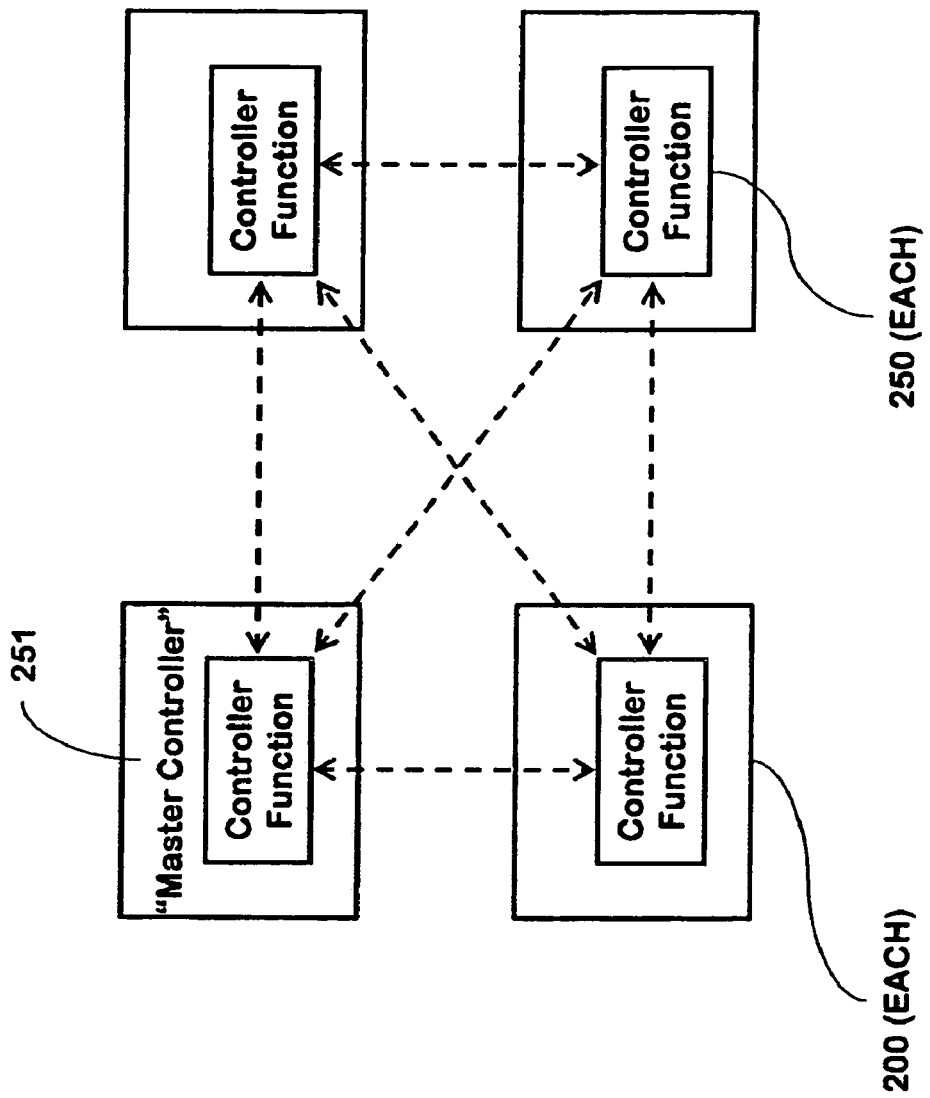
FIG. 9 shows control functions in multiple base units logically connecting to each other. One control function has been designated the master controller.

Each controller function 250 in each device can communicate with all other controller functions 250 in all other base units 200 as shown in FIG. 9. The purpose of replicating the controller function 250 on multiple base units 200 is to provide a high level of redundancy throughout the entire security network 400, and to reduce or eliminate possible points of failure (whether component failure, power failure, or disablement by an intruder). The controller functions 250 implemented on each base unit 200 perform substantially the same common functions, therefore the chances of system disablement by an intruder are fairly low.

When there are multiple controller functions 250 installed in a single security network 400, the controller functions 250 arbitrate among themselves to determine which controller function 250 shall be the master controller 251 for a given period of time. The preferred arbitration scheme consists of a periodic self-check test by each controller function 250, and the present master controller 251 may remain the master controller 251 as long as its own periodic self-check is okay and reported to the other controller functions 250 in the security network 400. If the present master controller 251 fails its self-check test, or has simply failed for any reason or been disabled, and there is at least one other controller function 250 whose self-check is okay, the failing master controller 251 will abdicate and the other controller function 250 whose self-check is okay will assume the master controller 251 role. In the initial case or subsequent cases where multiple controller functions 250 (which will ideally be the usual case) are all okay after periodic self-check, then the controller functions 250 may elect a master controller 251 from among themselves by each choosing a random number from a random number generator, and then selecting the controller function 250 with the lowest random number. There are other variations of arbitration schemes that are widely known, and any number are equally useful without deducting from the inventiveness of permitting multiple controller functions 250 in a single security network 400, as long as the result is that in a multi-controller function 250 system, no more than one controller function 250 is the master controller 251 at any one time. In a multi-controller function 250 system, one controller function 250 is master controller 251 and the remaining controller functions 250 are slave controllers, keeping a copy of all parameters, configurations, tables, and status but generally not duplicating the actions of the master controller 251.

In a system with multiple controller functions 250, the security network 400 can receive updated program code and selectively update the controller function 250 in just one of the base units. If the single base unit 200 updates its program code and operates successfully, then the program code can be updated in other base units. If the first base unit 200 cannot successfully update its program code and operate, then the first base unit 200 can revert to a copy of older program code still stored in other base units. Because of the distributed nature of the controller functions 250, the security network 400 of the present invention does not suffer the risks of prior art alarm panels which had only one controller.

Each controller function 250 typically performs some or all of the following major logic activities, although the following list is not meant to be limiting:

configuration of the security network 400 whereby each of the other components are identified, enrolled, and placed under control of the master controller 251, receipt and interpretation of daily operation commands executed by the homeowner or building occupants including commands whereby the system is placed, for example, into armed or monitoring mode or disarmed for normal building use, communications with other controller functions 250, if present, in the system including exchange of configuration information and daily operation commands as well as arbitration between the controller functions 250 as to which controller function 250 shall be the master controller 251, communications with various external networks 410 for purposes such as sending and receiving messages, picture and audio files, new or updated program code, commands and responses, and similar functions, communications with base units 200 and transponders 100 in the security network 400 including the sending of various commands and the receiving of various responses and requests, processing and interpretation of data received from the base units 200 including data regarding the receipt of various signals from the sensors 600 and 620 and transponders 100 within communications range of each base unit, monitoring of each of the sensors, both directly and indirectly, to determine, for example, whether a likely intrusion has occurred, whether glass breakage has been detected, or whether motion has been detected by a microwave- and/or passive infrared-based device, deciding, based upon the configuration of the security network 400 and the results of monitoring activity conducted by the controller function 250, whether to cause an alert or take another event based action, causing an alert, if necessary, by some combination of audible indication such as via a siren device 551, or using a gateway 300 to dial through the public switched telephone network (PSTN) 403 to deliver a message to an emergency response agency 460, or sending a message through one or more Ethernet 401, internet 405, and/or commercial mobile radio services (CMRS) 402 to an emergency response agency 460.

The controller function 250 offers an even higher level of security that is particularly attractive to marketing the inventive security network 400 to apartment dwellers. Historically, security systems of any type have not been sold and installed into apartments for several reasons. Apartment dwellers are more transient than homeowners, making it difficult for the dweller or an alarm services company to recoup an investment from installing a system. Of larger issue, though, is the small size of apartments relative to houses. The smaller size makes it difficult to effectively hide the alarm panel of prior art security systems, making it vulnerable to discovery and then disconnection or destruction during the pre-alert period. The pre-alert period of any security system is the time allowed by the alarm panel for the normal homeowner to enter the home and disarm the system by entering an appropriate code or password into a keypad. This pre-alert time is often set to 30 seconds to allow for the fumbling of keys, the carrying of groceries, the removal of gloves, etc. In an apartment scenario, 30 seconds is a relatively long time in which an intruder can search the apartment seeking the alarm panel and then preventing an alert. Therefore, security systems have not been considered a viable option for most apartments. Yet, approximately 35% of the households in the U.S. live in apartments (or other multi-family dwelling units) and their security needs are not less important than those of homeowners.

The inventive security network 400 may include an additional remote monitoring function in the controller function 250, which can be selectively enabled at the discretion of the system user. The controller function 250 includes a capability whereby the controller function 250 of one base unit 200 can send a message to a designated cooperating base unit 200 at the time that a pre-alert period begins and again at the time that the security network 400 has been disabled by the normal user, such as the apartment dweller, by entering the normal disarm code. The designated cooperating base unit 200 may be located anywhere within RF range of the first base unit 200 such as for example another apartment, another building, or a secure room within the building. Furthermore, the controller function 250 of one base unit 200 can send a different message to the same designated cooperating base unit 200 if the normal user enters an abnormal disarm code that signals distress, such as when, for example, an intruder has forced entry by following the apartment dweller home and using a weapon to force the apartment dweller to enter her apartment with the intruder and disarm the security network 400.

Figure 12:
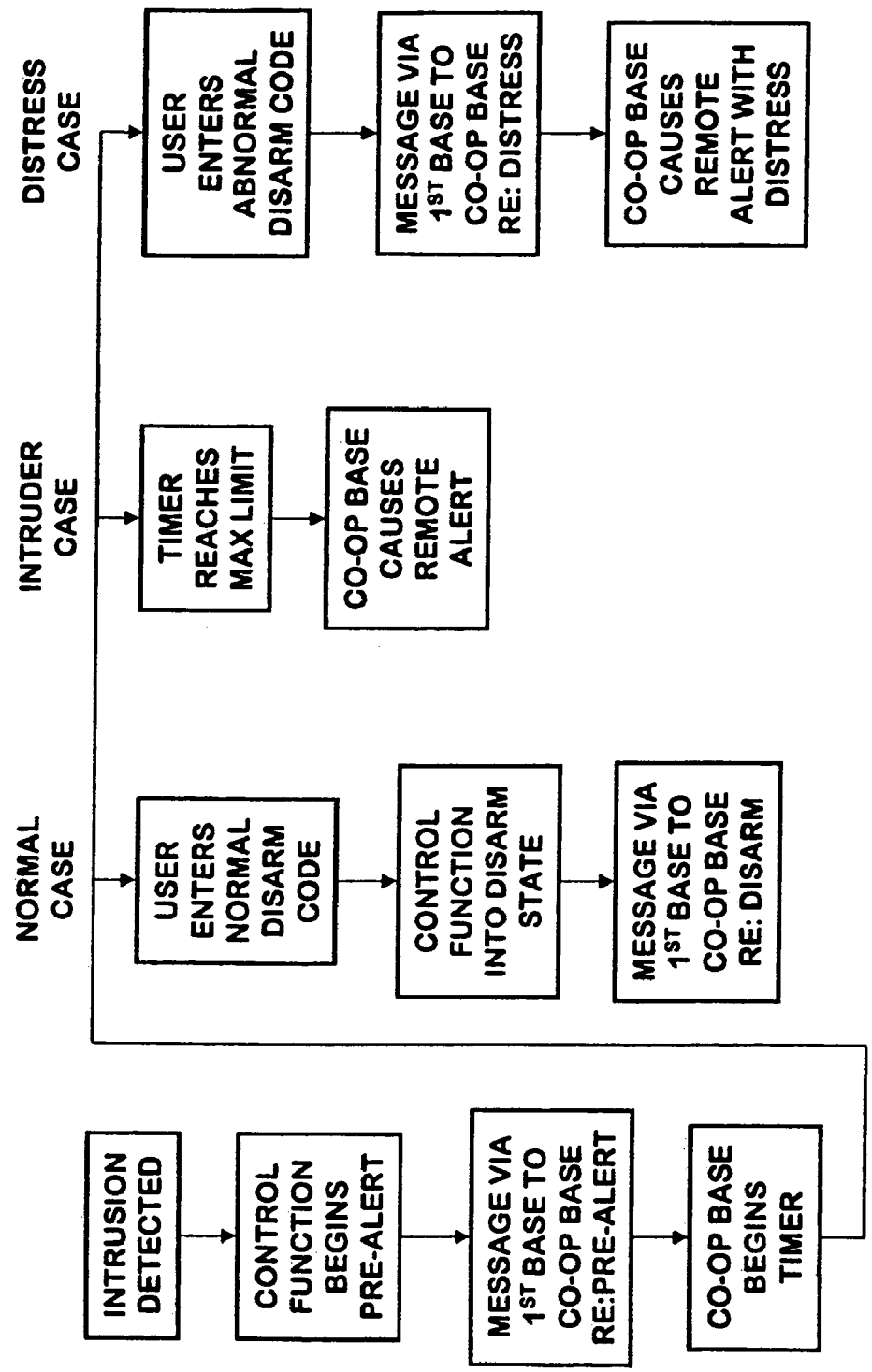
FIG. 12 is a flow chart for a method of providing a remote monitoring function.

In logic flow format, the remote monitoring function operates as shown in FIG. 12 and described in more detail below, assuming that the function has been enabled by the user:

an intrusion is detected in the building, such as the apartment, the controller function 250 in a first base unit 200 begins a pre-alert period, the controller function 250 in the first base unit 200 sends a message to a designated cooperating base unit 200 whereby the message indicates the identity of the security network 400 and the transition to pre-alert state, the designated cooperating base unit 200 begins a timer (for example 30 seconds or any reasonable period allowing for an adequate pre-alert time), if the person causing the intrusion is a normal user under normal circumstances, the normal user will enter or speak the normal disarm code or password, the controller function 250 in the first base unit 200 ends the pre-alert period, and enters a disarmed state, the controller function 250 in the first base unit 200 sends a message to the cooperating base unit 200, whereby the message indicates the identity of the security network 400 and the transition to disarm state, if the person causing the intrusion is an intruder who does not know the disarm code and/or disables and/or destroys the first base unit 200 containing the controller function 250 of the security network 400, the timer at the cooperating base unit 200 reaches the maximum time limit (30 seconds in this example) without receiving a message from the controller function 250 in the first base unit 200 indicating the transition to disarm state, the cooperating base unit 200 may remotely cause an alert indicating that a probable intrusion has taken place at the location associated with the identity of the security network 400, if the person causing the intrusion is an authorized user under distressed circumstances (i.e., gun to back), the authorized user enters or speaks an abnormal disarm code or password indicating distress, the controller function 250 in the first base unit 200 sends a message to the cooperating base unit 200, whereby the message indicates the identity of the security network 400 and the use of an abnormal disarm code or password indicating distress, the cooperating base unit 200 may remotely cause an alert indicating that an intrusion has taken place at the location associated with the identity of the security network 400 and that the authorized user is present at the location and under distress.

As can be readily seen, this inventive remote monitoring function now enables the installation of this inventive security network 400 into apartments without the historical risk that the system can be rendered useless by the discovery and disablement or destruction by the intruder. With this function enabled, even if the intruder were to disable or destroy the system, a remote alert could still be signaled because a message indicating a transition to disarm state would not be sent, and a timer would automatically conclude remotely at the designated processor. This function is obviously not limited to just apartments and could be used for any building.

With a wireless module 311 or 312, WiFi module 313, or Ethernet module 313 installed, a gateway 300 can also be configured to send either an SMS-based message through the CMRS 402 or an email message through a WiFi network 404 or Ethernet network 401 to the Internet 405 to any email address based upon selected user events. For example, an individual away from home during the day may want a message sent to his pager, wireless phone, or office email on computer 450 if the inventive security network 400 is disarmed at any point during the day when no one is supposed to be at home. Alternately, a parent may want a message sent when a child has returned home from school and disarmed the security network 400. Perhaps a homeowner has provided a temporary disarm code or password to a service company scheduled to work in the home, and the homeowner wants to receive a message when the work personnel have arrived and entered the home. By assigning different codes or passwords to different family members and/or work personnel, the owner of the security network 400 can discriminate among the persons authorized to disarm the system. Any message sent, as described herein, can contain an indication identifying the code/password and/or the person that entered the disarm code/password. The disarm code/password itself is typically not sent for the obvious security reasons, just an identifier associated with the code.

The gateway 300 can send or receive updated software, parameters, configuration, or remote commands, as well as distribute these updated software, parameters, configuration, or remote commands to other controller functions 250 embedded in other base units 200. For example, once the security network 400 has been configured, a copy of the configuration, including all of the table entries, can be sent to a remote processor 461 for both backup and as an aid to responding to any reported emergency. If, for any reason, all of the controller functions 250 within the security network 400 ever experienced a catastrophic failure whereby its configuration were ever lost, the copy of the configuration stored at the remote processor 461 could be downloaded to a restarted or replacement controller function 250. Certain parameters, such as those used in glass breakage detection, can be downloaded to the controller function 250 and then propagated, in this example, to the appropriate glass breakage detection functions that may be contained within the system. Therefore, for example, if a homeowner were experiencing an unusual number of false alarm indications from a glass breakage detection function, remote technical personnel could remotely make adjustments in certain parameters and then download these new parameters to the controller function 250. Additionally, the operating parameters for new base units 200 can also be downloaded to the controller function 250. For example, if a homeowner added a new base unit 200 to the security network 400 several years after initial installation, the parameters for this new type of base unit 200 might not exist in the controller function 250. The security network 400 could obtain the parameters associated with the new base unit 200 from a site designated by the manufacturer.

The controller function 250 can also report periodic status and/or operating problems detected by the system to the emergency response agency 460, the manufacturer of the system, or a similar entity. One example of the usefulness of this function is that reports of usage statistics, status, and/or problems can be generated by an example emergency response agency 460 and a copy provided to the customer as part of his monthly bill. Furthermore, the usage statistics of similarly situated customers can be compared and analyzed for any useful patterns. Technicians at an emergency response agency 460, the manufacturer of the system, or a similar entity can use any collected data to diagnose problems and make changes to the configuration, parameters, or software of security network 400 and remotely download these changes to the security network 400. This may eliminate the need for a technician visit to a customer's home or other building.

Any base unit 200 may include an acoustic transducer 210 (shown in FIG. 3). The acoustic transducer 210 preferably supports both the reception of sounds waves and the emission of sound waves such that the acoustic transducer 210 can also be used for functions such as glass breakage detection, fire alarm detection, two-way audio, the sounding of tones and alerts, voice recognition, and voice response (i.e., spoken word responses to commands). While shown as a single block in FIG. 3, the acoustic transducer 210 can be implemented with a single combined component or with a separate input transducer (i.e., microphone) and output transducer (i.e., speaker and/or piezo).

It is preferred that microprocessor 203 be able to read acoustic data from the acoustic transducer 210 in order to analyze the data for specific patterns. For example, it would be advantageous for the microprocessor 203 to detect specific speech patterns for use in voice recognition. Similarly, the microprocessor 203 may look for patterns that indicate the sound of breaking glass or an alerting smoke detector or fire alarm. It is also preferred that microprocessor 203 be able to send acoustic data to the acoustic transducer 210 in order to create sounds for feedback or alerting, or to output pre-stored words for voice response. The memory 211 should ideally contain sufficient data space for the storage of both patterns for recognition and output sounds and words.

An example embodiment of a gateway 300 is a USB gateway 510. The USB gateway 510 includes common characteristics and embodiments with the base unit 200 including high power RF communications and communications with transponders 100. Thus, if a USB gateway 510 has been installed in a room, it may not be necessary for a separate base unit 200 to also be installed in a room in order to monitor the transponders 100.

An interface mechanism available for use with the security network 400 is a USB gateway 510 that enables a desktop or laptop computer to be used for downloading, uploading, or editing the configuration stored in the controller functions 250. The USB gateway 510 connects to and may obtain power from the Universal Serial Bus (USB) port commonly installed in most computers 450 today. The USB gateway 510 can convert signals from the USB port to backscatter modulation or high power RF communications with a base unit 200 or gateway 300, thereby providing access to the configuration data stored by the controller functions 250. A software program provided with the USB gateway 510 enables the user to access the USB gateway 510 via the USB port, and display, edit, or convert the configuration data. In this manner, authorized users have an easy mechanism to create labels for each of the base units 200, gateways 300, and transponders 100. For example, a particular transponder 100 may be labeled "Living Room Window" so that any alert generated by the security network 400 can identify by label the room in which the intrusion has occurred. The labels created for the various devices can also be displayed on the display 266 to show, for example, which zones are in an open or closed state.

Another example embodiment of a base unit 200 is an email device 530. The security network 400 can support an email device 530 that uses high power RF communications to communicate with the base units 200 and gateways 300. This email device 530, which can take the form of a palm-type organizer or other forms, may typically be used to send and receive email via the modules of a gateway 300. As described earlier, the various devices in the security network 400 self form a network, thereby enabling messages to originate on any base unit 200 and terminate on any capable base unit 200. Therefore, it is not necessary that the email device 530 be near a gateway 300. If necessary, messages can be received via a gateway 300, routed through multiple base units 200, and then terminated at the email device 530. The primary advantage of including an email device 530 in the security network 400 is to provide the homeowner a device that is always on and available for viewing. There are a growing number of wireless phones in use today capable of sending and receiving SMS messages. The email device 530 provides a convenient, always-on device whereby family members can sent short messages to each other. For example, one spouse can leave a message for another spouse before leaving work. The functions of the email device may be combined with the functions of another device, such as a keypad, to advantageously form an integrated device.

Another example embodiment of a gateway 300 is a WiFi gateway 520. As an alternative to using a USB gateway 510, the security network 400 also supports a WiFi gateway 520. WiFi, also known as 802.11b, is becoming a more prevalent form of networking computers. Recently, Intel made available a new chip called Centrino by which many new computers will automatically come equipped with WiFi support. Therefore, rather than using a USB gateway 510 that connects to a port on the computer 450, a gateway 300 may include a WiFi module 313. The WiFi gateway 520 can provide either local access from a local PC 450 (assuming that the local PC supports WiFi) to the security network 400, or alternately from the security network 400 to a public WiFi network 404. It is expected that in the near future, some neighborhoods will be wired with public WiFi networks 404. These public WiFi networks 404 will provide another alternative access means to the internet from homes (in addition to cable modems 440 and DSL 441, for example). There may be users, therefore, that may prefer the security network 400 to provide alerts through this network rather than a PSTN 403 or CMRS 402 network. In the event these public WiFi networks 404 become prevalent, then the security network 400 can offer the email access described above through these networks as well. The WiFi gateway 520 primarily acts as a protocol converter between the chosen modulation and protocol used within the security network 400 and the 802.11b standard. In addition to the protocol conversion, the WiFi gateway 520 also provides a software-based security barrier similar to a firewall to prevent unauthorized access to the security network 400.

Any base unit 200 may also include a camera 213. A typical type of camera 213 may be a miniature camera of the type commonly available in mobile phones and other consumer electronics. Low cost miniature cameras are widely available for PC and wireless phone use, and formats (i.e., JPEG) for transmitting pictures taken by these miniature cameras are also widely known. By recording sequential images taken over a short period of time, a time lapse record may be created. Through one or more of the gateways 300, the security network 400 can access external networks as well as be accessed through these same networks. Some users may find it useful to be able to visually or audibly monitor their home or building remotely. Therefore, the security network 400 also supports base units 200 including cameras 213 and/or audio transducers 210 that enable a user to remotely see and/or hear what is occurring in a home or building. Each of the base units 200 can be individually addressed since each is typically provided with a unique identity. When a security network 400 causes an alert, an emergency response agency 460 or an authorized user can be contacted. In addition to reporting the alert, as well as the device (i.e., identity of the transponder 100) causing the alert, the security network 400 can be configured to provide pictures and/or audio clips of the activity occurring within the security network 400. Base units 200 with cameras 213 and/or audio transducers 210 will be particularly useful in communities in which the emergency response agency 460 requires confirmation of intrusion prior to dispatching police.

There are multiple uses for the audio 210 and camera 213 support in the security network 400 in addition to alarm verification by an emergency response agency 460. A caregiver can check in on the status of an elderly person living alone using the audio and/or camera capabilities of the security network 400. A family on a trip can check in on the activities of a pet left at home. The owner of a vacation home can periodically check in on the property during the winter months when the vacation home is otherwise unoccupied.

Certain base units 200 may be configured with additional memory 211 for the purpose of storing pictures and/or audio files. By combining within a security network 400 the audio 210 and/or camera 213 capability with a USB gateway 300 and a local PC a user can store picture and audio files on the PC to provide a continuous record of activities in the home. As an alternative to storing pictures on a local PC, a base unit 200 can be provided with a large enough memory 211 to contain a file system wherein the file system stores pictures periodically taken by one or more cameras in the security network 400. One way in which the memory of a base unit 200 can be expanded is through the use of well-known flash memory. For example, flash memory modules are available in a variety of pre-packaged formats such as PCMCIA, Compact Flash, or USB, so a base unit 200 can be implemented to accept modules in these formats. The pictures and/or audio files in the file system can be accessed later to retrieve pictures taken at particular times. These files can be accessed in a number of ways. If the memory 211 is contained in a removable flash memory module, the module can be removed and inserted into another device such as a PC that can read the files. Alternately, the files in the memory 211 can be accessed through a gateway 300. For example, a local PC can use a USB gateway 510 or WiFi gateway 520 or an emergency response agency can use a telephone, wireless, or Ethernet based connection.

Figure 15:
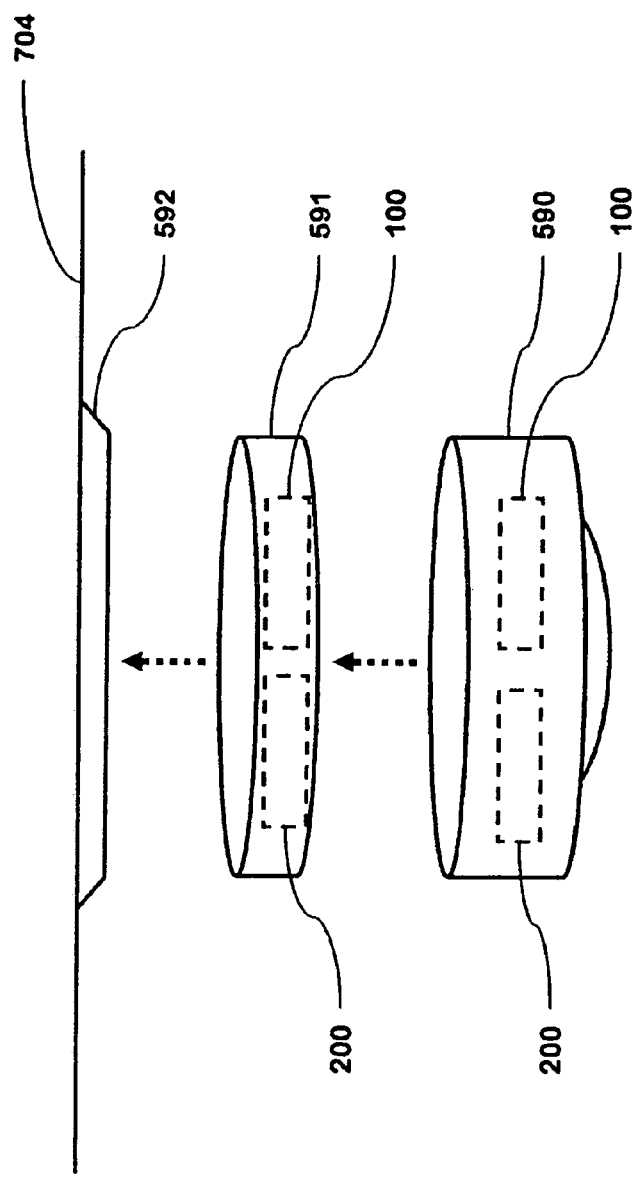
FIG. 15 shows example embodiments of a smoke detector and a smoke detector collar into which an optional base unit or an optional transponder has been integrated.

One advantageous base unit 200 in which a camera 213 can be included is a base unit 200 built into the physical form of a smoke/fire/CO detector 590 or a detector collar 591 as shown in FIG. 15. Since detectors are generally mounted on ceilings, the inclusion of camera 213 capability into a ceiling mounted base unit 200 built into the physical form of a smoke/fire/CO detector 590 or smoke detector collar 591 will provide the camera 213 with a wide angle of view with little likely viewing obstruction. A base unit 200 built into the physical form of a smoke/fire/CO detector 590 can include smoke, fire, or CO detection capability 212. The detection technology for smoke, fire, and/or CO is widely known and available. A base unit 200 built into the physical form of a detector collar 591 would likely not require smoke, fire, or CO detection 212 capability since the state of the attached smoke, fire, or CO can be detected by the base unit 200.

The inventive security network 400 does not require all detectors 590 installed in a home to include a base unit 200 as defined in this specification. Certain manufacturers, such as Firex for example, already provide families of low cost smoke detectors that have a wired communications capability; that is, if one smoke detector detects smoke and causes an audible alert, all smoke detectors that are wired to the detecting smoke detector also cause an audible alert. Using the present invention, one of the example Firex smoke detectors can be replaced with a base unit 200 of the inventive security network 400, and if any of the Firex family of smoke detectors causes an alert and sends a communications via the standard Firex wired communications, the base unit 200 of the inventive security network 400 will receive the same communications as all Firex smoke detectors on the same circuit, and the inventive security network 400 can cause its own alert using its own audible capability and/or any gateway 300 devices installed in the inventive security network 400. This ability to convert the wired communications from an existing example Firex network of smoke detectors into an appropriate communications within the inventive security network 400 obviates the need for a user to replace all of the smoke detectors in a home when installing an inventive security network 400. While this example has been given using smoke detectors, it is understood that this example is extensible to fire detectors, carbon monoxide (CO) detectors, and other similar detection devices typically used in residential and commercial buildings.

If the designer does not wish to design a base unit 200 including smoke/fire/CO detect capability 212, then the designer can place the base unit 200 functionality into a detector collar 591 that it placed between an example smoke/fire/CO detector 590 and the mounting plate 592 attached to the ceiling 704. An AC powered smoke detector usually requires that an electrical box be installed into the ceiling. The mounting plate 592 is attached to the electrical box in the ceiling and a connector protrudes from the electrical box. The smoke/fire/CO detector 590 is then typically connected to the connector, and then snapped onto the mounting plate 592. Under the present invention, a detector collar 591 can be placed between the mounting plate 592 and the smoke/fire/CO detector 590. The detector collar 591 can provide the physical volume to contain the base unit 200 functionality as well as intercept the AC power and the communications wire that are contained in the connector protruding from the electrical box. By intercepting and detecting the state of the communications wire, the base unit 200 can detect any changes in state, such as the signaling of an alert. Rather than intercepting the communications wire, or in the case of a sensor that does not include a separate communications wire, the base unit 200 can also sense the audio signal typically put out by an example smoke/fire/CO detector 590. These audio signals are generally designed to generate audio power of approximately 85 dB at 10 feet in various predetermined and distinctive patterns. The base unit 200 can include an appropriate audio transducer 210 that can sense the presence or absence of the volume and/or distinctive pattern of the audio output by the smoke/fire/CO detector 590. In any of the example cases, when the base unit 200 detects an alert state being signaled by an example smoke/fire/CO detector 590, the base unit 200 can send a communication to the master controller 251 in the security network 400. The security network 400 can then send an alert to an emergency response agency 460 or take any other predetermined action configured in the security network 400 by the end user.

Note that while smoke detectors and Firex have been used as examples, other types of sensors and other brands/manufacturers can be substituted into this specification without detracting from the inventive nature. It is also not required that full base unit 200 functionality be placed into the smoke/fire/CO detector 590 or smoke detector collar 591. If no camera 213 or audio 210 capability is desired, then a transponder 100 can be implemented in the smoke/fire/CO detector 590 or smoke detector collar 591 instead of a base unit 200. In FIG. 15, both the base unit 200 and transponder 100 are shown with dashed lines to show the optional choices that can be made.

The base unit 200 can include several options that increase both the level of security and functionality in the inventive security network 400. One option enhances the base unit 200 to include an acoustic transducer 210 capable of receiving and/or emitting sound waves that enables a glass breakage detection capability in the base unit 200. Glass breakage sensors have been widely available for years for both wired and wireless prior art security networks. However, they are available only as standalone sensors typically selling for $30 to $50 or more. Of course, in a hardwired system, there is also the additional labor cost of installing separate wires from the alarm panel to the sensor. The cost of the sensors generally limits their use to just a few rooms in a house or other building. The cost is due in part to the need for circuits and processors dedicated to just analyzing the sound waves.

Since the base unit 200 already contains a power supply 207 and a processor 203 the only incremental cost of adding the glass breakage detection capability is the addition of the acoustic transducer 210 and the software to analyze sound patterns for any of the distinctive patterns of breaking glass. With the addition of this option, glass breakage detection can be available in every room in which a base unit 200 has been installed.

Glass breakage detection is performed by analyzing received sound waves to look for certain sound patterns distinct in the breaking of glass. These include certain high frequency sounds that occur during the impact and breaking of the glass and low frequencies that occur as a result of the glass flexing from the impact. The sound wave analysis can be performed by any number of widely known signal processing techniques that permit the filtering of received signals and determination of signal peaks at various frequencies over time.

One advantage of the present invention over prior art standalone glass breakage sensors is the ability to adjust parameters in the field. Because glass breakage sensors largely rely on the receipt of audio frequencies, they are susceptible to false alarms from anything that generates sounds at the right combination of audio frequencies. Therefore, there is sometimes a requirement that each glass breakage sensor be adjusted after installation to minimize the possibility of false alarms. In some cases, no adjustment is possible in prior art glass breakage detection devices because algorithms are permanently stored in firmware at the time of manufacture. Because the glass breakage detection of the present invention is performed by the base units, which include or are in communication with a controller function 250, the controller function 250 can alter or adjust parameters used by the base unit 200 in glass breakage detection. For example, the controller function 250 can contain tables of parameters, each of which applies to different building construction materials or window types. The user can select the appropriate table entry during system configuration, or select another table entry later after experience has been gained with the installed security network 400. Furthermore, the controller function 250 can contact an appropriate database via a gateway 300 that is, for example, managed by the manufacturer of the security network 400 to obtain updated parameters. There is, therefore, significant advantage to this implementation of glass breakage detection, both in the cost of device manufacture and in the ability to make adjustments to the processing algorithms used to analyze the sound waves.

In a manner similar to glass breakage detection above, the received sound waves can be analyzed to look for certain (usually very high decibel) sound patterns distinct in alerting smoke detectors, fire alarms, carbon monoxide detectors, and similar local alerting devices. When one or more base units 200 detect the distinct sound patterns from any of these local alerting devices, the controller function 250 can send an appropriate message via a gateway 300 to an emergency response agency 460.

The addition of the acoustic transducer 210, with both sound input and output capability, to the base unit 200 for the glass breakage option also allows the base unit 200 to be used by an emergency response agency 460 as a distributed microphone to listen into the activities of an intruder. Rather than analyzing the sound waves, the sound waves can be digitized and sent to the gateway 300, and then by the gateway 300 to the emergency response agency 460. After the gateway 300 has sent an alert message to the emergency response agency 460, the audio transducer can be available for use in an audio link. This two-way audio capability through the acoustic transducer 210 can be useful for more than just listening by an emergency response agency 460. Parents who are not home can listen into the activities of children who might be home. Similarly, a caregiver can use the two-way audio to communicate with an elderly person who might be living alone.

In a similar manner, the base unit 200 can contain optional algorithms for the sensing of motion in the room. Like glass breakage sensors, prior art motion sensors are widely available as standalone devices. Prior art motion sensors suffer from the same disadvantages cited for standalone glass breakage sensors, that is they are typically standalone devices requiring dedicated processors, circuits, and microwave generators. However, the base unit 200 already contains all of the hardware components necessary for generating and receiving the radio wave frequencies commonly used in detecting motion; therefore the base unit 200 only requires the addition of algorithms to process the signals for motion in addition to performing its reading of the transponders 100. Different algorithms are available for motion detection at microwave frequencies. One such algorithm is Doppler analysis. It is a well-known physical phenomenon that objects moving with respect to a transmitter cause a reflection with a shift in the frequency of the reflected wave. While the shift is not large relative to the carrier frequency, it is easily detectable. Therefore, the base unit 200 can perform as a Doppler radar by the rapid sending and receiving of radio pulses, with the subsequent measurement of the reflected pulse relative to the transmitted pulse. People and animals walking at normal speeds will typically generate Doppler shifts of 5 Hz to 50 Hz, depending on the speed and direction of movement relative to the base unit 200 antenna 206. The implementation of this algorithm to detect the Doppler shift can, at the discretion of the designer, be implemented with a detection circuit or by performing signal analysis using the processor of the base unit 200. In either case, the object of the implementation is to discriminate any change in frequency of the return signal relative to the transmitted signal for the purpose of discerning a Doppler shift. The base unit 200 is capable of altering its transmitted power to vary the detection range of this motion detection function.

These motion detection functions can occur simultaneously with the reading of passive transponders 150. Because the passive transponders 150 are fixed relative to the base units, no unintended shift in frequency will occur in the reflected signal. Therefore, for each transmitted burst to a passive transponder 150, the base unit 200 can analyze the return signal for both receipt of data from the passive transponder 150 as well as unintended shifts in frequency indicating the potential presence of a person or animal in motion.

By combining the above functions, the base unit 200 in one example single integrated package may be capable of (i) communicating with other base units 200 using high power RF communications, (ii) communicating with transponders using low power RF and backscatter wireless communications, (iii) detecting motion via Doppler analysis at microwave frequencies, (iv) detecting glass breakage and/or high decibel alerts via sound wave analysis of acoustic waves received via an audio transducer 210, and (v) providing a two-way audio link to an emergency response agency 460 via an audio transducer 210 and via a gateway 300. This base unit 200 achieves significant cost savings versus prior art security networks 400 through the avoidance of new wire installation and the sharing of communicating and processing circuitry among the multiple functions. Furthermore, because the base units 200 are under the control of a single master controller 251, the performance of these functions can be coordinated to minimize interference, and provide spatial diversity and redundant confirmation of received signals.

A microwave frequency motion detector implemented in the base unit 200 is only a single detection technology. Historically, single motion detection technologies, whether microwave, ultrasonic, or passive infrared, all suffer false positive indications. For example, a curtain being blown by a heating vent can occasionally be detected by a Doppler analysis motion detector. Therefore, dual technology motion detectors are sometimes used to increase reliability—for example by combining microwave Doppler with passive infrared so that motion by a warm body is required to trigger an alert. The inventive security network 400 implements a novel technique to implement dual technology motion sensing in a room without the requirement that both technologies be implemented into a single package.

Existing dual technology sensors implement both technologies into a single sensor because the sensors are only capable of reporting a "motion" or "no motion" condition to the alarm panel. This is fortunate, because present prior art alarm panels are only capable of receiving a "contact closed" or "contact open" indication. Therefore, all of the responsibility for identifying motion must exist within the single sensor package. The inventive controller function 250 can receive communications with a passive infrared sensor 570 mounted separately from the base unit 200. Therefore, if in a single room, the base unit 200 is detecting motion via microwave Doppler analysis and a passive infrared sensor 570 is detecting the presence of a warm body 710 as shown in FIG. 6, the master controller 251 can interpret the combination of both of these indications in a single room as the likely presence of a person.

Figure 14B:
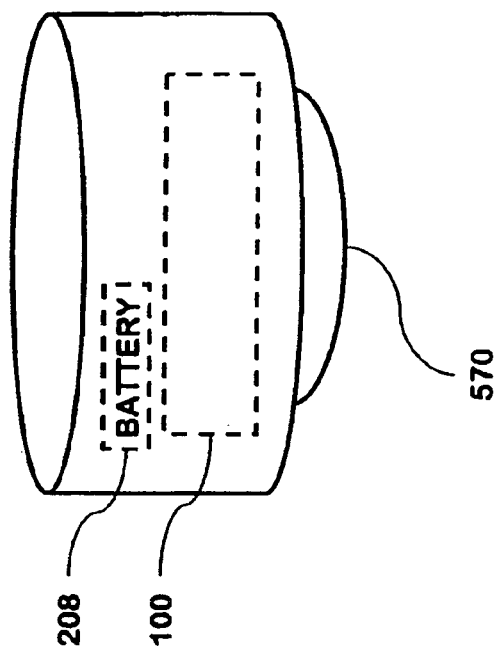
FIGS. 14A and 14B show alternate forms of a passive infrared sensor that may be used with the security system.
Figure 14A:
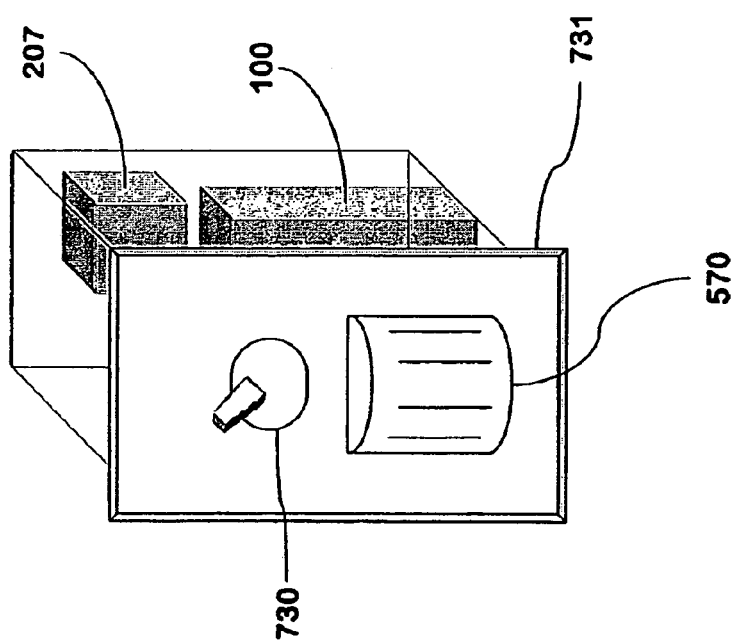

One embodiment of this passive infrared sensor 570 is in the form of a light switch 730 with cover 731 as shown in FIG. 14A. Most major rooms have at least one existing light switch 730, typically mounted at an average height of 55" above the floor. This mounting height is above the majority of furniture in a room, thereby providing a generally clear view of the room. Passive infrared sensors have previously been combined with light switches 730 so as to automatically turn on the light when people are in the room. More importantly, these sensor/switches turn off the lights when everyone has left, thereby saving electricity that would otherwise be wasted by lighting an unoccupied room. Because the primary purpose of these existing devices is to provide local switching, the devices cannot communicate with central controllers such as existing alarm panels.

The passive infrared sensor 570 that operates with the inventive security network 400 includes any of high power RF communications, low power RF communications, or modulated backscatter communications to permit the passive infrared sensor 570 to communicate with one or more controller functions 250 in base units 200 and be under control of the master controller 251. The passive infrared sensor 570 can therefore be combined with a transponder 100 or included in a base unit 200. At the time of system installation, the master controller 251 is configured by the user thereby identifying the rooms in which the base units 200 are located and the rooms in which the passive infrared sensors 570 are located. The master controller 251 can then associate each passive infrared sensor 570 with one or more base units 200 containing microwave Doppler algorithms. The master controller 251 can then require the simultaneous or near simultaneous detection of motion and a warm body, such as a person 710, before interpreting the indications as a probable person in the room.

Because each of the base units 200 and passive infrared sensors 570 are under control of the master controller 251, portions of the circuitry in these devices can be shut down and placed into a sleep mode during normal occupation of the building. Since prior art motion sensors are essentially standalone devices, they are always on and are always reporting a "motion" or "no motion" condition to the alarm panel. Obviously, if the alarm panel has been placed into a disarmed state because, for example, the building is being normally occupied, then these "motion" or "no motion" conditions are simply ignored by the alarm panel. But the sensors continue to use power, which although the amount may be small, is still a waste of AC or battery power. Furthermore, it is well known in the study of reliability of electronic components that "power on" states generate heat in electronic components, and it is heat that contributes to component aging and possible eventual failure.

The present security network 400 can selectively shut down or at least slow down the rate of the radiation from the base units 200 when the security network 400 is in a disarmed mode, or if the homeowner or building owner wants the security network 400 to operate in a perimeter only mode without regard to the detection of motion. By shutting down the radiation and transmissions used for motion detection, the security network 400 is conserving power, extending the potential life of the components, and reducing the possibility of interference between the base unit 200 and other products that may be operating in the same unlicensed band. This is advantageous because, for example, while people are occupying the building they may be using cordless telephones (or wireless LANs, etc.) and want to avoid possible interference from the base unit 200. Conversely, when the security network 400 is armed, there are likely no people in the building, and therefore no use of cordless telephones, and the base units 200 can operate with reduced risk of interference from the transmissions from cordless telephones.

In general, a passive transponder 150 has two primary functions: manage its wireless communications and monitor a state change of any attached multi-state device. The following description considers the example of a passive transponder 150 used for monitoring intrusions through a window or door opening. The description can be expanded to include any number of additional examples, however.

Figure 11:
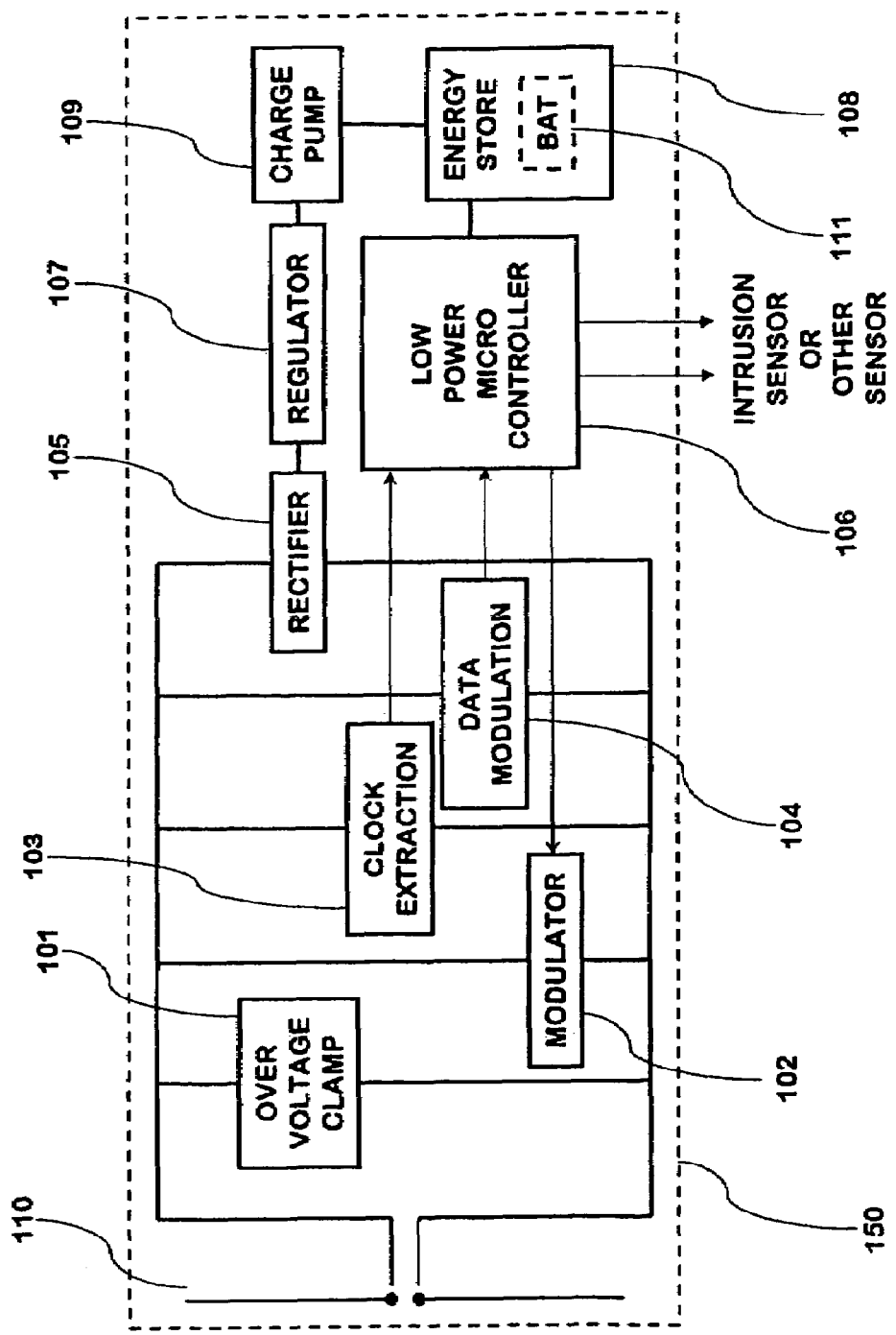
FIG. 11 shows an example architecture of a passive transponder.

A passive transponder 150, shown in FIG. 11, used with the inventive security network 400 achieves its advantage over wireless transmitters of prior art security systems through its low cost design. The passive transponder 150 contains no active radiation circuitry, and therefore the design can be limited to low frequency, low power circuitry. A passive transponder 150 can be designed with or without a battery, however the design choice will have an impact on the corresponding base unit 200 design. If a passive transponder 150 is designed without a battery, the base unit 200 will be required to transmit at a higher power level in order to generate a high enough electric field to power the passive transponder 150 circuits. The FCC rule sections cited herein permit the transmission of sufficient power to generate the necessary electric fields, but more expensive circuitry is required in the base unit 200 to achieve the necessary power levels. If a passive transponder 150 is designed with a battery, the base unit 200 can be designed using lower cost circuitry since the transmitted power will be necessary only for the backscatter modulation to work properly. The example considers cases of both with or without a battery contained in the passive transponder 150.

The passive transponder 150 typically engages in one or more of the following types of communications:
  receive parameter information;
  receive status requests;
  send status (which may include the state of an attached multi-state device); and
  send state change information about an attached multi-state device.

Because the passive transponder 150 uses backscatter modulation for sending communications to a base unit, the passive transponder 150 can never initiate communications as can a base unit 200. The passive transponder 150 can only respond to communications from a base unit 200. There are two possible methods by which a base unit 200 can communicate with a passive transponder: (i) listen first, then talk; or (ii) talk first, then listen.

In order to listen, the base unit 200 transmits a signal that the passive transponder 150 can backscatter modulate. The signal provided by the base unit 200 may be modulated or may simply be continuous wave. The communications from the passive transponder 150 will include the original signal along with the modulation from the passive transponder 150. The base unit 200 will typically subtract the provided signal from the communications returned from the passive transponder 150, thereby leaving only the modulation from the passive transponder 150.

When listening first, the base unit 200 first transmits its signal that enables communications from the passive transponders 150. One or more passive transponders 150 may elect to backscatter modulate the signal, thereby attempting to send communications to the base unit 200. After receiving communications from the one or more passive transponders 150, the base unit 200 may then talk to the passive transponders 150 if the base unit 200 has a communication to send. In order to talk, the base unit 200 transmits a message typically using one of the modulation schemes discussed herein. The transmitted message may include a reply to a communication from the one or more passive transponders 150, or may include a command, parameters, or overhead message. One type of reply is a confirmation of the communications received from the passive transponder 150. Another type of reply may be that the communications from the passive transponder 150 failed to be received.

When talking first, the base unit 200 first transmits its message, which then may be followed by the transmission of its signal that enables communications from the passive transponders 150. By talking first, the base unit 200 may direct a particular passive transponder 150 to communicate in return, or enable any passive transponder 150 with data to send to communicate in return.

Whether or not the passive transponder 150 contains a battery, it is preferred that the passive transponder 150 conserve power by operating in a periodic cycle. During a portion of the periodic cycle, it is preferred that the passive transponder 150 place some or all of its circuits in a low power or zero power state. For example, if the passive transponder 150 is designed using CMOS based circuitry, any clock used to drive the circuitry can be stopped since CMOS circuits use most of their power during clock or signal transitions. During other portions of the periodic cycle, sufficient circuitry may be enabled such that the passive transponder 150 can send communications to or receive communications from the base unit 200. It is not required that all passive transponders 150 within a single security network 400 use the same periodic cycle. Some may have longer cycles than others. If necessary, the controller function 250 may maintain a table listing each managed passive transponder 150 and its corresponding periodic cycle.

The master controller 251 in a security network 400 will typically establish certain operating parameters, which can vary from installation to installation. One of the parameters may be the periodic cycle on which the passive transponders 150 are to operate. These parameters may vary with the number of active and passive transponders 150 installed in a system, as well as with the present state of the system. For example, if a security network 400 is presently in the disarmed state, the master controller 251 may lengthen the periodic cycle which will cause less frequent communications and conserve more power in the transponders. If the security network 400 is presently armed, the periodic cycle may be shortened to enable more frequent communications to ensure the integrity of the system.

Other parameters that the master controller 251 may send to a passive transponder 150 may include identity information about the security network 400, identity information for each transponder 100, and keys that the passive transponder 150 may use for encryption or authentication in its communication with a base unit 200. In geographic areas where many security networks 400 may be simultaneously operating, the stored identity information may be useful in maintaining the desired associations between each security network 400 and its base units 200, transponders 100, and other active and passive transponders 150.

Many forms of the passive transponder 150 will be used to monitor and report upon the state of an attached sensor. For example, one form of the passive transponder 150 may monitor the open/closed state of a window or door via an intrusion sensor. An intrusion sensor 600 will typically be a two state device; however the passive transponder 150 may also support multi-state devices. The passive transponder 150 will typically report its status and the status of an attached sensor 600 or 620 periodically. This periodic status message serves as a "heartbeat" by which the base unit 200 can supervise each of the installed transponders. The periodicity of the status message may be set as one of the parameters sent by the master controller 251. Like the periodic cycle discussed herein, the periodicity of the status messages may vary with the present state of the system.

There are two other times when the passive transponder 150 may report its status: (i) in response to a status request message received from a base unit 200, or (ii) if the passive transponder 150 detects a change in the state of an attached sensor 600 or 620. If the passive transponder 150 does detect a change in the state of an attached sensor, the passive transponder 150 may interrupt the communications that may be occurring between a base unit 200 and a second passive transponder 150 or the passive transponder 150 may wait for next available listen signal from a base unit 200.

Because passive transponders 150 cannot initiate communications, there may be times when there is a time lag between the time that the passive transponder 150 detects a change in the state of an attached sensor or device and the time that the passive transponder 150 communicates with a base unit 200. The time lag will typically be based upon the operating parameters of the security network 400, and may only be one second or a few seconds. However, the existence of any time lag creates the possibility that the state may change more than once during the time lag. For example, an intruder may open and close a window or door in just a few seconds. Therefore, the passive transponder 150 may include a latch that records any change in state of an attached sensor or device, however brief the change of state may have been. The latch may be implemented using logic gates, such as a flip flop, or in the state machine or processor of the passive transponder 150. The latch typically holds the state change until at least the time that the passive transponder 150 communicates the state change to a base unit 200. The passive transponder 150 may either maintain the latched state change until the state change has been communicated or may maintain the latched state change until a base unit 200 sends a command that clears the latch.

One form of passive transponder 150 may typically be provided with an adhesive backing to enable easy attachment to the frame of an opening such as, for example, a window 702 frame or door 701 frame. Passive transponder 150 designs based upon modulated backscatter are widely known and the details of transponder 100 design are well understood by those skilled in the art. The passive transponder 150 functions may be implemented within a single chipset or may be implemented as separate components in a circuit on a printed circuit substrate. The passive transponder 150 receives and interprets commands from the base unit 200 by typically including circuits for clock extraction 103 and data modulation 104. The manner of implementing clock extraction 103 and data modulation 104 will depend upon the type of modulation used for wireless communications from the base unit 200 to the passive transponder 150. For example, if on-off keying is used, the data modulation 104 circuit can be as simple as a diode. More complicated designs have been shown in circuits such as those disclosed in U.S. Pat. Nos. 6,384,648 and 6,549,064. The microcontroller 106 can send data and status back to the base unit 200 by typically using a modulator 102 to control the impedance of the antenna 110. This modulator 102 may take the form of a single diode or FET or may be more complicated such as the patent examples cited herein. The impedance control alternately causes the absorption or reflection of the RF energy transmitted by the base unit 200 thereby forming the response wireless communications. The microcontroller 106 may be implemented as a state machine designed into a programmable logic array, or may be a processor controlled via firmware. Each of these embodiments are designer choices that do not affect the novelty of the invention.

Similarly, the energy store 108 has been shown internal to the passive transponder 150; however, part or all of the energy store 108 may be located off-board of the passive transponder 150 in order to provide more physical space for a larger energy store 108. If the energy store 108 is a battery with sufficient capacity, it is possible that the passive transponder 150 does not rely upon the power radiated from the base unit 200 to periodically charge the energy store 108. If, however, the energy store 108 is a capacitor or low capacity battery, then the passive transponder 150 may include energy management circuits such as an overvoltage clamp 101 for protection, a rectifier 105 and a regulator 107 to produce proper voltages for use by the charge pump 109 in charging the energy store 108 and powering the microcontroller 106.

Low cost chipsets and related components are available from a large number of manufacturers. In the present invention, the base unit 200 to passive transponder 150 radio link budget can be designed to operate at an approximate range of up to 30 meters. In a typical installation, each opening will have a passive transponder 150 installed. The ratio of passive transponders 150 to each base unit 200 will typically be 3 to 8 in an average residential home, although the technology of the present invention has no practical limit on this ratio. The choice of addressing range is a designer's choice largely based on the desire to limit the transmission of wasted bits. In order to increase the security of the transmitted bits, the passive transponders 150 can include an encryption algorithm. The tradeoff is that this will increase the number of transmitted bits in each message. The key to be used for encryption can be exchanged during enrollment.

Passive transponders 150 are typically based upon a modulated backscatter design. Each passive transponder 150 in a room can absorb power radiated from one or more base units 200 when the passive transponder 150 is being addressed, as well as when other passive transponders 150 are being addressed. In addition, the base units 200 can radiate power for the purpose of providing energy for absorption by the passive transponders 150 even when the base unit 200 is not interrogating any passive transponders 150. Therefore, unlike most RFID applications in which the passive transponders 150 or tags are mobile and in the read zone of a prior art base unit briefly, the passive transponders 150 of the present invention are fixed relative to the base units 200 and therefore always in the read zone of at least one base unit 200. Therefore, the passive transponders 150 have extremely long periods of time in which to absorb, integrate, and store transmitted energy.

In a typical day to day operation, the base unit 200 is making periodic transmissions. The master controller 251 will typically sequence the transmissions from the base units 200 so as to prevent interference between the transmissions of any two base units. The master controller 251 will also control the rates and transmission lengths, depending upon various states of the system. For example, if the security network 400 is in a disarmed state during normal occupancy hours, the master controller 251 may use a lower rate of transmissions since little or no monitoring may be required. When the security network 400 is in an armed state, the rate of transmissions may be increased so as to increase the rate of wireless communications between the base units 200 and the various sensors. The increased rate of wireless communications will reduce the latency from any attempted intrusion to the detection of the attempted intrusion. The purpose of the various transmissions will generally fall into several categories including: power transfer without information content, direct addressing of a particular passive transponder 150, addressing to a predetermined group of passive transponders 150, general addressing to all passive transponders 150 within the read range, and radiation for motion detection.

A passive transponder 150 can typically only send a response wireless communication in reply to a transmission from a base unit 200. Furthermore, the passive transponder 150 will typically only send a response wireless communication if the passive transponder 150 has information that it desires to communicate. Therefore, if the base unit 200 has made a globally addressed wireless communication to all passive transponders 150 asking if any passive transponder 150 has a change in status, a passive transponder 150 is not required to respond if in fact it has no change in status to report. This communications architecture reduces the use of resources on multiple levels. On the other hand, if an intrusion sensor 600 detects a probable intrusion attempt, it is desirable to reduce the latency required to report the probable intrusion attempt. Therefore, the communications architecture also includes a mechanism whereby a passive transponder 150 can cause an interrupt of the otherwise periodic transmissions of any category in order to request a time in which the passive transponder 150 can provide a response wireless communication with the details of the probable intrusion attempt. The interrupt might be, for example, an extended change of state of the antenna (i.e., from terminate to shorted) or a sequence of bits that otherwise does not occur in normal communications messages (i.e., 01010101). An example sequence may be: (a) the base unit 200 may be transmitting power without information content, (b) a first passive transponder 150 causes an interrupt, (c) the base unit 200 detects the interrupt and sends a globally addressed wireless communication, (d) the first passive transponder 150 sends its response wireless communications. This example sequence may also operate similarly even if in step (a) the base unit 200 had been addressing a second passive transponder; steps (b) through (d) may otherwise remain the same.

If the passive transponder 150 does not contain an energy store 108 with sufficient capacity, energy to power the passive transponder 150 is derived from the buildup of electrostatic charge across the antenna elements 110 of the passive transponder 150. As the distance increases between the base unit 200 and the passive transponder 150, the potential voltage that can develop across the antenna elements declines. For example, under 47 CFR 15.245 the base unit 200 can transmit up to 7.5 W power. At a distance of 10 m, this transmitted power generates a field of 1500 mV/m and at a distance of 30 m, the field declines to 500 mV/m.

The passive transponder 150 may therefore include a charge pump 109 in which to incrementally add the voltages developed across several capacitors together to produce higher voltages necessary to charge the on-board and/or off-board energy store 108 and/or power the various circuits contained within the passive transponder 150. Charge pump circuits for boosting voltage are well understood by those skilled in the art. For example, U.S. Pat. Nos. 5,300,875 and 6,275,681 contain descriptions of some circuits.

One embodiment of the passive transponder 150 can contain a battery 111, such as a button battery (most familiar use is as a watch battery) or a thin film battery. Batteries of these shapes can be based upon various lithium compounds that provide very long life. Therefore, rather than relying solely on a limited energy store 108 such as a capacitor, the passive transponder 150 can be assured of always having sufficient energy through a longer life battery 111 component. In order to preserve charge in the battery 111, the microcontroller 106 of the passive transponder 150 can place some of the circuits in the passive transponder 150 into temporary sleep mode during periods of inactivity. The use of the battery 111 in the passive transponder 150 typically does not change the use of the passive modulated backscatter techniques as the communications means. Rather, the battery 111 is typically used to enhance and assist in the powering of the various circuits in the passive transponder 150.

One means by which the passive transponder 150 replies to the base unit 200 uses a modulation such as On-Off Keyed (OOK) amplitude modulation. The OOK operates by receiving a carrier wave from the base unit 200 at a center frequency selected by the base unit, or a master controller 251 directing the base unit, and modulating marking (i.e., a "one") and spacing (i.e., a "zero") bits onto the carrier wave at shifted frequencies. The marking and spacing bits obviously use two different shifted frequencies, and ideally the shifted frequencies are selected so that neither creates harmonics that can confuse the interpretation of the marking and spacing bits. In this example, the OOK is not purely on and off, but rather two different frequency shifts nominally interpreted in the same manner as a pure on-off might normally be interpreted. The purpose is to actively send bits rather that using the absence of modulation to represent a bit. The use of OOK, and in particular amplified OOK, makes the detection and interpretation of the return signal at the base unit 200 simpler than with some other modulation schemes.

In addition to the charge pump 109 for recharging the battery 111, the passive transponder 150 may contain circuits for monitoring the charged state of the battery 111. This state can range from fully charged to discharged in various discrete steps, and can be reported from the passive transponder 150 to the base unit 200. For example, if the battery 111 is sufficiently charged, the passive transponder 150 can signal the base unit 200 using one or more bits in a communications message. Likewise, if the battery 111 is less than fully charged, the passive transponder 150 can signal the base unit 200 using one or more bits in a wireless communications message. Using the receipt of these messages regarding the state of the battery 111, if present, in each passive transponder 150, the base unit 200 can take actions to continue with the transmission of radiated power, increase the amount of power radiated (obviously while remaining within prescribed FCC limits), or even suspend the transmission of radiated power if no passive transponder 150 requires power for battery charging. By suspending unnecessary transmissions, the base unit 200 can conserve wasted power and reduce the likelihood of causing unwanted interference.

One form of the transponder 100, excluding those designed to be carried by a person or animal, is typically connected to at least one intrusion sensor 600. From a packaging standpoint, the present invention also includes the ability to combine the intrusion sensors 600 and the transponder 100 into a single package, although this is not a requirement of the invention.

The intrusion sensor 600 is typically used to detect the passage, or attempted passage, of an intruder through an opening in a building, such as window 702 or door 701. Thus the intrusion sensor 600 is capable of being in at least two states, indicating the status of the window 702 or door 701 such as "open" or "closed." Intrusion sensors 600 can also be designed under this invention to report more that two states. For example, an intrusion sensor 600 may have four states, corresponding to window 702 "closed," window 702 "open 2 inches," window 702 "open halfway," and window 702 "open fully."

In a typical form, the intrusion sensor 600 may simply detect the movement of a portion of a window 702 or door 701 in order to determine its current state. This may be accomplished, for example, by the use of one or more miniature magnets, which may be based upon rare earth metals, on the movable portion of the window 702 or door 701, and the use of one or more magnetically actuated miniature reed switches on various fixed portions of the window 702 or door 701 frame.

Other forms are also possible. For example, pressure sensitive contacts may be used whereby the movement of the window 702 or door 701 causes or relieves the pressure on the contact, changing its state. The pressure sensitive contact may be mechanical or electro-mechanical such as a MEMS device. Alternately various types of Hall effect sensors may also be used to construct a multi-state intrusion sensor 600. In any of these cases, the input/output leads of the intrusion sensor 600 are connected to, or incorporated into, the transponder 100 such that the state of the intrusion sensor 600 can be determined by and then transmitted by the transponder 100 in a message to the base unit 200.

Because the transponder 100 is a powered device (without or without the battery 111, the transponder 100 can receive and store power), and the base unit 200 makes radiated power available to any device within its read zone capable of receiving its power, other forms of intrusion sensor 600 design are also available. For example, the intrusion sensor 600 can itself be a circuit capable of limited radiation reflection. Under normally closed circumstances, the close location of this intrusion sensor 600 to the transponder 100 and the simultaneous reflection of RF energy can cause the generation of harmonics detectable by the base unit 200. When the intrusion sensor 600 is moved due to the opening of the window 702 or door 701, the gap between the intrusion sensor 600 and the transponder 100 will increase, thereby reducing or ceasing the generation of harmonics. Alternately, the intrusion sensor 600 can contain metal or magnetic components that act to tune the antenna 110 or frequency generating components of the transponder 100 through coupling between the antenna 110 and the metal components, or the switching in/out of capacitors or inductors in the tuning circuit. When the intrusion sensor 600 is closely located next to the transponder 100, one form of tuning is created and detected by the base unit 200. When the intrusion sensor 600 is moved due to the opening of the window 702 or door 701, the gap between the intrusion sensor 600 and the transponder 100 will increase, thereby creating a different form of tuning within the transponder 100 which can also be detected by the base unit 200. The intrusion sensor 600 can also be an RF receiver, absorbing energy from the base unit, and building an electrostatic charge upon a capacitor using a charge pump, for example. The increasing electrostatic charge will create an electric field that is small, but detectable by a circuit in the closely located transponder 100. Again, when the intrusion sensor 600 is moved, the gap between the intrusion sensor 600 and the transponder 100 will increase, causing the transponder 100 to no longer detect the electric field created by the intrusion sensor 600.

Another form of intrusion sensor 600 may be implemented with light emitting diode (LED) generators and detectors. At least two forms of LED-based intrusion sensor 600 are available. In the first form, shown in FIG. 25A, the LED generator 601 and detector 602 are incorporated into the fixed portion of the intrusion sensor 600 that is typically mounted on the window 702 or door 701 frame. It is immaterial to the present invention whether a designer chooses to implement the LED generator 601 and detector 602 as two separate components or a single component. Then a reflective material, typically in the form of a tape 603 can be attached to the moving portion of the window 702 or door 701. If the LED detector 602 receives an expected reflection from the LED generator 601, then no alarm condition is present. If the LED detector 602 receives a different reflection (such as from the paint of the window rather than the installed reflector) or no reflection from the LED generator 601, then an intrusion is likely being attempted. The reflective tape 603 can have an interference pattern 604 embedded into the material such that the movement of the window 702 or door 701 causes the interference pattern 604 to move past the LED generator 601 and detector 602 that are incorporated into the fixed portion of the intrusion sensor 600. In this case, the movement itself signals that an intrusion is likely being attempted without waiting further for the LED detector 602 to receive a different reflection or no reflection from the LED generator 601. The speed of movement is not critical, as it is the data encoded into the interference pattern 604 and not the data rate that is important. The use of such an interference pattern 604 can prevent easy defeat of the LED-based intrusion sensor 600 by the simple use of tin foil, for example. A different interference pattern 604, incorporating a different code, can be used for each separate window 702 or door 701, whereby the code is stored into the master controller 251 and associated with each particular window 702 or door 701. This further prevents defeat of the LED-based intrusion sensor 600 by the use of another piece of reflective material containing any other interference pattern 604. This use of the LED-based intrusion sensor 600 is made particularly attractive by its connection with a transponder 100 containing a battery 111. The LED generator 601 and detector 602 will, of course, consume energy in their regular use. Since the battery 111 of the transponder 100 can be recharged as discussed elsewhere, this LED-based intrusion sensor 600 receives the same benefit of long life without changing batteries.

A second form of LED-based intrusion sensor 600 is also available. In this form, the LED generator 601 and LED detector 602 are separated so as to provide a beam of light across an opening as shown in FIG. 25B. This beam of light will typically be invisible to the naked eye such that an intruder cannot easily see the presence of the beam of light. The LED detector 602 will typically be associated with the LED-based intrusion sensor 600, and the LED generator 601 will typically be located across the opening from the LED detector 602. In this form, the purpose of the LED-based intrusion sensor 600 is not to detect the movement of the window 702 or door 701, but rather to detect a breakage of the beam caused by the passage of the intruder through the beam. This form is particularly attractive if a user would like to leave a window 702 open for air, but still have the window 702 protected in case an intruder attempts to enter through the window 702. As before, it would be preferred to modulate the beam generated by the LED generator 601 so as to prevent easy defeat of the LED detector 602 by simply shining a separate light source into the LED detector 602. Each LED generator 601 can be provided with a unique code to use for modulation of the light beam, whereby the code is stored into the master controller 251 and associated with each particular window 702 or door 701. The LED generator 601 can be powered by a replaceable battery or can be attached to a transponder 100 containing a battery 111 so that the LED generator 601 is powered by the battery 111 of the transponder 100, and the battery 111 is recharged as discussed elsewhere. In this latter case, the purpose of the transponder 100 associated with the LED generator 601 would not be to report intrusion, but rather only to act to absorb RF energy provided by the base unit 200 and charge the battery 111.

In each of the cases, the transponder 100 is acting with a connected or associated intrusion sensor 600 to provide an indication to the base unit 200 that an intrusion has been detected. The indication can be in the form of a message from the transponder 100 to the base unit, or in the form of a changed characteristic of the transmissions from the transponder 100 such that the base unit 200 can detect the changes in the characteristics of the transmission. It is impossible to know which form of intrusion sensor 600 will become most popular with users of the inventive security network 400, and therefore the capability for multiple forms has been incorporated into the invention. Therefore, the inventive nature of the security network 400 and the embodiments disclosed herein is not limited to any single combination of intrusion sensor 600 technique and transponder 100.

In addition to the modulation scheme, the security network 400 may include an RF access protocol that contains elements of various layers of the OSI communications reference model. This invention is not specific to any chosen framing, networking, or related technique, however there are a number of characteristics of the RF access protocol that are advantageous to the invention.

It is preferred that base units 200 belonging to a common security network 400 are organized into a common frequency plan. Each base unit 200 described herein is a wireless transmitter. For high power RF communications, base units 200 are governed by 47 CFR 15.247, which may require each base unit 200 to periodically frequency hop. It is preferred that the hopping sequences be organized in time and frequency such that no two base units 200 attempt to operate on the same frequency at the same time. Even in an average home, a security network 400 of the present invention may typically include between 4 and 10 base units 200 whose frequency management may be more complex than the few cordless phones and/or a WiFi network that may also be collocated there. 47 CFR 15.247 permits some forms of frequency coordination to minimize interference and collisions, and it is preferred that any base unit 200 take advantage of those permissions.

Frequency coordination between the base units 200 contained in separate but nearby security networks 400 may be required. Each security network 400 will typically be operating its own network with its own frequency plan, but in preferred implementations, the security networks 400 detect and coordinate in both time and frequency. This may be accomplished in the following example manner. The base units 200 in any first security network 400 will typically have periods of time in which no transmissions are required. Rather than idle, these base units 200 may periodically scan the frequency band of interest to determine the presence of other transmitters. Some of the other transmitters will be cordless phones and WiFi wireless access points. The scanning base units 200 can note the presence and frequency location of these other devices, especially the WiFi devices that typically maintain fixed frequencies. If the scanning base units 200 note that the same devices continue to consistently occupy the same frequency locations, the first security network 400 may opt to avoid those frequency locations to avoid interference. If the scanning base units 200 discover transmitters that are base units 200 from a second security network 400, the first security network 400 can frequency coordinate with the second security network 400. Then, rather than avoiding certain frequency locations to avoid interference, the two systems can share common frequencies as long as any specific frequency location is not simultaneously used by the two systems.

In order to improve coordination between base units, whether part of the same security network 400 or separate but nearby security networks 400, it may be advantageous for the base units 200 to synchronize their internal timing with each other. Since any chosen RF access protocol will likely organize its transmissions into bursts, operation of the systems will typically be improved if the timing between base units 200 is synchronized so that bursts are both transmitted and received at expected times. One method by which this may be accomplished is by establishing one base unit 200 as a timing master; then each other base unit 200 may derive its own internal timing by synchronizing with the timing master. This synchronization may be accomplished by the base unit 200 listening to certain bursts transmitted from the timing master and then adjusting the base unit's timing accordingly. This may be accomplished, for example, by monitoring the framing boundaries or synchronization words of transmitted frames. The base unit 200 designated as timing master may or may not be the same as the device containing the present master controller 251.

If sufficient timing and frequency coordination between separate but nearby security networks 400 has been established, these separate systems may also communicate with each other by establishing periodic frequencies and times at which messages are passed between the systems. This ability to pass messages between adjacent systems enables various forms of neighborhood networking to take place as described herein.

The RF access protocol may establish periods of time for communications between base units 200 and periods of time for communications between base units 200 and transponders 100. Base units 200 will typically transmit a wireless signal to the transponders at periodic intervals. During the time of these transmitted wireless signals, the passive transponders 150 may elect to backscatter modulate the transmitted wireless signals if any of the passive transponders 150 have information to communicate. The periodic intervals may change depending upon the state of the security network 400. For example, when the security network 400 is in an armed state, the base units 200 may transmit a wireless signal to passive transponders 150 every two seconds. This means that any state change at an intrusion sensor may be communicated to the master controller 251 within two seconds. However, when the security network 400 is in a disarmed state, the base units 200 may slow down their rate of transmitting wireless signals to the passive transponders 150 to every 30 seconds, for example, in to conserve power. The actual times may vary in practice, of course.

The rate of scanning is one of several parameters that the base units 200 may transmit to the transponders 100. These parameters as a group may be used by the various transponders 100 to determine their respective operation. The rate of scanning may be used by the transponders 100 to determine how often the transponders 100 should attempt to receive communications from the base units 200 as well as when and how often a transponder 100 has an opportunity to respond to a wireless communication from the base unit 200. Transponder 100 may place some or all of its circuits to sleep during intervals of time when the transponder 100 is not expecting to receive communications nor has any data to send. As the rate of scanning changes, the length of sleep intervals may also change.

The RF access protocol may or may not include encryption and authentication as part of its message structure. Radio waves can propagate over significant distances, and the communications between base units 200 and with transponders 100 can be intercepted by a technically knowledgeable intruder. If the designer of a security network 400 under the present invention is concerned about the interception of communications, the messages may be encrypted. During the manufacture and/or configuration of the security network 400, keys may be provided to the various active and passive transponders. Once the devices have the keys, and the keys are known by the controller functions, the keys may be used for authentication and/or encryption.

Authentication is a process that typically involves the determination of a challenge message using a predetermined method and typically involving at least one key. The challenge message is then sent from a first device to a second device. The second device typically then determines a response message using a predetermined method and typically involving both the challenge message and at least one key. The premise is that only a valid second device knows both the method and the key required to properly respond to the challenge from the first device. There are many authentication processes known by those skilled in the art, almost any of which can be applied to the present security network 400.

Encryption is a related process that typically involves both a first key and a predetermined method for using the first key to encode or encrypt a message. The encrypted message is then sent from a first device to a second device. The second device can typically decrypt or decode the message using a predetermined method and typically involving a second key known to the second device. The first key and the second key may be the same, or may have some other predetermined relationship that allows one key to decrypt messages from another key. It may be advantageous for the keys to be different so that if one key is compromised, it is possible to maintain the integrity of the remainder of the system.

The present security network 400 may be controlled by the user via a keypad interface 265, which may be implemented in a handheld unit 260 or tabletop unit 261 for example. However, the present security network 400 also supports a novel method for configuration primarily using voice recognition. This novel method is not necessarily specific to a security network 400 employing communication methods as disclosed herein, but may also be applied to other types of security systems such as those of the prior art.

Figure 19:
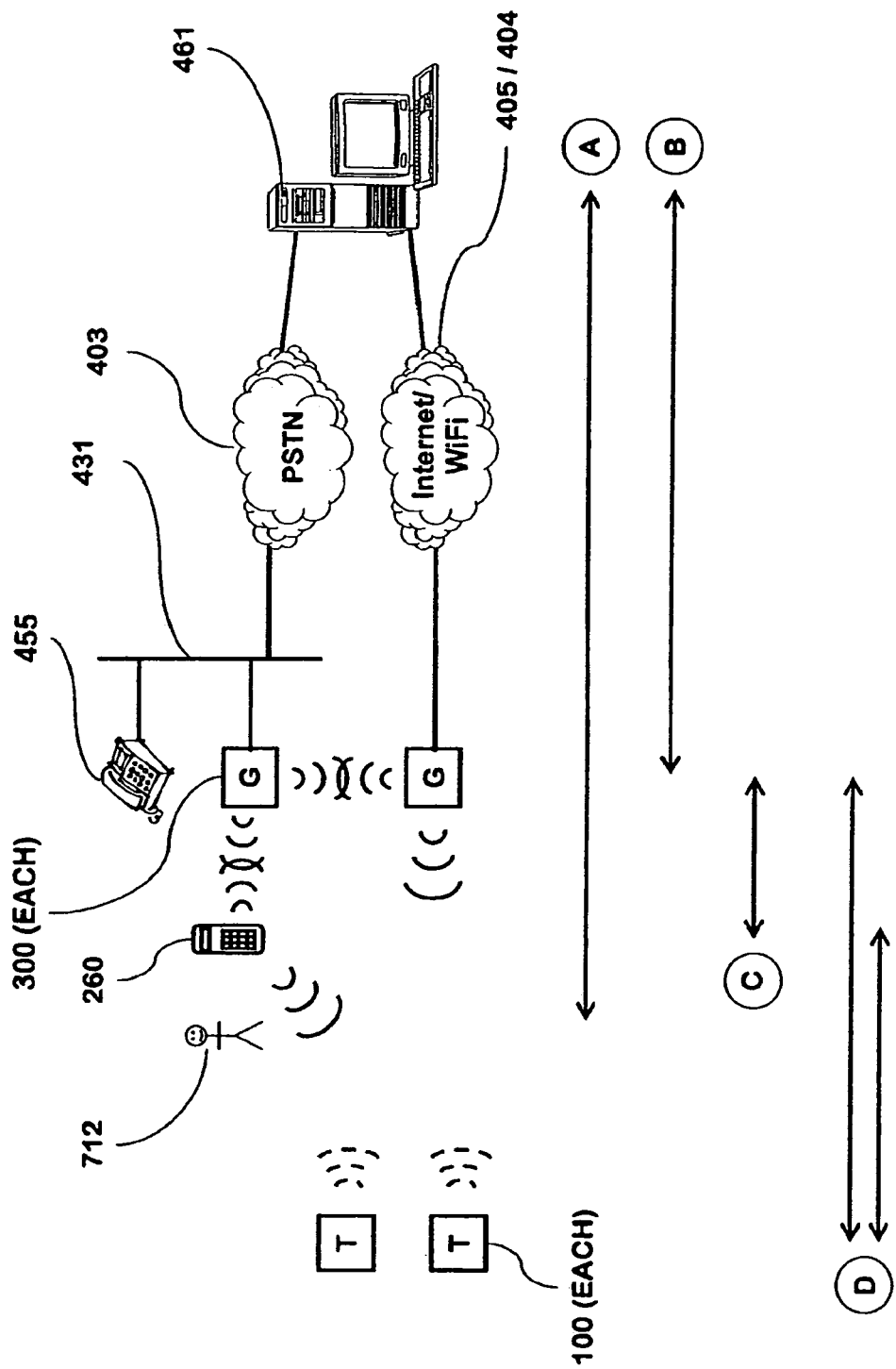
FIG. 19 shows the multiple communications paths that may exist during the configuration of the security network or a security system.

Most security networks 400, especially those that will be monitored, include a modem 310. In the security network 400 of the present invention, the modem 310 is contained in a gateway 300. Then, after all of the components of the security network 400 are installed in the building and the modem is connected to the telephone line 431 the following process is then used to configure the security network 400:

1. The user 712 (or owner or operator) uses a base unit 200 with an acoustic transducer 210 or even a telephone 455 connected to the same telephone line 431 as the modem 310 to call a remote server or remote processor 461, which may typically be located at a emergency response agency 460. The user interaction is depicted by arrow A in FIG. 19.

2. The remote processor 461 runs a configuration program that may include voice recognition and voice response. Data may be exchanged between the configuration program on the remote processor 461 and the modem 310 using DTMF, data over voice, data under voice, or similar modulation techniques that enable voice and data to share the same telephone line 431 (data exchange is depicted by arrow B in FIG. 19). Furthermore, data may be exchanged between base units 200 (depicted by arrow C in FIG. 19) and between base units 200 and transponders 100 (depicted by arrows D in FIG. 19) during the configuration process.

3. When the user has finished the configuration program, the user may hang up the telephone 455 or terminate the voice conversation on the base unit 200 with acoustic transducer 210. However, the modem 310 attached to the same telephone line 431 may hold the telephone line 431 active.

4. The remote processor 461 and the modem 310 may engage in a data exchange in which software, parameters, and other configuration data may be downloaded.

5. The modem 310 releases the telephone line 431 when the download is complete.

There are many advantages to this configuration process:

The security network 400 is not burdened with the program code and data required to run a configuration program that includes voice recognition and voice response. The amount of memory required to support this program code and data can be substantial, and it is generally only required at initial setup.

The remote processor 461 can have more substantial processing power, and therefore execute more complex algorithms for voice recognition than a low cost microprocessor that might typically be used in a security network 400. More complex algorithms will generally perform with better voice recognition accuracy. Additionally, the remote processor 461 can include the data to support multiple languages so that the user can interact in the language most comfortable to the user.

The remote processor 461 can customize the configuration program queries and responses to the exact configuration present in the security network 400. For example, if the security network 400 contains only two transponders 100, then the configuration program need only ask the user to identify the labels or names of the two transponders 100 rather can continuing in an endless loop that the user must manually terminate.

During the data exchange (arrow B), updated software can be downloaded into the security network 400. By calling the remote processor 461 prior to using the security network 400, the user 712 is ensured of always receiving the latest version of software, even if the security network 400 was manufactured many months before the actual purchase.

During the configuration program, the user 712 can be offered additional software-based features for purchase. These features may not be part of the basic security network 400. If the user chooses to purchase the additional software-based features, this new software can be downloaded to the security network 400 during the data exchange (arrow B).

The remote processor 461 maintains a copy of the configuration for the security network 400 in a database in the event of catastrophic loss of data in the security network 400. The user can retrieve the configuration from the database in the remote processor 461 whenever needed.

As needed or requested, the remote processor 461 can send copies of the configuration to an emergency response agency 460. If necessary, the remote processor 461 can convert the format of the configuration data into a format compatible with the requirements of the appropriate emergency response agency 460. These formats may vary from one agency to another, and therefore the security network 400 is not burdened with the program code necessary to support multiple formats.

The user 712 can create his or her own spoken labels for different zones, base units 200, transponders 100, or other components of the security network 400. In the case of the inventive security network 400, which can support voice response, these labels can be downloaded to the inventive security network 400 during the data exchange. Then, if the security network 400 needs to identify a specific zone, base unit 200, transponder 100, or other component, the inventive security network 400 can play back the user's 712 own spoken label via an acoustic transducer 210 in a base unit 200.

It is preferable that the remote processor 461 and the security network 400 engage in an authentication and/or encryption process to protect the configuration data exchanged between the remote processor and the security network 400. While it is unlikely that an intruder would be monitoring the telephone line 431 at the exact moment that the user 712 (or owner or operator) is configuring the security network 400 for the first time, it is possible that a technically knowledgeable intruder might attempt later to compromise the security network 400 by accessing the telephone line 431 exterior to the building. For example, one attempt at compromise might be to connect a telephone to the telephone line 431 exterior to the building, call the remote processor 461, and attempt to reconfigure the security network 400.

One means by which the security network 400 and its configuration can be protected is by storing a user identity, a password, and a key at the remote server or remote processor 461. When a user calls the remote processor 461 for the first time, the security network 400 attached via the modem 310 to the telephone line 431 will be in a starting state with no configuration. There will also be no user record on the remote processor 461. The user 712 will be required to initiate a user record, beginning with a user identity and password. The user identity may be the home telephone number, or any other convenient identity. The remote processor 461 may detect that the security network 400 is in a starting state, and can assign a first key to the user record and a second key to the security network 400. The first and second keys may be the same key or may be another predetermined relationship that enables the remote processor 461 and the security network 400 to engage in an authentication process and/or an encryption process. Different types of authentication and encryption processes are known to those skilled in the art, and any acceptable process may be implemented. An example of each process has been provided herein. Instead of the remote processor 461 assigning a key to the security network 400, it is also acceptable for the security network 400 to contain a predetermined key that is then provided to the remote processor 461 by the user or the security network 400. It is preferable that whichever method is used for the exchange of keys between the user, security network 400, and remote processor 461, that the keys be provided only once over the telephone line. Keys are most useful when their values are not discovered by someone that might attempt an intrusion, and by providing the keys only once the chances of discovery by monitoring the telephone line 431 are minimized.

Once the remote processor 461 contains a first key associated with the user record, and the security network 400 contains a second key, any attempt to change the configuration of the security network 400 will require the use of the keys. An intruder attempting to compromise the security network 400 by accessing the telephone line 431 exterior to the building would be required to know the user identity and password in order to access the user record in the remote processor 461, and the first key can only be used by accessing the user record.

The inventive security network 400 can assist the user during the configuration program by providing certain data (arrows B, C, D) to the remote processor 461 during the call while the user is interacting (arrow A) with the configuration program. The certain data may include the number of base units 200, the transponders 100 within detection range of each base unit 200, and the number of gateways 300 and other devices within the security network 400. This data may be sent to the remote processor 461 while the user is interacting with the configuration program (arrow A) either by modulating the data outside of the normal audio bandwidth of a telephone call or using a modulation like DTMF tones to send the data within the audio bandwidth. In a similar manner, the remote processor 461 may send certain commands to the security network 400. For example, it may be advantageous for the remote processor 461 to cause certain base units 200 to emit a short tone or spoken phrase to identify itself. Then the user 712 may provide an audio label to the base unit 200 that had emitted the short tone.

While advantageous, it is not required that the security network 400 exchange data on the same telephone line or telecommunications interface on which the user is interacting with the remote processor 461. It is also possible for the security network 400 to connect to the remote processor 461 using one telecommunications interface, such as an Ethernet based interface, while the user is interacting with the remote processor 461 using a telephone line, for example. The remote processor 461 may authenticate the user using a password and may separately authenticate the security network 400 using an authentication key.

One advantageous interface mechanism available for use with the security network 400 is voice recognition and voice response. When a base unit 200 is manufactured with an acoustic transducer 210, the base unit 200 can also include software-based functionality in the program code to interpret spoken words as commands to the security network 400. Similarly, the security network 400 can respond to spoken word commands with spoken word responses or tones. Software to perform voice recognition and voice response is widely available and known to those skilled in the art, though most existing software must be modified to support the relative noisy environment of the typical home. U.S. Pat. No. 6,574,596, issued to Bi, et al., provides one example description of voice recognition, as do several well-known textbooks. With the voice recognition and voice response as the primary interface mechanism, it is possible to implement a version of the inventive security network 400 with no keypad 265. The base units 200 with acoustic transducers 210 can be used by authorized users to perform various functions, including the day to day functions such as arming and disarming the system. One attractive advantage of incorporating voice recognition and voice response into the security network 400 via the acoustic transducer 210 in the base unit 200 is that the security network 400 can be armed or disarmed from any room in the house in which a base unit 200 is installed. The voice commands received at a single base unit 200 can be communicated to the controller functions 250 of all other devices in the security network 400.

In addition to its support of multiple modulation schemes, the base unit 200 is available in an embodiment with multiple antennas 206 that enables the base unit 200 to subdivide the space into which the base unit 200 transmits and/or receives. It is well known in antenna design that it is desirable to control the radiation pattern of antennas to both minimize the reception of noise and maximize the reception of desired signals. An antenna that radiates equally in all directions is termed isotropic. An antenna that limits its radiation into a large donut shape can achieve a gain of 2 dBi. By limiting the radiation to the half of a sphere above a ground place, an antenna can achieve a gain a 3 dBi. By combining the two previous concepts, the gain can be further increased. By expanding upon these simple concepts to create antennas that further limit radiation patterns, various directional gains can be achieved. The base unit 200 circuit design permits the construction of embodiments with more than one antenna, whereby the transceiver circuits can be switched from one antenna to another. In one embodiment, the base unit 200 will typically be plugged into an outlet 720. Therefore, the necessary coverage zone of the base unit 200 is logically bounded by the planes created by the floor below the reader and the wall behind the reader. Therefore, relative to an isotropic antenna, the read zone of the base unit 200 should normally be required to cover the space contained within only one-quarter of a sphere. Therefore, a single antenna configured with the base unit 200 should typically be designed for a gain of approximately 6 dBi.

Figure 22B:
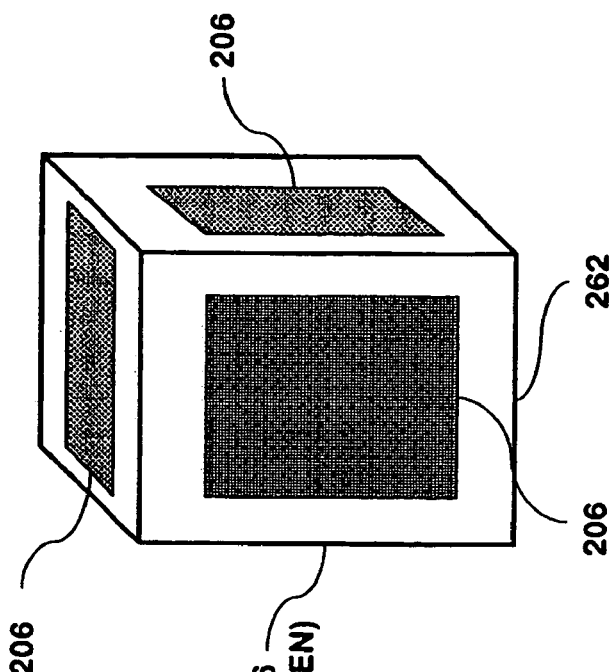
FIGS. 22A and 22B show the locations on the base unit where patch or microstrip antennas may be mounted so as to provide directivity to the transmissions.
Figure 22A:
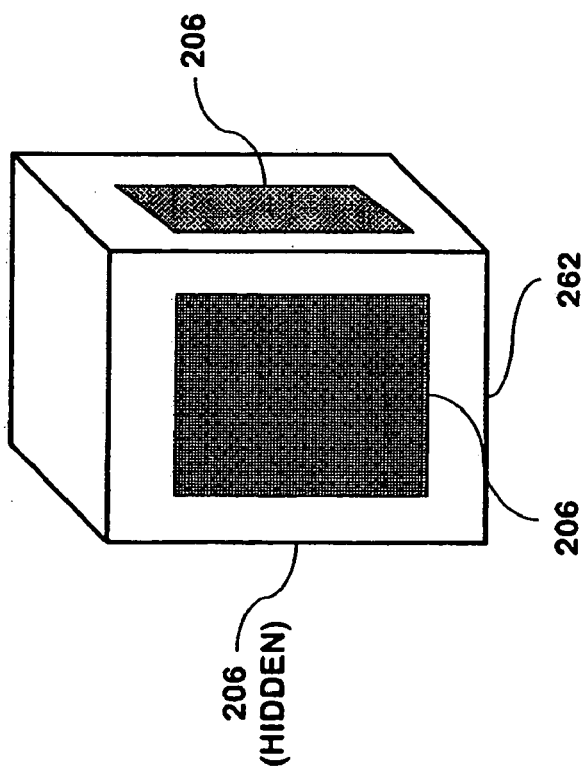

However, it may be desirable to further subdivide this space into multiple subspaces, for example a "left" and a "right" space, with antenna lobes that overlap in the middle. Each antenna lobe may be then able to increase its design gain to approximately 9 dBi or more. Since the base units 200 and transponders are fixed, the base unit 200 can "learn" in this example "left"/"right" configuration which transponders have a higher received signal strength in each of the "left" and "right" antennas 206. The simplest method by which this can be achieved is with two separate antennas 206, with the transceiver circuits of the base unit 200 switching between the antennas 206 as appropriate for each transponder 100. This enables the base unit 200 to increase its receiver sensitivity to the reflected signal returning from each transponder 100 while improving its rejection to interference originating from a particular direction. This example of two antennas 206 can be expanded to three or four antennas 206. Each subdivision of the covered space can allow a designer to design an increase in the gain of the antenna 206 in a particular direction. Because the physical packaging of the base unit 200 has physical depth proportionally similar to its width, a three antenna 206 pattern is a logical configuration in which to offer this product, where one antenna 206 looks forward, one looks left, and the other looks right. An alternate configuration which is equally logical, can employ four antennas 206, one antenna 206 looks forward, the second looks left, the third looks right, and the fourth looks up. These example configurations are demonstrated in FIGS. 22A and 22B. To aid in visual understanding, the antennas shown in FIGS. 22A and 22B appear to be microstrip or patch antennas, however the invention is not intended to be limited to those antenna forms. Other forms of antennas such as dipole, bent dipole, helical, etc. that are well known in the art can also be used without subtracting from the invention.

There are multiple manufacturing techniques available whereby the antennas can be easily printed onto circuit boards or the housing of the base unit 200. For example, the reader is directed to Compact and Broadband Microstrip Antennas, by Kin-Lu Wong, published by Wiley, 2002, as one source for a description of the design and performance of microstrip antennas. This present specification is not recommending the choice of any one specific antenna design, because so much relies on the designer's preference and resultant manufacturing costs. However, when considering the choice for antenna design for both the base unit 200 and the transponder 100, the following should be taken into consideration. Backscatter modulation relies in part upon the Friis transmission equation and the radar range equation. The power $P_r$ that the receiving base unit 200 can be expected to receive back from the transponder 100 can be estimated from the power $P_t$ transmitted from the transmitting base unit, the gain $G_t$ of the transmitting base unit 200 antenna, gain $G_r$ of the receiving base unit 200 antenna, the wavelength $\lambda$ of the carrier frequency, the radar cross section $\sigma$ of the transponder 100 antenna, and the distances $R_1$ from the transmitting base unit 200 to the transponder 100 and $R_2$ from the transponder 100 to the receiving base unit 200. (Since more than one base unit 200 can receive a wireless communication from the transponder, the general case is considered here.) The radar range equation is then:

$$P_r = P_t \cdot \sigma \cdot [G_t \cdot G_r / 4\pi] \cdot [\lambda / 4 R_1 R_2]^2$$

Therefore, the designer should consider antenna choices for the base units 200 and transponders 100 that maximize, in particular, $G_r$ and $\sigma$. The combination of $P_t$ and $G_t$ cannot result in a field strength that exceeds the prescribed FCC rules. The foregoing discussion of microstrip antennas does not preclude the designer from considering other antenna designs. For example, dipoles, folded dipoles, and log periodic antennas may also be considered. Various patents such as U.S. Pat. Nos. 6,147,606, 6,366,260, 6,388,628, 6,400,274, among others show examples of other antennas that can be considered. Unlike other applications for RFID, the security network 400 of the present invention uses RFID principles in a primarily static relationship. Furthermore, the relationship between the base unit 200 antennas and transponder 100 antennas will typically be orthogonal since most buildings and homes have a square or rectangular layout with largely flat walls. This prior knowledge of the generally static orthogonal layout should present an advantage in the design of antennas for this RFID application versus all other RFID applications.

In addition to performing the functions described herein within a single building or home, the security network 400 in one building can also operate in concert with an inventive security network 400 installed in one or more other buildings through a networking capability. There are two levels of networking supported by the security network 400: local and server-based. Local networking operates using high power RF communications between security networks 400 installed in two different buildings. Because of the power levels supported during high power RF communications, the distance between the security networks 400 in the two buildings can be a mile or greater, depending upon terrain. Each of the security networks 400 remains under the control of their respective master controllers 251, and the controller function 250, including both the program code and configuration data, of each device remains dedicated to its own security network 400. However, an authorized user of one security network 400 and an authorized user of a second security network 400 can configure their respective systems to permit communications between the two security networks 400, thereby creating a network between the two systems. This network can exist between more than just two systems; for example, an entire neighborhood of homes, each with an inventive security network 400, can permit their respective security networks 400 to network with other security networks 400 in the neighborhood.

When two or more security networks 400 are networked using high power RF communications, various capabilities of each security network 400 can be shared. For example, a first security network 400 in a first home 740 can access a gateway 300 associated with a second security network 400 in a second home 741 (as shown in FIG. 17). This may be advantageous if, for example, an intruder were to cut the phone line associated with the first home 740, thereby rendering useless a gateway 300 containing a modem 310 installed in the first security network 400. It is unlikely that an intruder would know to cut the phone lines associated with multiple homes. In another example, if a child wearing a transponder 100 associated with the first security network 400 is present in the second home, the second security network 400 can communicate with the transponder 100 on the child and provide the received transponder 100 data to the first security network 400, thereby enabling a parent to locate a child at either the first home or the second home. In yet another example, if the first security network 400 in the first home 740 causes an alert the first security network 400 can request the second security network 400 to also cause an alert thereby notifying the neighbors at the second home 741 of the alert and enabling them to investigate the cause of the alert at the first home 740. This may be useful if for example the occupants are away on travel. In yet another example, the base units 200 in a second security network 400 in a second home 741 may be within communications range of the transponders 100 in a first security network 400 in a first home 740. The base units 200 in the second security network 400 may forward any received communications to the controller function 250 in the first security network 400, thereby providing another form of spatial antenna diversity. This may be particularly useful for any transponders 100 located outside of the home where the first security network 400 is installed.

When two security networks 400 are beyond the range of communications via high power RF communications, the security networks 400 may still form a network through their respective gateways. The security networks 400 may either network through direct connection between their respective gateways 300 or may network through an intermediate remote server 461. The use of an intermediate remote server 461 can enable the first security network 400 and the second security network 400 to have different types of communications modules (i.e., modem, Ethernet, WiFi, USB, wireless, etc.) installed in the gateway 300 of each respective security network 400. Since a commercial emergency response agency 460 will likely already have servers 461 equipped to support the various types of communications modules installed in various gateways, the provision of an intermediate server for networking security networks 400 may present an expanded business opportunity.

Networking through intermediate remote servers 461 expands the applications and usefulness of the inventive security network 400. For example, there may be a caregiver that would like to monitor an elderly parent living alone in another city. Using the networking feature, the caregiver can monitor the armed/disarmed status of the security network 400 in the home of the elderly parent, use two-way audio and/or the camera 213 of the security network 400 to check on the elderly parent, and monitor any transponder 100 worn by the elderly parent. This may be equally useful for parents to monitor a student living away at college or other similar family situations.

In either form of networking, the security network 400 can provide an authentication mechanism to ensure that networking is not inadvertently enabled with another unintended security network 400. The authentication mechanism may consist of the mutual entering of an agreed security code in each of the two security networks 400 which are to network. In their communications with each other, the two security networks 400 may send and verify that the security codes properly match before permitting various operations between the two systems. Other authentication mechanisms may also be used, such as the shared use of a designated master key. In this example, rather that requiring the mutual entering of an agreed security code, each of the security networks 400 which are to network can be required to first read the same designated master key.

Other embodiments of transponders 100 may exist under the present invention. Two example forms of passive infrared sensors 570 can be created by combining a passive infrared sensor 570 with the circuits of the transponder 100. As shown in FIG. 14A, in one embodiment the passive infrared sensor 570 with its power supply 207 is integrated into the packaging of a light switch 730. Within this same packaging, a transponder 100 is also integrated. The passive infrared sensor 570 operates as before, sensing the presence of a warm body 710. The output of the passive infrared sensor 570 circuits is connected to the transponder 100 whereby the transponder 100 can relay the status of the passive infrared sensor 570 (i.e., presence or no presence of a warm body 710 detected) to the base unit 200, and then to the master controller 251. At the time of system installation, the master controller 251 is configured by the user thereby identifying the rooms in which the base units 200 are located and the rooms in which the passive infrared sensors 570 are located. If desired, the master controller 251 can then associate each passive infrared sensor 570 with one or more base units 200 containing microwave Doppler algorithms. The master controller 251 can then require the simultaneous or near simultaneous detection of motion and a warm body 710, such as a person, before interpreting the indications as a probable person in the room.

It is not a requirement that the passive infrared sensor 570 be packaged into a light switch 730 housing. As shown in FIG. 14B, in another embodiment the passive infrared sensor 570 is implemented into a standalone packaging. In this embodiment, both the passive infrared sensor 570 and the transponder 100 are battery powered so that this sensor/transponder 100 combination can be located anywhere within a room. So, for example, this embodiment allows the mounting of this standalone packaging on the ceiling, for a look down on the covered room, or the mounting of this standalone packaging high on a wall.

A single security network 400 is comprised of various embodiments of base units 200 and transponders 100 that the end-user desires to associate with each other. There may be multiple security networks 400 installed in close proximity to each other, such as within a single building, group of buildings, or neighborhood. It is therefore important that the proper base units 200 and transponders 100 become enrolled with the proper security network 400, and not mistakenly enrolled with the wrong security network 400. Base units 200 that are enrolled with the master controller 251 of a security network 400 may be controlled by that master controller 251. Similarly, transponders 100 enrolled with the master controller 251 of a security network 400 will be monitored by that security network 400. For the purposes of describing the various processes and states during configuration and enrollment, the terminology of the following paragraph shall be used.

The security network 400 within an end-user's residence (or similar singular premise, whether residential, commercial, or otherwise) shall be termed the home security network 400. This example residence may be 740 in FIG. 17. Other security networks 400 within RF communications range of the home security network 400, but whose components are not owned by the end-user or intended to be enrolled with the home security network 400, are termed neighbor security networks 400. This may be in example residence 741. There may, of course, be multiple neighbor security networks 400 within RF communications range of the home security network 400. Individual components of a security network 400, such as the various embodiments of base units 200 and transponders 100, may be in one of two states with respect to the various processes of configuration and enrollment: enrolled or not enrolled. Each security network 400 will typically have a separate network identifier, or network ID, that is unique from the network ID of all other security networks 400 within RF communications range of the security network 400. Individual components of a home security network 400, such as the various embodiments of base units 200 and transponders 100, will typically each have a serial number that is unique from the serial numbers of other components in use with any neighbor security network 400 within RF communications range of the home security network 400. The serial number for a specific component may or may not be assigned at the time of manufacture. If the serial number is not assigned at the time of manufacture, the home security network 400 for a component may assign a serial number to that component. This may typically happen, for example, at the time of enrollment. It is particularly advantageous if the serial numbers assigned to components were encoded in a manner that identified that type of component. For example, a different numeric or alphanumeric range may be assigned to each type of component.

When a component is first purchased and brought within RF communications range of a home security network 400, it will typically be in a state of "not enrolled." The component will remain in a state of not enrolled until the home security network 400 takes action to enroll that component. If the component, such as a base unit 200 or a transponder 100, contains a power source, such as a battery, or becomes powered, such as by plugging the component into an outlet, connecting a battery, or receiving transmitted RF power, the component may begin communicating according to a predetermined algorithm. The home security network 400 may receive communications from the component, even though in the state of not enrolled, but may not manage or monitor the component. The home security network 400 may notify the end-user that a component has been detected, but that the component is in a state of not enrolled. The end-user may then decide whether to enable the home security network 400 to enroll the component with the home security network 400.

Some components may be capable of storing their enrolled/not enrolled state within the component itself. Other components may not be capable of storing their enrolled/not enrolled state, and therefore the home security network 400 must store the enrolled/not enrolled state of the component. Typically, base units 200 will contain the necessary storage mechanism to store their enrolled/not enrolled state. Similarly, some transponders 100 will also contain the necessary storage mechanism to store their enrolled/not enrolled state.

When a home security network 400 receives communications from a component, the serial number of the component may be entered into a table, which table will typically be located in a memory 211 of the master controller 251 of the home security network 400. If the component has a state of enrolled, then the home security network 400 will typically not be required to take any further action. If the component has a state of not enrolled, then the home security network 400 may exchange communications with neighbor security networks 400 to determine whether any of the neighbor security networks 400 have received communications from the same component, but have entered the component into their respective tables with a state of enrolled. If so, then the home security network 400 may enter the component into a table, but record the state of the component as enrolled with a neighbor security network 400. In this manner and over time, the home security network 400 may continue to add components to a table, in each case entering each component as enrolled with the home security network 400, enrolled with a neighbor security network 400, or not enrolled. When the state of a component has been determined to be enrolled in a neighbor security network 400, the home security network 400 may forward any communications received from the component to the neighbor security network 400. In this manner, the home security network 400 may provide antenna and communications diversity for the component in ensuring that the component's communications reach the neighbor security network 400.

When the home security network 400 has received communications from a component and the component is in a state of not enrolled in either the home security network 400 or in any neighbor network, the end-user may decide to enroll the component in the home security network 400. A designer may choose any of various means, typically through a user interface, in which to enable the home security network 400 to notify the end-user of the not enrolled component, and then enable the end-user to permit the component to become enrolled in the home security network 400. During the process of enrollment, the end-user may be permitted to associate specific components with each other or with locations on the end-user's premises. For example, a component installed in the living room of the end-user's house may be labeled within the home security system as a living room window transponder 100.

For components that are capable of storing their enrolled or not enrolled state, the components may use different serial numbers in their communications when enrolled and when not enrolled. For example, when its state is not enrolled a component may use a first serial number of a first predetermined length. When the same component is in an enrolled state, the same component may use a second serial number of a second predetermined length. The second predetermined length may be shorter than the first predetermined length, and the second serial number may be an abbreviated form of the first serial number. This may enable shorter transmissions when the component is in an enrolled state. On the other hand, the second predetermined length may be longer than the first predetermined length. For example, when a component is in an enrolled state the second serial number may be a combination of the first serial number and the network ID of the home security network 400. The presence of the network ID of the home security network 400 in the second serial number may be used in the routing of communications. For example, a neighbor security network 400 may receive communications from a component and use the second serial number to identify that the component is enrolled with the home security network 400 and may forward the communications to the home security network 400.

In addition to allowing an end-user to permit a component to be enrolled in the home security network 400, the home security network 400 may also permit the end-user to assign a label to the component. One means by which a label may be assigned to a component is by enabling the end-user to record a verbal label for the component. This verbal label may be stored in the master controller 251 or any other controller function 250. If any base units 200 in the home security network 400 have an audio transducer 210, then the audio labels may be played back to the end-user at an appropriate time, such as when the security network 400 signals an alarm condition.

If the transponder 100 has not been manufactured with a predetermined serial number, the base unit 200 can generate, using a predetermined algorithm, a serial number and, if desired, any other information necessary to engage in encrypted communications and download these values to the transponder 100. If the transponder 100 requires a power level higher than normally available to enable the permanent programming of these downloaded values into its microcontroller 106 or memory (in whatever form such as fuses, flash memory, EEPROM, or similar), a base unit 200 can increase its transmitted RF power subsequent to the downloading. No values need be transmitted during the period of higher transmitted RF power, and therefore there is no risk of the values being intercepted outside of the close proximity of the base unit 200 and transponder 100. After this particular exchange, the transponder 100 is enrolled, and the master controller 251 may provide some form of feedback, such as audible or visual, to the user indicating that the transponder 100 has been enrolled.

The base unit 200 is not limited to reading just the transponders 100 installed in the openings of the building. The base unit 200 can also read transponders 100 that may be carried by individuals 710 or animals 711, or placed on objects of high value. By placing a transponder 100 on an animal 711, for example, the controller function 250 can optionally ignore indications received from the motion sensors if the animal 711 is in the room where the motion was detected. By placing a transponder 100 on a child, the controller function 250 can use a gateway 300 to send a message to a parent at work when the child has arrived home or equally important, if the child was home and then leaves the home. The transponder 100 can also include a button than can be used, for example, by an elderly or invalid person to call for help in the event of a medical emergency or other panic condition. When used with a button, the transponder 100 is capable of reporting two states: one state where the transponder 100 simply registers its presence, and the second state in which the transponder 100 communicates the "button pressed" state. It can be a choice of the system user of how to interpret the pressing of the button, such as causing an alert, sending a message to a relative, or calling for medical help. Because the base units 200 will typically be distributed throughout a house, this form of panic button can provide a more reliable radio link than prior art systems with only a single centralized receiver.

Embodiments of base units 200 and transponders 100 may also be made into forms compatible with various vehicles, water craft, lawn and farm equipment, and similar types of valuable property. For example, one embodiment of a base unit 200 or transponder 100 may be made in an example physical embodiment of a cigarette lighter adaptor 436, as shown in FIG. 26. Given the wide use of cigarette lighter adaptors for charging cell phones and powering other equipment, there are some example vehicles that have cigarette lighters that are constantly powered, even when the vehicle has been turned off. A base unit 200 or transponder 100 in the form of a cigarette lighter adaptor 436 provides an easily installed means to monitor the vehicle against the risk of theft. Of course, other forms of base units 200 and transponders 100 may also be designed that attach in other areas of vehicles, water craft, lawn and farm equipment, and similar types of property. Some forms may be permanently wired. Even if a cigarette lighter has switched power, a base unit 200 or transponder 100 in the form of a cigarette lighter adaptor 436 may still be used if the base unit 200 or transponder 100 contains a battery. The battery may be periodically recharged when the vehicle is running. Since base units 200 are capable of high power RF communications, their RF propagation range can be much farther than a transponder 100.

One advantageous security network 400 that may be formed may include one base unit 200 or transponder 100 located in a vehicle and a second base unit 200 that is handheld (i.e., example embodiment 260). Thus, the security network 400 is not permanently affixed to a building, but rather travels with the user. When a user drives to a mall, for example, a first base unit 200 may remain in the vehicle and a second base unit 200 may be carried by the user, and the two base units 200 may continue their communications. If the first base unit 200 detects an attempted intrusion, the first base unit 200 may send a communications message to the second base unit, and the second base unit 200 may cause an alert to notify the user. In addition, the first base unit 200 may include a camera 213, as described elsewhere in this specification, and the second base unit 200 may include a display 266 on which pictures may be viewed. The first base unit 200 may periodically record and/or send pictures to the second base unit, and in particular, the first base unit 200 may record and/or send pictures during the time in which the first base unit 200 is detecting an attempted intrusion. This may enable the user to obtain a picture-based record of the activities involving the vehicle during the time when the vehicle was parked and the user was away from the vehicle.

A user may configure a security network 400 in the home to include a base unit 200 or transponder 100 in a vehicle when the vehicle is located within RF propagation range of a home security network 400 or neighbor security network 400. Similarly, a user may configure a security network 400 in the home to ignore a base unit 200 or transponder 100 in a vehicle when the vehicle has traveled outside of RF propagation range of a home security network 400 or neighbor security network 400. This configuration enables the base unit 200 or transponder 100 in the vehicle to join the home security network 400 and therefore the user can monitor the status of the vehicle when the vehicle is parked in or near to their home. The same base unit 200 or transponder 100 in the vehicle can then be used as described above to monitor the vehicle when the user has driven the vehicle to another location such as an example mall. This form of security network 400 differs significantly from present forms of vehicle security systems that only make noise locally at the vehicle when the vehicle is disturbed.

The inventive security network 400 provides a number of mechanisms for users and operators to interface with the security network 400. The security network 400 may include a base unit 200 with a keypad 265 similar to a cordless phone handset 260 or cordless phone base 261 as shown in FIG. 4 since it is a convenient means by which authorized persons can arm or disarm the system and view the status of various zones. There are a number of keypad options that can be made available for the security network 400, derived from permutations of the following possibilities: (i) high power RF communications or backscatter modulation communications, (ii) AC powered or battery powered, and if battery powered, rechargeable, and (iii) inclusion, or not, of sufficient processing and memory capability to also support a controller function. The example handset 260 design contains the added advantage of supporting cordless phone functionality. Thus, the security network 400 design can serve a dual purpose for users—security monitoring and voice conversation—through a single network of base units 200. The handset-shaped 260 base unit 200 with keypad will typically be battery powered, with the battery 208 being rechargeable in a manner similar to existing cordless phones. One or more other base units 200 in the security network 400 may contain gateway 300 functionality including a connection to a telephone line 431, Ethernet 401, WiFi 404, or CMRS 402 network. Like all base units 200, the handset-shaped 260 base unit 200 with keypad 265 and the base units 200 with gateway 300 functionality can support high power RF communications with each other. This high power RF communications can support voice conversation in addition to exchanging data for the operation of the security network 400.

The inventive security network 400 may include a means to provide alerts without calling the attention of an intruder to base units 200. One means by which this may be accomplished is a remote sounder 437. A remote sounder 437 should be less expensive than a base unit 200 with an audio transducer 210 because the remote sounder 437 contains only the functionality to receive commands from a base unit 200 and to provide the desired alert characteristics such as an audio siren. On example remote sounder 437 is shown in FIG. 26. This remote sounder 437 has been constructed in the shape of a lamp socket, such that (i) a light bulb may be removed from a lamp socket, (ii) the remote sounder 437 is screwed into the lamp socket, and then (iii) the light bulb is screwed into the remote sounder 437. This example remote sounder 437 contains the mechanical means to (i) fit between a light bulb and a lamp socket, (ii) pass AC power through the remote sounder, (iii) obtain AC power from the lamp socket, (iv) receive communications from base units 200 using high power or low power RF communications, and (v) cause an audio siren when commanded by the master controller 251. If desired, the remote sounder 437 may support two-way communications such that the master controller 251 may provide positive feedback from the remote sounder 437 that a message to alert or stop alerting has been received. Alternately, if one or more base units 200 in a security network 400 contain an audio transducer 210 that can input audio, then the master controller 251 can receive feedback by commanding the one or more base units 200 to determine whether the audio siren on the remote sounder 437 is generating audio volume that can be detected by the one or more base units 200.

In addition to detecting intrusion, the security network 400 can monitor the status of other environmental quantities such as fire, smoke, heat, water, gases, temperature, vibration, motion, glass breakage as well as other measurable events or items, whether environmental or not (i.e., presence, range, location) by using an appropriate sensor 620. The list of sensor 620 possibilities is not meant to be exhaustive, and many types of sensors 620 already exist today. For each of these sensor 620 types, the security network 400 may be configured to report an alert based upon a change in the condition or quantity being measured, or by the condition or quantity reaching a particular relationship to a predetermined threshold, where the relationship can be, for example, one or more of less than, equal to, or more than (i.e., a monitored temperature is less than or equal to a predetermined threshold such as the freezing point).

These detection devices can be created in at least two forms, depending upon the designer's preference. In one example embodiment, an appropriate sensor 620 can be connected to a transponder 100, in a manner similar to that by which an intrusion sensor 600 is connected to the transponder 100. All of the previous discussion relating to the powering of an LED generator 601 by the transponder 100 applies to the powering of appropriate sensors 620 as well. This embodiment enables the creation of low cost sensors 620, as long as the sensors 620 are within the read range of base units.

In a second example embodiment, these sensor devices may be independently powered, much as base units 200 and gateways 300 are independently powered. Each of these detection devices are created by combining a sensor 620 appropriate for the quantity being measured and monitored with a local power supply, a processor, and a communications means that may include high power RF or backscatter modulation communications. These sensor 620 devices may find great use in monitoring the status of unoccupied buildings, such as vacation homes. A temperature sensor may be useful in alerting a remote building owner if the heating system has failed and the building plumbing is in danger of freezing. Similarly, a flood prone building can be monitoring for rising water while otherwise unoccupied.

The base unit 200 is typically designed to be inexpensively manufactured since in each installed security network 400, there may be several base units. From a physical form factor perspective, the base unit 200 of the present invention can be made in several embodiments. One embodiment particularly useful in self-installed security networks 400 is shown in FIG. 13, where the packaging of the base unit 200 may have the plug integrated into the package such that the base unit 200 is plugged into a standard outlet 720 without any associated extension cords, power strips, or the like.

From a mechanical standpoint, one embodiment of the base unit 200 may be provided with threaded screw holes on the rear of the packaging, as shown in FIG. 24A. If desired by the user installing the system of the present invention, holes can be drilled into a plate 722, which may be an existing outlet cover (for example, if the user has stylized outlet covers that he wishes to preserve) whereby the holes are of the size and location that match the holes on the rear of the packaging for the base unit, for example. Alternately, the user can employ a plate in the shape of an extended outlet cover 721 shown in FIG. 24B which provides additional mechanical support through the use of additional screw attachment points. Then, as shown in FIGS. 24A and 24B, the plate 722 or cover 721 can be first attached to the rear of the base unit 200 packaging, using the screws 724 shown, and if necessary, spacers or washers. The base unit 200 can be plugged into the outlet 720, whereby the plate 722 or cover 721 is in alignment with the sockets of the outlet 720. Finally, an attachment screw 723 can be used to attach the plate 722 or cover 721 to the socket assembly of the outlet 720. This combination of screws provides positive mechanical attachment whereby the base unit 200 cannot be accidentally jostled or bumped out of the outlet 720. Furthermore, the presence of the attachment screw 723 will slow down any attempt to rapidly unplug the base unit 200.

In addition to the physical embodiments described herein, various components of the security network 400 can be manufactured in other physical embodiments. For example, modern outlet boxes used for both outlets and light switches are available in sizes of 20 cubic inches or more. In fact, many modern electrical codes require the use of these larger boxes. Within an enclosure of 20 cubic inches or more, a base unit 200 can be manufactured and mounted in a form integrated with an outlet as shown in FIG. 23B or a light switch in a similar configuration. The installation of this integrated base unit 268 would require the removal of a current outlet, and the connection of the AC power lines to the integrated base unit/outlet. The AC power lines would power both the base unit 200 and the outlet. One or more antennas can be integrated into the body of the base unit/outlet shown or can be integrated into the cover plate typically installed over the outlet. In addition to a cleaner physical appearance, this integrated base unit/outlet would provide the same two outlet connection points as standard outlets and provide a concealed base unit 200 capability. In a similar manner, an integrated base unit/light switch can also be manufactured for mounting within an outlet box.

Figure 18:
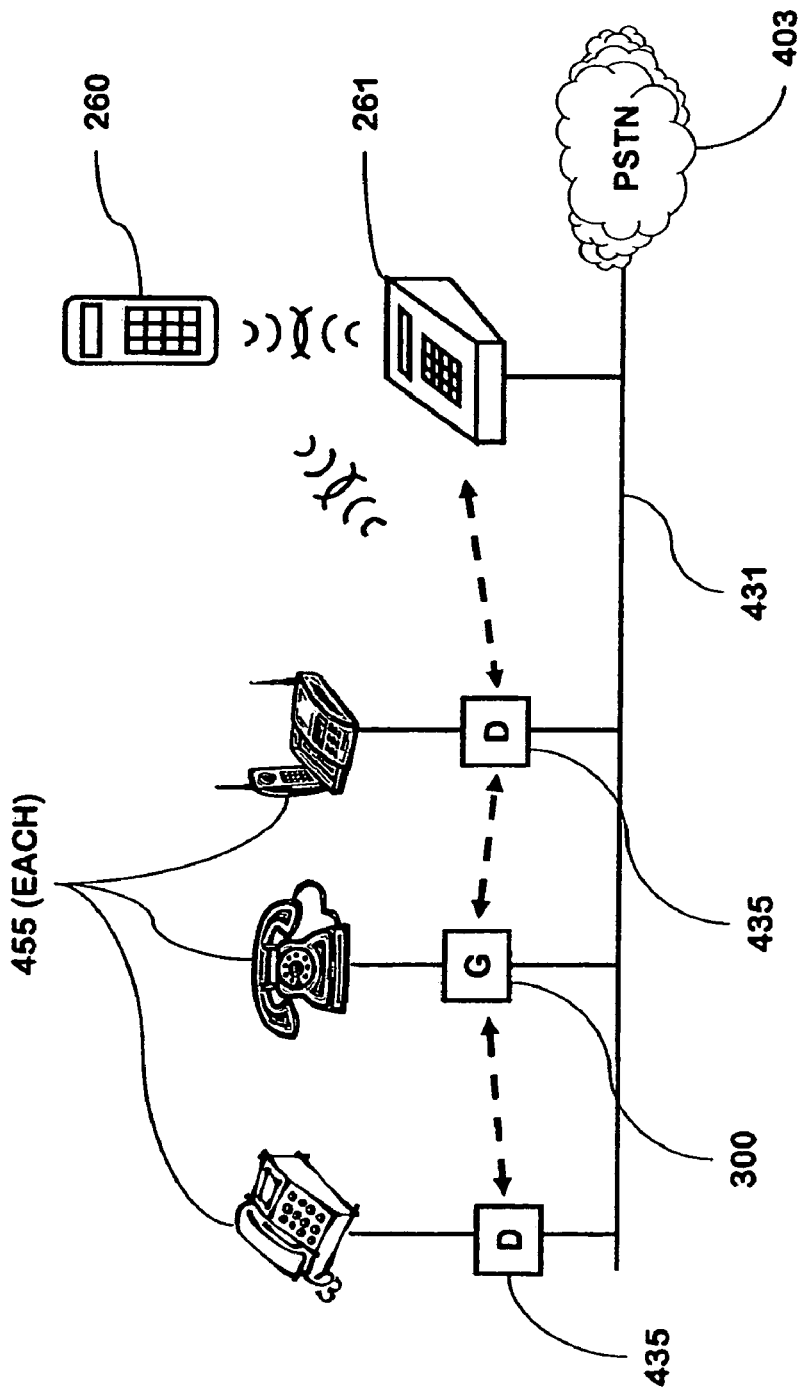
FIG. 18 shows multiple gateways connecting to a telephone line and a gateway and telephone disconnect devices controlling access from telephony devices to the telephone line.

When the inventive security network 400 includes at least one gateway 300 with modem functionality, it is advantageous for the security network 400 to seize the telephone line 431 if any other telephony device 455 (other than the security network 400 itself) is using the telephone line 431 at the time that the security network 400 requires use of the telephone line 431. Furthermore, while the security network 400 is using the telephone line 431, it is also advantageous for the security network 400 to prevent other telephony devices 455 from attempting to use the telephone line 431. Therefore, the security network 400 includes several means in which to seize the telephone line 431 as shown in FIG. 18.

A gateway 300 containing modem 310 functionality may include two separate RJ-11 connectors of the type commonly used by telephones, fax machines, modems, and similar telephony devices. The first of the RJ-11 connectors is designated for connection to the telephone line 431 (i.e., PSTN 403). The second of the RJ-11 connectors is designated for connection to a local telephony device 455 such as a telephone, fax machine, modem, etc. The gateway 300 can control the connection between the first and the second RJ-11 connector. The connection may be controlled using mechanical means, such as a relay, or using silicon means such as a FET. When the security network 400 does not require use of the telephone line 431, the gateway 300 enables signals to pass through the gateway 300 between the first and second RJ-11 connectors. When the security network 400 requires use of the telephone line 431, the gateway 300 does not enable signals to pass through the gateway 300 between the first and second RJ-11 connectors. In a security network 400 containing multiple gateways 300 with modem 310 functionality, the security network 400 may command all gateways 300 to stop enabling signals to pass through each gateway 300 between the respective first and second RJ-11 connectors of each gateway 300. Thus, all telephony devices 455 connected through gateways 300 to the telephone line 431 may be disconnected from the telephone line 431 by the security network 400.

In a home or other building, there may be telephony devices 455 connected to the telephone line 431 that do not connect through a gateway 300. This may be because there are simply more telephony devices 455 in the home than there are gateways 300 in the home, for example. The inventive security network 400 may therefore include telephone disconnect devices 435 that can be used by the security network 400 to disconnect a telephony device 455 from the telephone line 431 under command of the security network. One embodiment of the telephone disconnect device 435 is shown in FIG. 26. In this example embodiment, the telephone disconnect device 435 includes a first male RJ-11 connector and a second female RJ-11 connector. This enables the example telephone disconnect device to be easily installed between an existing RJ-11 cord and an existing RJ-11 receptacle as shown. Other embodiments are possible, such as an embodiment that includes both first and second female RJ-11 connectors. The telephone disconnect device 435 may obtain power from the telephone line 431 or may be battery powered. The telephone disconnect device 431 can control the connection between the first and the second RJ-11 connector. The connection may be controlled using mechanical means, such as a relay, or using silicon means such as a FET. When the security network 400 does not require use of the telephone line 431, the telephone disconnect device 435 enables signals to pass through the telephone disconnect device 435 between the first and second RJ-11 connectors. When the security network 400 requires use of the telephone line 431, the telephone disconnect device 435 does not enable signals to pass through the telephone disconnect device 435 between the first and second RJ-11 connectors. On a standard two-wire telephone line 431, such as those commonly used for Plain Old Telephone Service (POTS), it is not necessary for the gateway 300 or the telephone disconnect device 435 to prevent signals from passing on both wires in order to seize the telephone line 431. Typically, even if signals on only one of the wires of the two-wire telephone line are enabled or not enabled, the gateway 300 or the telephone disconnect device 435 can enable or prevent telephony devices 455 from accessing the telephone line 431.

The telephone disconnect device 435 may obtain commands from the security network 400 in any of several means. For example, the telephone disconnect device 435 may contain a wireless receiver by which to receive high power or low power RF communications from any base unit 200. In another example, the telephone disconnect device 435 may contain an audio receiver by which to receive communications from a base unit 200. It may be desired that the telephone disconnect device 435 be individually addressable so that the security network 400 can send commands to selected telephone disconnect devices 435 without simultaneously addressing all of the telephone disconnect devices 435. In this example, a base unit 200, typically a gateway 300, may send an audio signal or a sequence of audio signals over the telephone lines of the house. These audio signals may be detected by the various telephone disconnect devices 435 as commands to either enable or not enable telephony signals to pass through the telephone disconnect devices 435. Typically, even though a telephone disconnect device 435 will not permit signals to pass between the telephone line 431 and any telephony device 455 connected to the telephone disconnect device 435, the telephone disconnect device 435 will remain connected to the telephone line 431 and may therefore continue to receive commands put onto the telephone line 431 by a base unit 200. In this example, the term audio tones may include frequencies that are outside of the normal hearing of a person. For example, most telephone systems are designed to support audio below approximately 4,000 Hz. However, the present invention may employ audio at higher frequencies such as 10 KHz, 20 KHz, or even higher. Since it is not necessary or even preferred for the telephone network to interpret the audio tones sent from a base unit 200 to a telephone disconnect device 435, there may be an advantage to using audio tones at frequencies higher that those normally supported in the telephone network.

The true scope of the present invention is not limited to the presently preferred embodiments disclosed herein. As will be understood by those skilled in the art, for example, different components, such as processors or chipsets, can be chosen in the design, packaging, and manufacture of the various elements of the present invention. The discussed embodiments of the present invention have generally relied on the availability of commercial chipsets, however many of the functions disclosed herein can also be implemented by a designer using discrete circuits and components. As a further example, the base unit and transponder can operate at different frequencies than those discussed herein, or the base units can use alternate RF communications protocols. Also, certain functions which have been discussed as optional may be incorporated as part of the standard product offering if customer purchase patterns dictate certain preferred forms. Finally, this document generally references U.S. standards, customs, and FCC rules. Various parameters, such as input power or output power for example, can be adjusted to conform with international standards. Accordingly, except as they may be expressly so limited, the scope of protection of the following claims is not intended to be limited to the specific embodiments described above.

What is claimed is:

1. A multi-level meshed security network comprising:
a first level having a plurality of base units, supporting RF communications at average power levels of 10 milliwatts or more, and a controller function; and
a second level having a plurality of transponders, supporting RF communications at average power levels under 10 milliwatts, and at least one sensor,
each of the components of the first level being capable of communicating with each other and with each of the components of the second level.

2. The security network according to claim 1 wherein any one or more of the components of the first level communicates with an external network.

3. The security network according to claim 1 wherein the base units are configured as one or more of a handheld unit, a tabletop unit, a wall unit, a ceiling unit, and a console or other unit having the controller function.

4. The security network according to claim 1 wherein the at least one sensor is integrated with a corresponding transponder into the same physical package.

5. The security network according to claim 1 wherein the at least one sensor is a separate component associated with a corresponding transponder.

6. The security network according to claim 1 wherein the components of the first level are AC powered, have rechargeable batteries, or both.

7. The security network according to claim 1 wherein a fixed and static relationship exists between the base units of the first level and the transponders of the second level.

8. The security network according to claim 1 wherein the base units operate as a network of receivers to demodulate and interpret responses from each transponder.

9. The security network according to claim 1 wherein at least one of the base units uses different power levels when communicating with each transponder.

10. The security network according to claim 9 wherein the power level used by a base unit when communicating with each transponder is the lowest necessary power level for communicating with that transponder.

11. The security network according to claim 1 wherein the controller function determines and stores the characteristics of communication between each base unit and each transponder.

12. The security network according to claim 1 wherein at least one of the base units has receivers or transceivers to communicate with the transponders using low power RF communications.

13. The security network according to claim 1 wherein the transponders transmit using the 300 to 500 MHz band.

14. The security network according to claim 1 wherein the base units also communicate with the transponders and controller function of a second security network.

15. The security network according to claim 1 further comprising a passive infrared sensor communicating with the controller function.

16. The security network according to claim 1 wherein the base units are organized into a common frequency plan.

17. The security network according to claim 1 wherein the base units have synchronized internal timing.

18. The security network according to claim 1 wherein each of the components of the second level communicates only with components of the first level.

19. The security network according to claim 1 further comprising a computer having a computer usable medium with first computer readable program code means embodied in the medium for downloading, uploading, or editing the configuration stored in the controller function; second computer readable program code means embodied in the medium for monitoring the status of each of the other components of the security network; and third computer readable program code means embodied in the medium for facilitating communications between and among those components.

20. A multi-level meshed security network for use in a building having an opening to be monitored for intrusion, the security network comprising:
a first level having a plurality of REID base units, supporting RF communications at average power levels of 10 milliwatts or more, and a controller function; and
a second level having a plurality of REID transponders, supporting RF communications at average power levels under 10 milliwatts, and a sensor monitoring the opening, at least one of the RFID transponders coupled to the sensor and communicating a present state of the sensor to the plurality of RFID base units,
each of the components of the first level being capable of communicating with each other and with each of the components of the second level.

21. The security network of claim 20 wherein each of the components of the second level communicates only with components of the first level.

22. A multi-level meshed security network comprising:
a first level having a plurality of base units, supporting relatively high power RF communications, and a controller function storing a configuration, wherein the components of the first level are AC powered, have rechargeable batteries, or both and any one or more of the components of the first level communicates with an external network;
a second level having a plurality of transponders, supporting relatively low power RF communications, and at least one sensor, wherein a fixed and static relationship exists between the base units of the first level and the transponders of the second level and wherein the base units operate as a network of receivers to demodulate and interpret responses from each transponder; and
a computer having a computer usable medium with first computer readable program code means embodied in the medium for downloading, uploading, or editing the configuration stored in the controller function, second computer readable program code means embodied in the medium for monitoring the status of each of the other components of the security network, and third computer readable program code means embodied in the medium for facilitating communications between and among those components,
each of the components of the first level being capable of communicating with each other and with each of the components of the second level.

23. The security network of claim 22 wherein each of the components of the second level communicates only with components of the first level.

24. A multi-level meshed security network comprising:
a first level having a plurality of base units, supporting RF communications at average power levels of 10 milliwatts or more, and a controller function; and
a second level having a plurality of transponders, supporting RF communications at average power levels under 10 milliwatts, and at least one sensor,
each of the components of the first level communicating with at least one other component of the first level and with at least one of the components of the second level.

25. The security network of claim 24 wherein each of the components of the second level communicates only with components of the first level.

26. The security network according to claim 24 wherein the base units are configured as one or more of a handheld unit, a tabletop unit, a wall unit, a ceiling unit, and a console or other unit having the controller function.

27. The security network according to claim 24 wherein a fixed and static relationship exists between the base units of the first level and the transponders of the second level.

28. The security network according to claim 24 wherein the base units operate as a network of receivers to demodulate and interpret responses from each transponder.

29. The security network according to claim 24 wherein at least one of the base units uses different power levels when communicating with each transponder.

30. The security network according to claim 24 wherein at least one of the base units has receivers or transceivers to communicate with the transponders using low power RF communications.

31. The security network according to claim 24 wherein the transponders transmit using the 300 to 500 MHz band.

32. The security network according to claim 24 wherein the base units also communicate with the transponders and controller function of a second security network.

33. The security network according to claim 24 wherein the base units are organized into a common frequency plan.

34. A multi-level meshed security network for use in a building having an opening to be monitored for intrusion, the security network comprising:
a first level having a plurality of RFID base units, supporting RF communications at average power levels of 10 milliwatts or more, and a controller function; and
a second level having a plurality of REID transponders, supporting RF communications at average power levels under 10 milliwatts, and a sensor monitoring the opening, at least one of the RFID transponders coupled to the sensor and communicating a present state of the sensor to the plurality of REID base units,
each of the components of the first level communicating with at least one other component of the first level and with at least one of the components of the second level.

35. The security network of claim 34 wherein each of the components of the second level communicates only with components of the first level.

36. A multi-level meshed security network comprising:
a first level having a plurality of base units, supporting relatively high power RF communications, and a controller function storing a configuration, wherein the components of the first level are AC powered, have rechargeable batteries, or both and any one or more of the components of the first level communicates with an external network;
a second level having a plurality of transponders, supporting relatively low power RF communications, and at least one sensor, wherein a fixed and static relationship exists between the base units of the first level and the transponders of the second level and wherein the base units operate as a network of receivers to demodulate and interpret responses from each transponder; and
a computer having a computer usable medium with first computer readable program code means embodied in the medium for downloading, uploading, or editing the configuration stored in the controller function, second computer readable program code means embodied in the medium for monitoring the status of each of the other components of the security network, and third computer readable program code means embodied in the medium for facilitating communications between and among those components, each of the components of the first level communicating with at least one other component of the first level and with at least one of the components of the second level.

37. The security network of claim 28 wherein each of the components of the second level communicates only with components of the first level.

38. The security network according to claim 28 wherein the base units are configured as one or more of a handheld unit, a tabletop unit, a wall unit, a ceiling unit, and a console or other unit having the controller function.

39. The security network according to claim 28 wherein at least one of the base units uses different power levels when communicating with each transponder.

40. The security network according to claim 28 wherein at least one of the base units has receivers or transceivers to communicate with the transponders using low power RF communications.

41. The security network according to claim 28 wherein the transponders transmit using the 300 to 500 MHz band.

42. The security network according to claim 28 wherein the base units also communicate with the transponders and controller function of a second security network.

43. The security network according to claim 28 wherein the base units are organized into a common frequency plan.

* * * * *

UNITED STATES PATENT AND TRADEMARK OFFICE
CERTIFICATE OF CORRECTION

PATENT NO. : 7,283,048 B2
APPLICATION NO. : 11/321429
DATED : October 16, 2007
INVENTOR(S) : Louis A. Stilp It is certified that error appears in the above-identified patent and that said Letters Patent is hereby corrected as shown below:

Col 63, Line 11, should read:
--a first level having a plurality of RFID base units,--

Col 63, Line 14, should read:
--a second level having a plurality of RFID transponders,--

Col 64, Line 34, should read:
--a second level having a plurality of RFID transponders,--

Col 64, line 39, should read:
--sensor to the plurality of RFID base units,--

Col 65, line 7, should read:
--37. The security network of claim 36 wherein each of the--

Col 65, line 10, should read:
--38. The security network according to claim 36 wherein--

Col 65, line 14, should read:
--39. The security network according to claim 36 wherein--

UNITED STATES PATENT AND TRADEMARK OFFICE
CERTIFICATE OF CORRECTION

PATENT NO. : 7,283,048 B2
APPLICATION NO. : 11/321429
DATED : October 16, 2007
INVENTOR(S) : Louis A. Stilp It is certified that error appears in the above-identified patent and that said Letters Patent is hereby corrected as shown below:

Col 66, line 1, should read:
--40. The security network according to claim 36 wherein--

Col 66, line 5, should read:
--41. The security network according to claim 36 wherein--

Col 66, line 7, should read:
--42. The security network according to claim 36 wherein--

Col 66, line 10, should read:
--43. The security network according to claim 36 wherein--

Signed and Sealed this

Eleventh Day of March, 2008

JON W. DUDAS
*Director of the United States Patent and Trademark Office*